US011225225B2

(12) United States Patent
Di Biase

(10) Patent No.: US 11,225,225 B2
(45) Date of Patent: Jan. 18, 2022

(54) PORTABLE TRAILER STAND

(71) Applicant: Ideal Warehouse Innovations, Inc., Vaughan (CA)

(72) Inventor: Joseph J. Di Biase, Vaughan (CA)

(73) Assignee: IDEAL WAREHOUSE INNOVATIONS INC., Vaughan (CA)

( * ) Notice: Subject to any disclaimer, the term of this patent is extended or adjusted under 35 U.S.C. 154(b) by 508 days.

(21) Appl. No.: 16/006,106

(22) Filed: Jun. 12, 2018

(65) Prior Publication Data

US 2018/0354471 A1    Dec. 13, 2018

Related U.S. Application Data

(60) Provisional application No. 62/518,351, filed on Jun. 12, 2017.

(51) Int. Cl.
| | |
|---|---|
| *B60S 9/06* | (2006.01) |
| *B60S 9/22* | (2006.01) |
| *B60S 9/18* | (2006.01) |
| *B60D 1/66* | (2006.01) |
| *B60S 13/00* | (2006.01) |
| *B66F 5/02* | (2006.01) |

(52) U.S. Cl.
CPC ............... *B60S 9/06* (2013.01); *B60D 1/66* (2013.01); *B60D 1/665* (2013.01); *B60S 9/18* (2013.01); *B60S 9/22* (2013.01); *B60S 13/00* (2013.01); *B66F 5/025* (2013.01)

(58) Field of Classification Search
CPC ............ B62D 53/0864; B62D 53/0557; B60D 1/665; B60D 1/66; B60S 9/02; B60S 9/04; B60S 9/06; B60S 9/08; B60S 9/10; B60S 9/12; B62B 5/0089; B62B 2202/90
See application file for complete search history.

(56) References Cited

U.S. PATENT DOCUMENTS

| | | | | |
|---|---|---|---|---|
| 811,116 | A * | 1/1906 | Adams | B66F 5/025 |
| | | | | 254/7 B |
| 948,299 | A * | 2/1910 | Day | B66F 5/025 |
| | | | | 254/7 B |
| 968,316 | A * | 8/1910 | Beckert | B66F 5/025 |
| | | | | 254/7 B |
| 1,701,122 | A * | 2/1929 | Ridgeway | B66F 3/16 |
| | | | | 254/101 |
| 2,786,650 | A * | 3/1957 | Bottorff | B66F 1/06 |
| | | | | 254/134 |

(Continued)

OTHER PUBLICATIONS

European Search Report for corresponding European Application No. EP 18 17 7375, dated Oct. 30, 2018, 3 pages.

*Primary Examiner* — Emma K Frick
(74) *Attorney, Agent, or Firm* — Tucker Ellis LLP

(57) ABSTRACT

The present application relates to a transport for transporting a trailer stand. The transport for a trailer stand may be a portable trailer stand and may comprise one or more auxiliary trailer stands. The portable trailer stand may include a pedestal having a top for engaging and supporting the underside of the nose portion of a trailer, a bottom for engaging the ground, wheel means mounted on the pedestal for moving the stand along the ground to and from a position under the nose portion of a trailer, means for adjusting the height of said pedestal, and a member for engaging and securing the auxiliary trailer stand to the portable trailer stand.

4 Claims, 54 Drawing Sheets

(56) References Cited

U.S. PATENT DOCUMENTS

| | | | | |
|---|---|---|---|---|
| 2,903,147 A * | 9/1959 | Davis, Jr. | ............... | B63H 20/36 414/490 |
| 3,074,693 A * | 1/1963 | Shumake | ................. | B66F 7/14 254/92 |
| 3,749,361 A * | 7/1973 | Johnson | ................... | B66F 1/06 254/2 R |
| 3,768,778 A * | 10/1973 | Arnes | ...................... | B66F 5/00 254/2 B |
| 4,169,581 A * | 10/1979 | Thurmond, Jr. | .......... | B66F 3/14 254/101 |
| 4,479,634 A * | 10/1984 | Blatz | ........................ | B66F 7/10 248/354.5 |
| 4,844,393 A | 7/1989 | Yu | | |
| 5,711,512 A * | 1/1998 | Kauffman | ................. | B66F 3/30 254/129 |
| 7,581,713 B1 * | 9/2009 | Voss | .......................... | B66F 3/25 254/2 B |
| 7,845,670 B2 * | 12/2010 | Oberg | ..................... | B60S 13/00 280/476.1 |
| 7,988,162 B2 * | 8/2011 | Sands | ................... | B25G 1/005 280/79.7 |
| 8,016,257 B2 * | 9/2011 | Di Biase | ............ | B62D 53/0857 248/354.1 |
| 8,387,953 B2 * | 3/2013 | Drake | ..................... | B66F 7/025 254/112 |
| 8,517,401 B1 * | 8/2013 | Horn | .................... | B62B 3/0606 280/47.15 |
| 9,327,781 B2 * | 5/2016 | Hopkins | ................. | B66F 5/025 |
| 10,137,747 B2 * | 11/2018 | Dietzenbach | ........ | B60D 1/1675 |
| 10,214,229 B2 * | 2/2019 | Brown | ........ | B62B 3/001 |
| 2009/0108147 A1 | 4/2009 | Di Biase | | |
| 2014/0166950 A1 | 6/2014 | Wiegel et al. | | |
| 2019/0308855 A1 * | 10/2019 | Wiegel | ................. | B60B 33/063 |

* cited by examiner

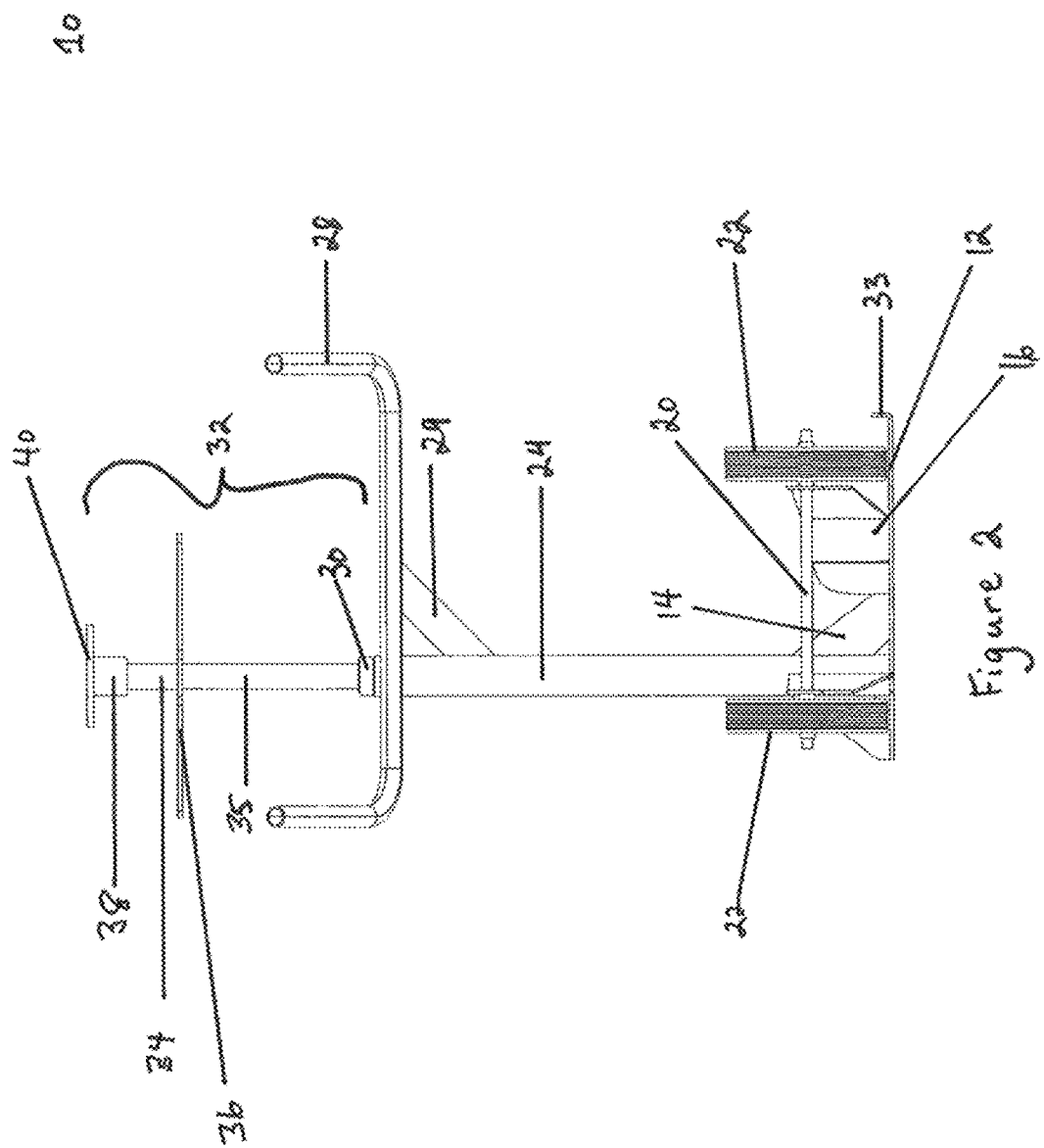

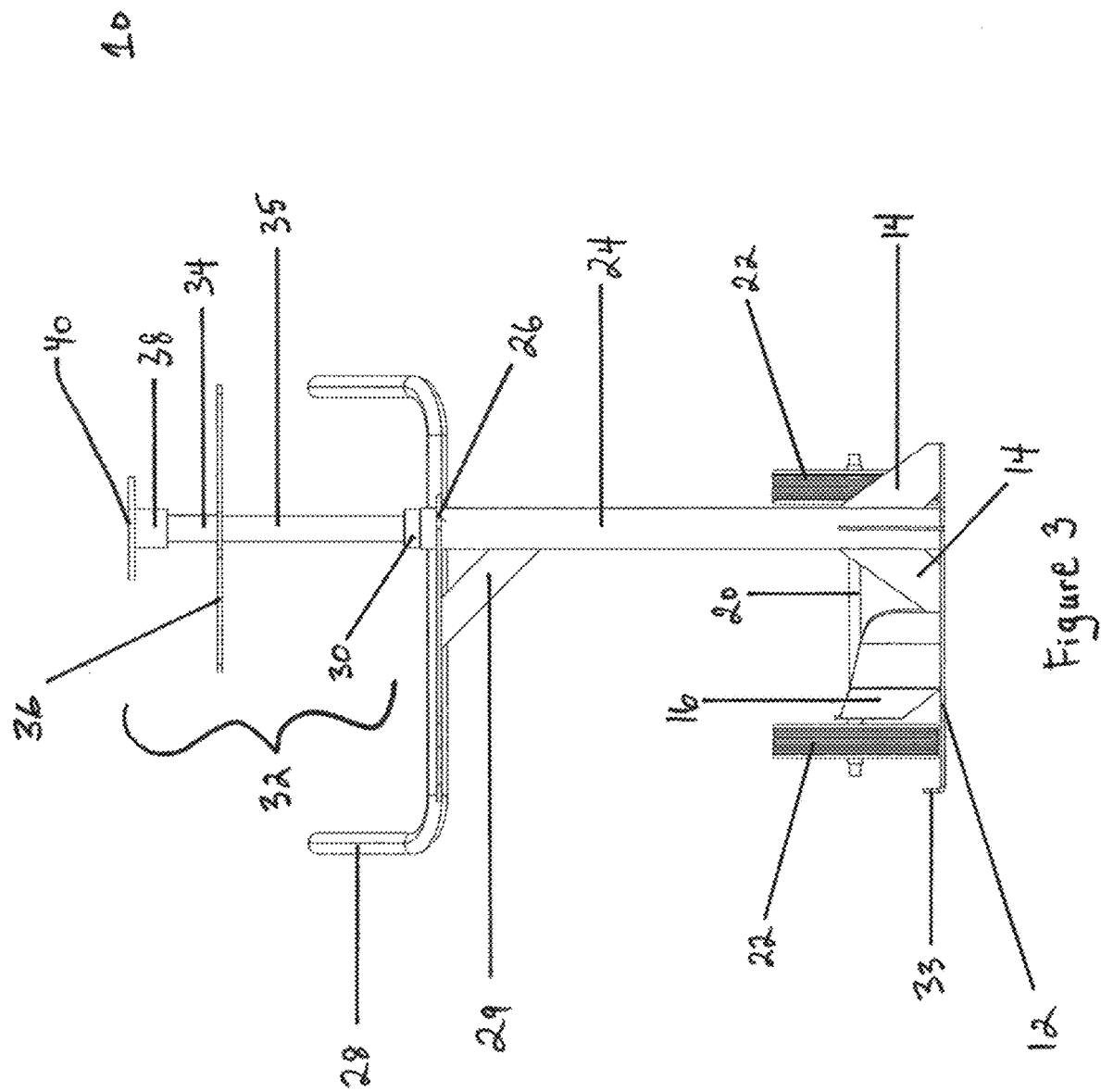

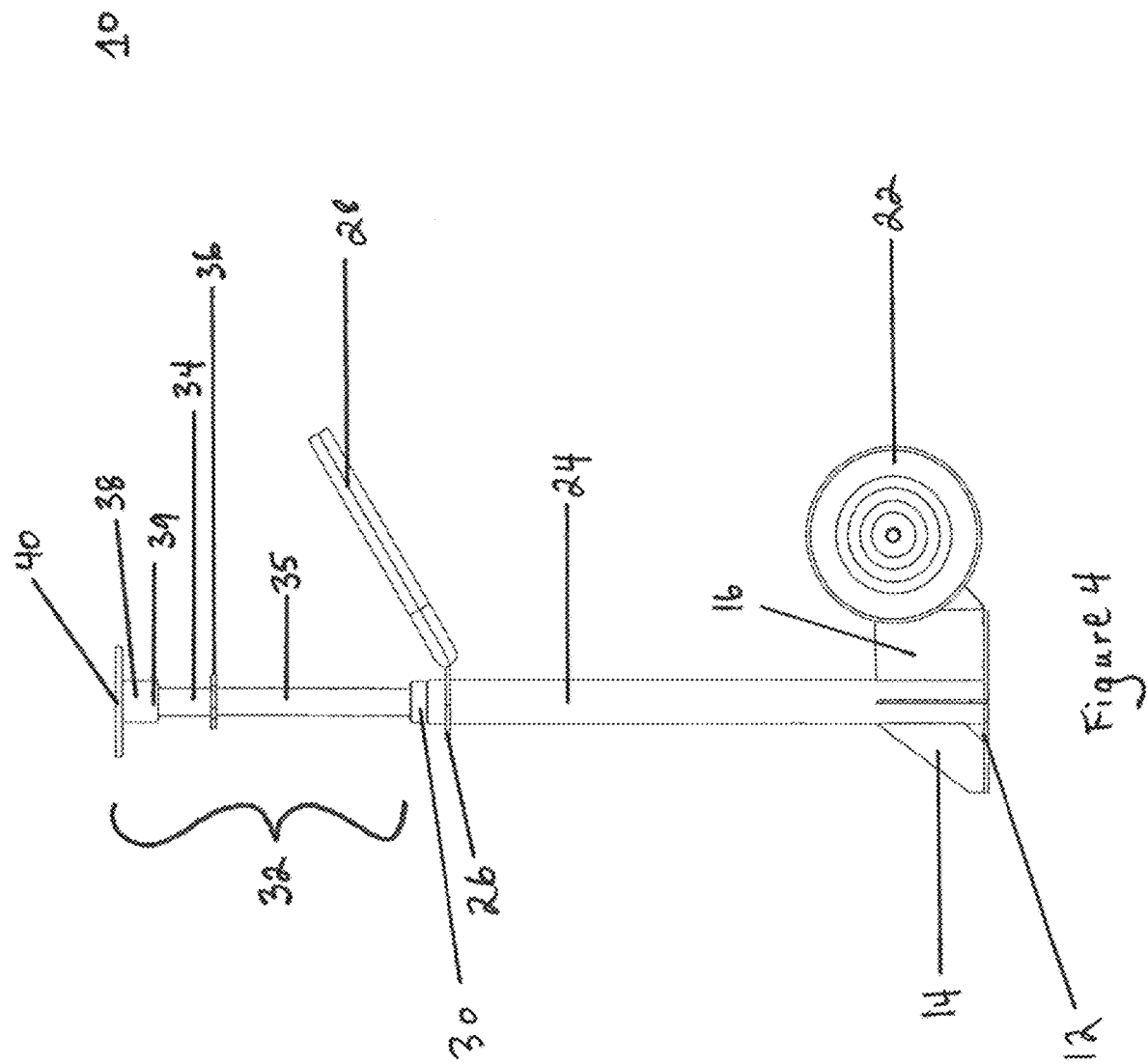

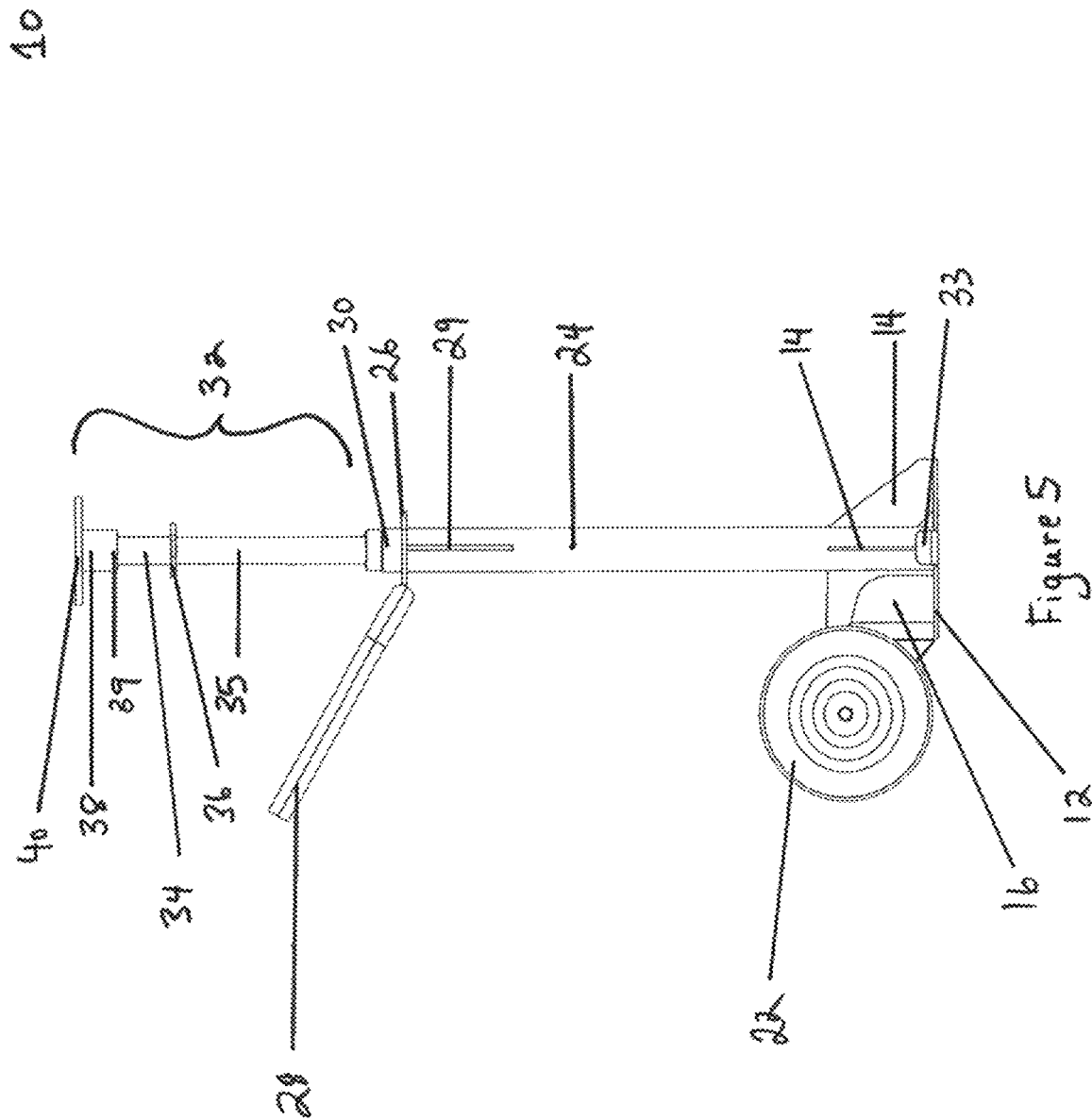

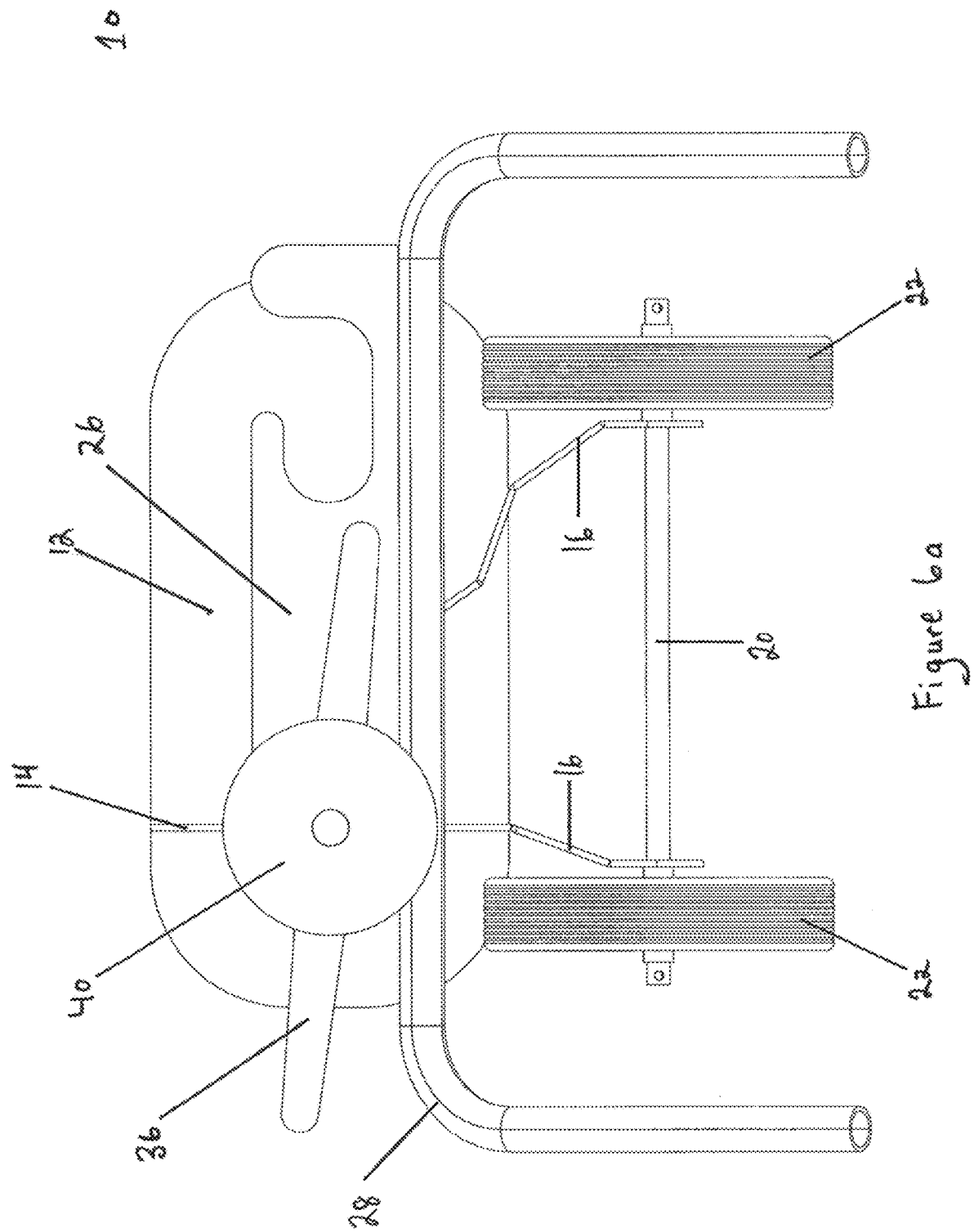

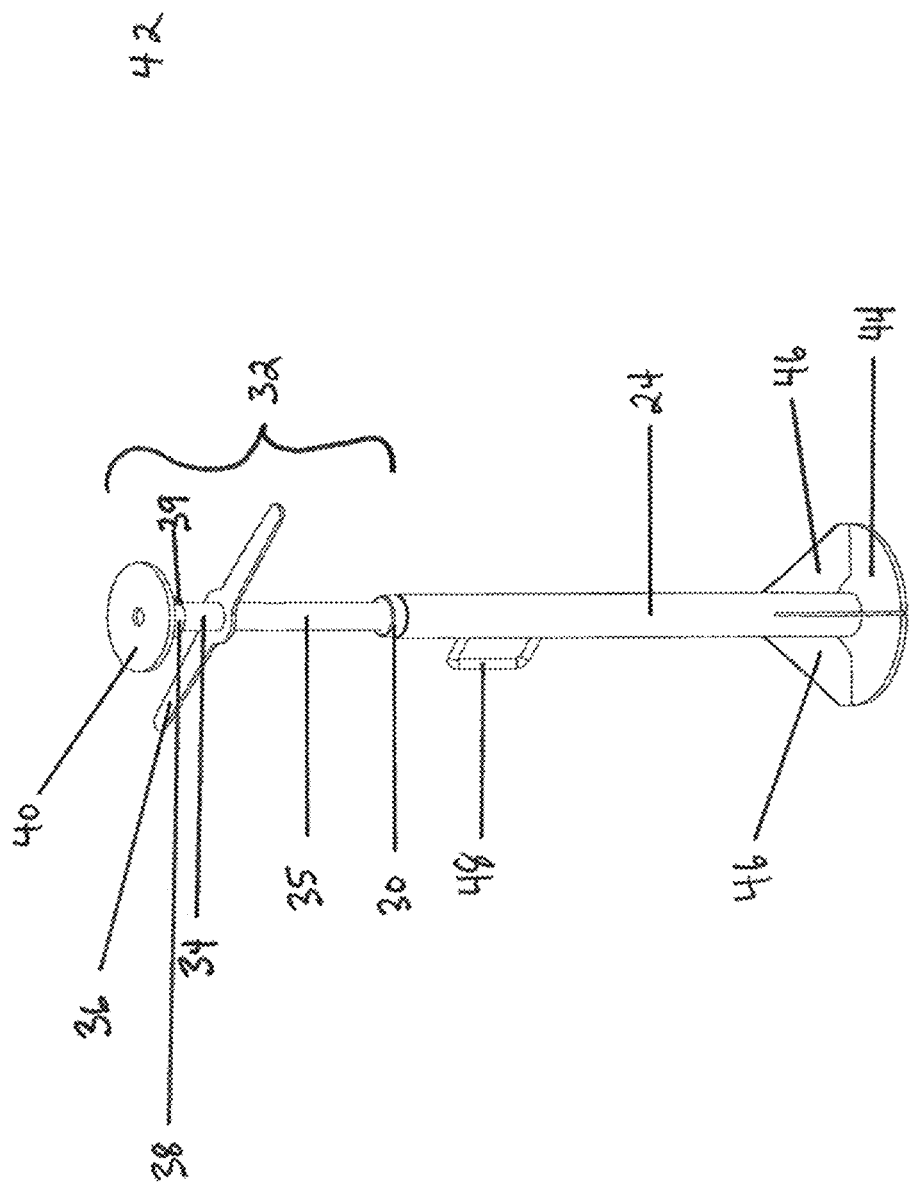

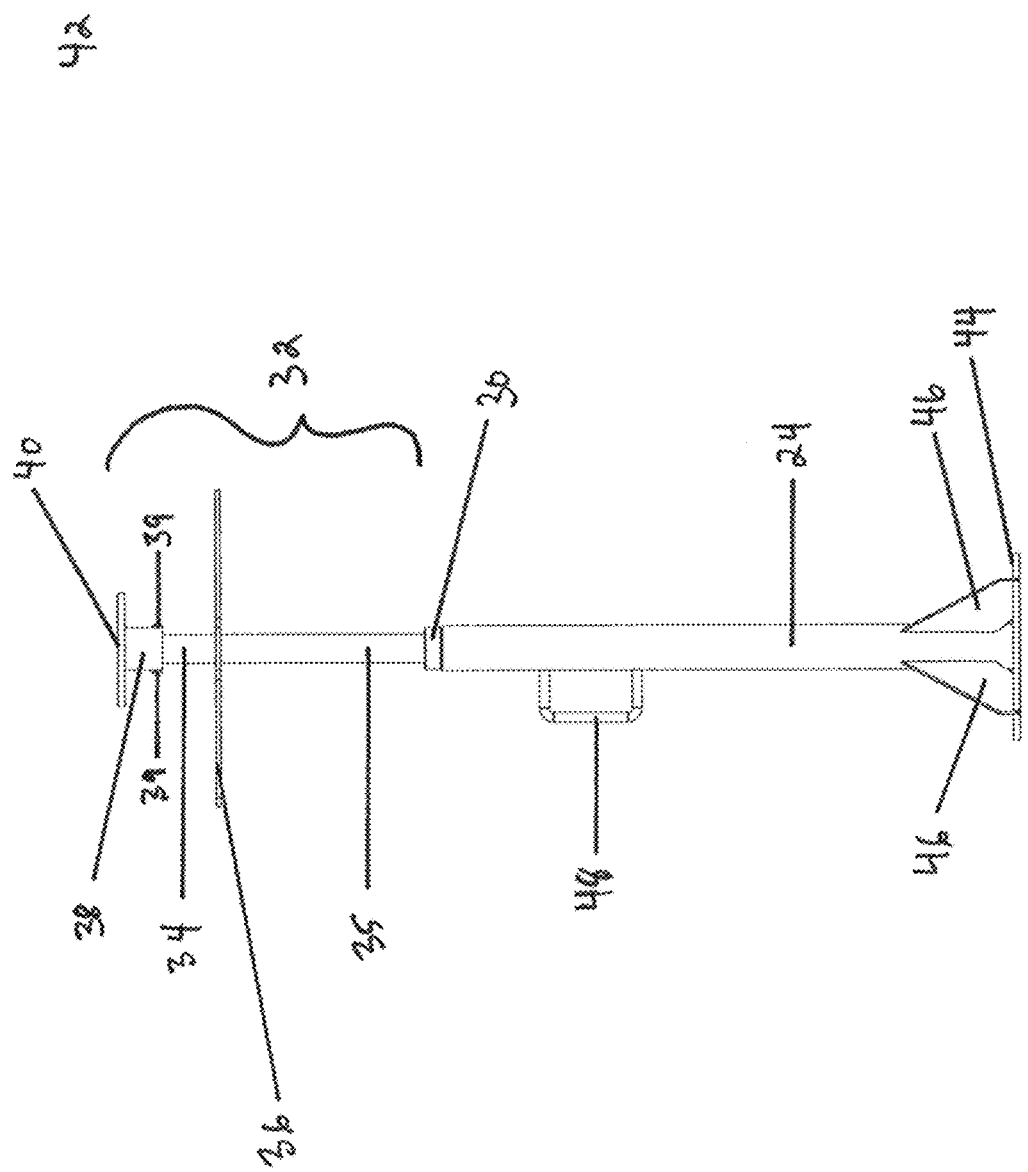

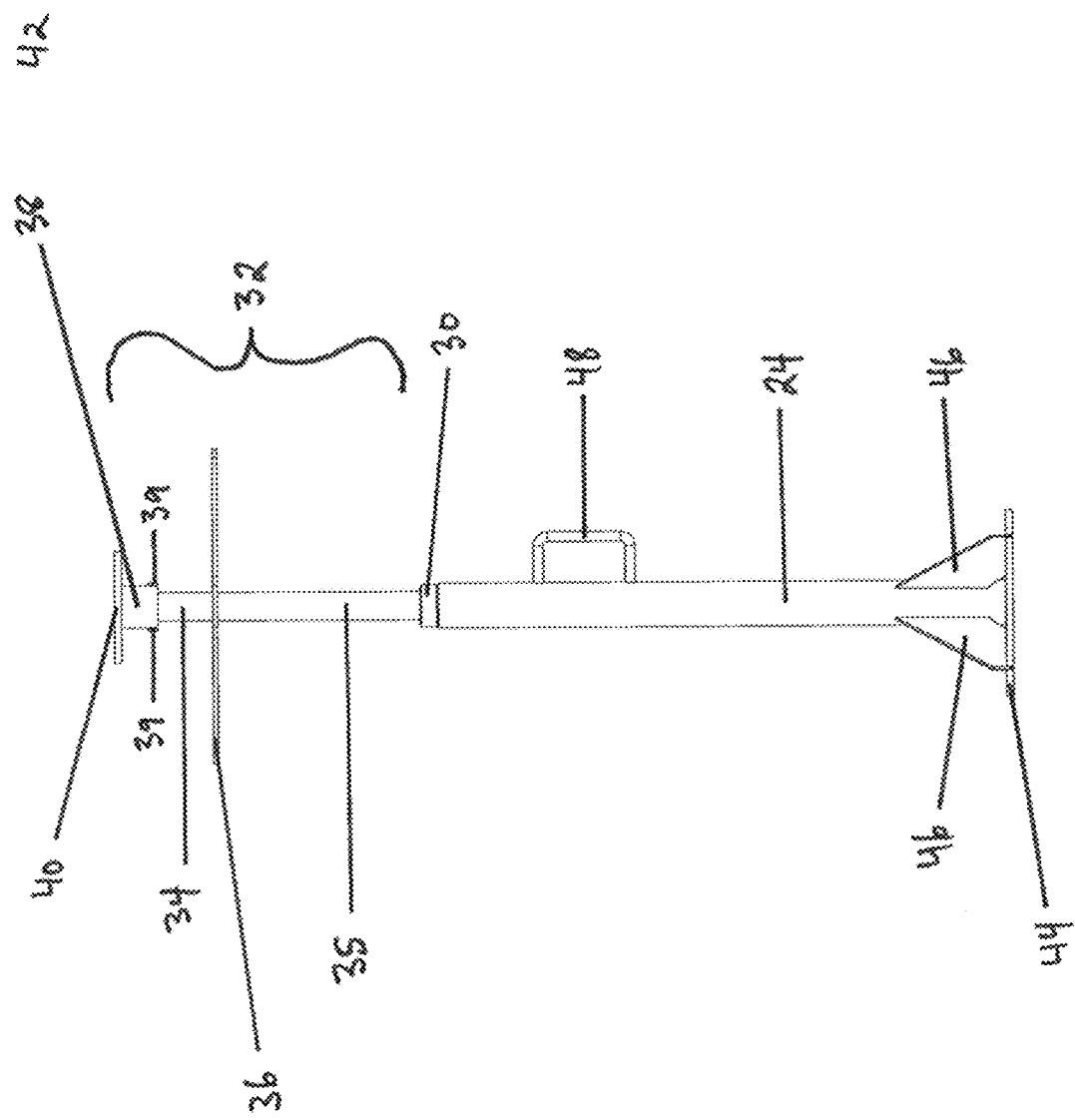

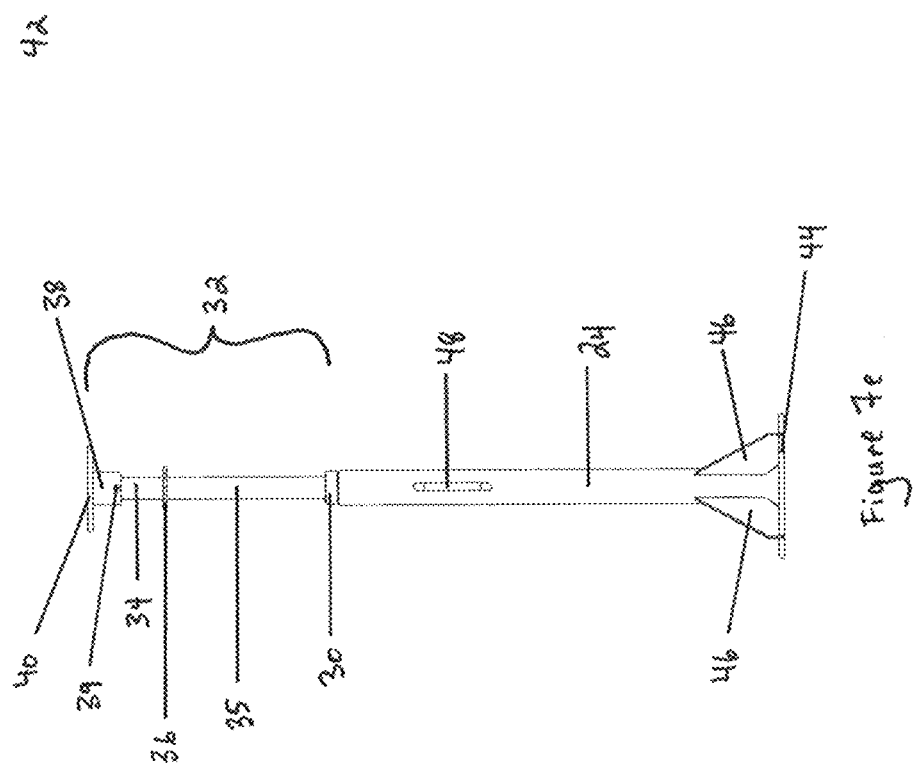

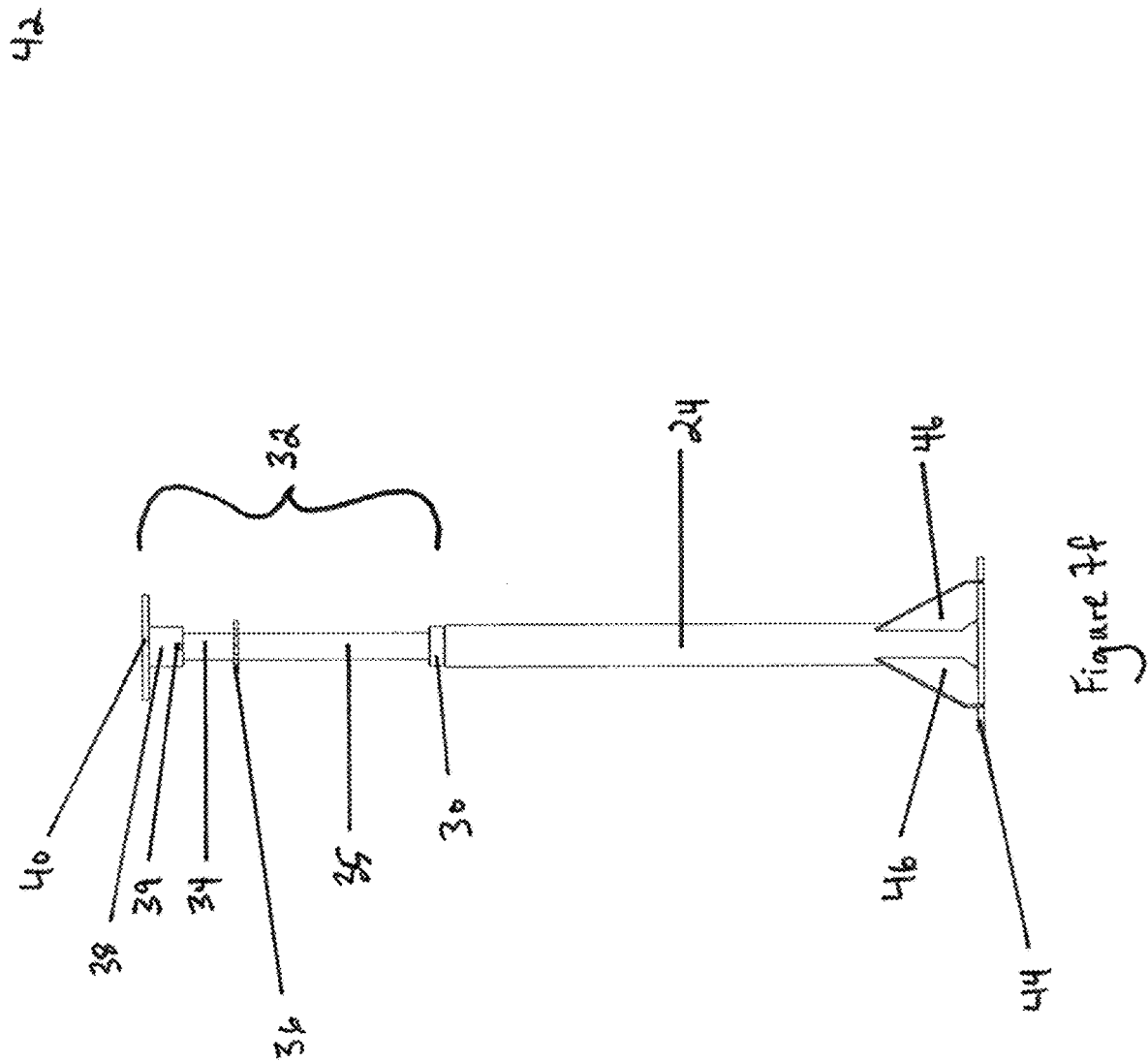

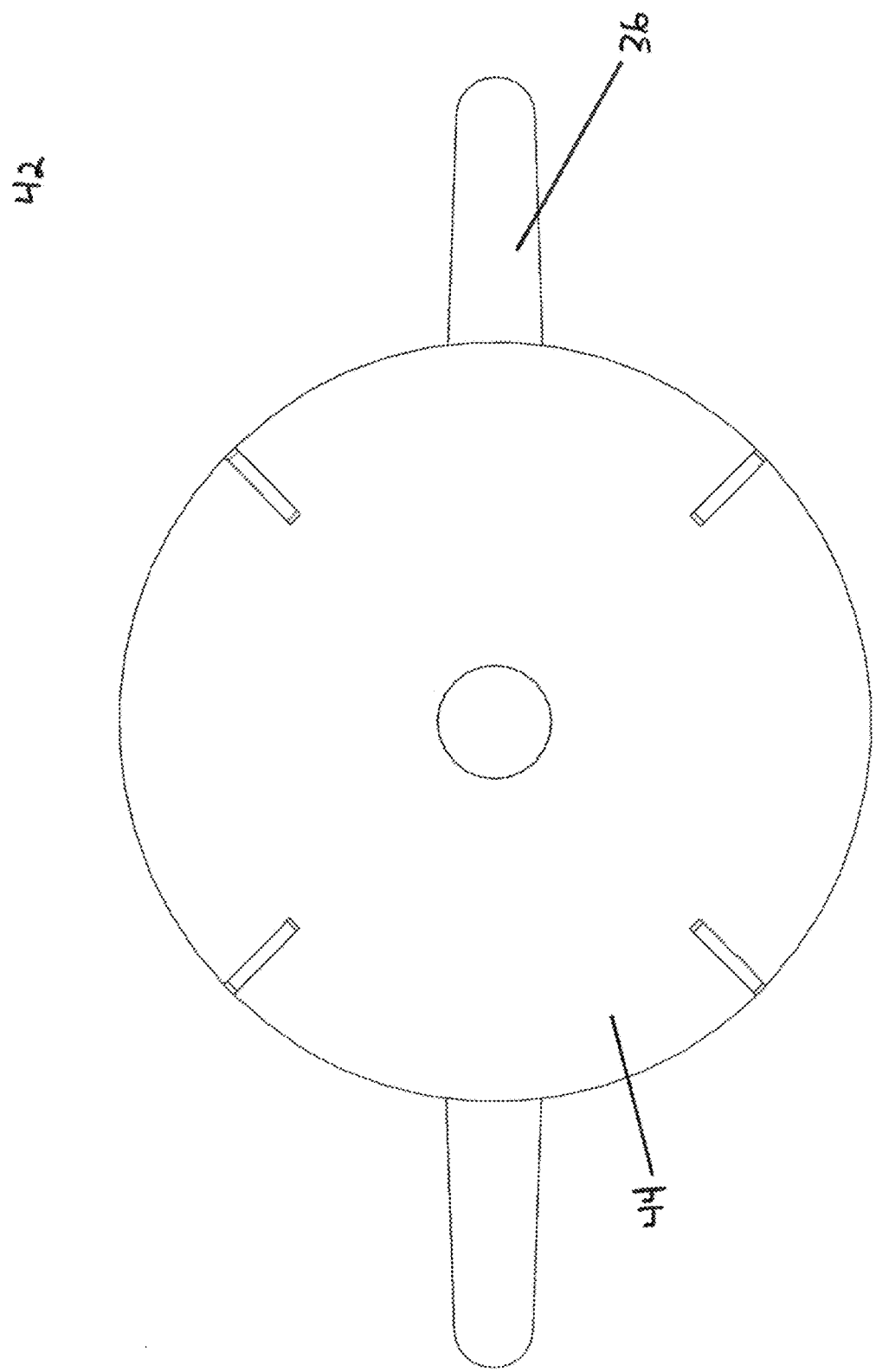

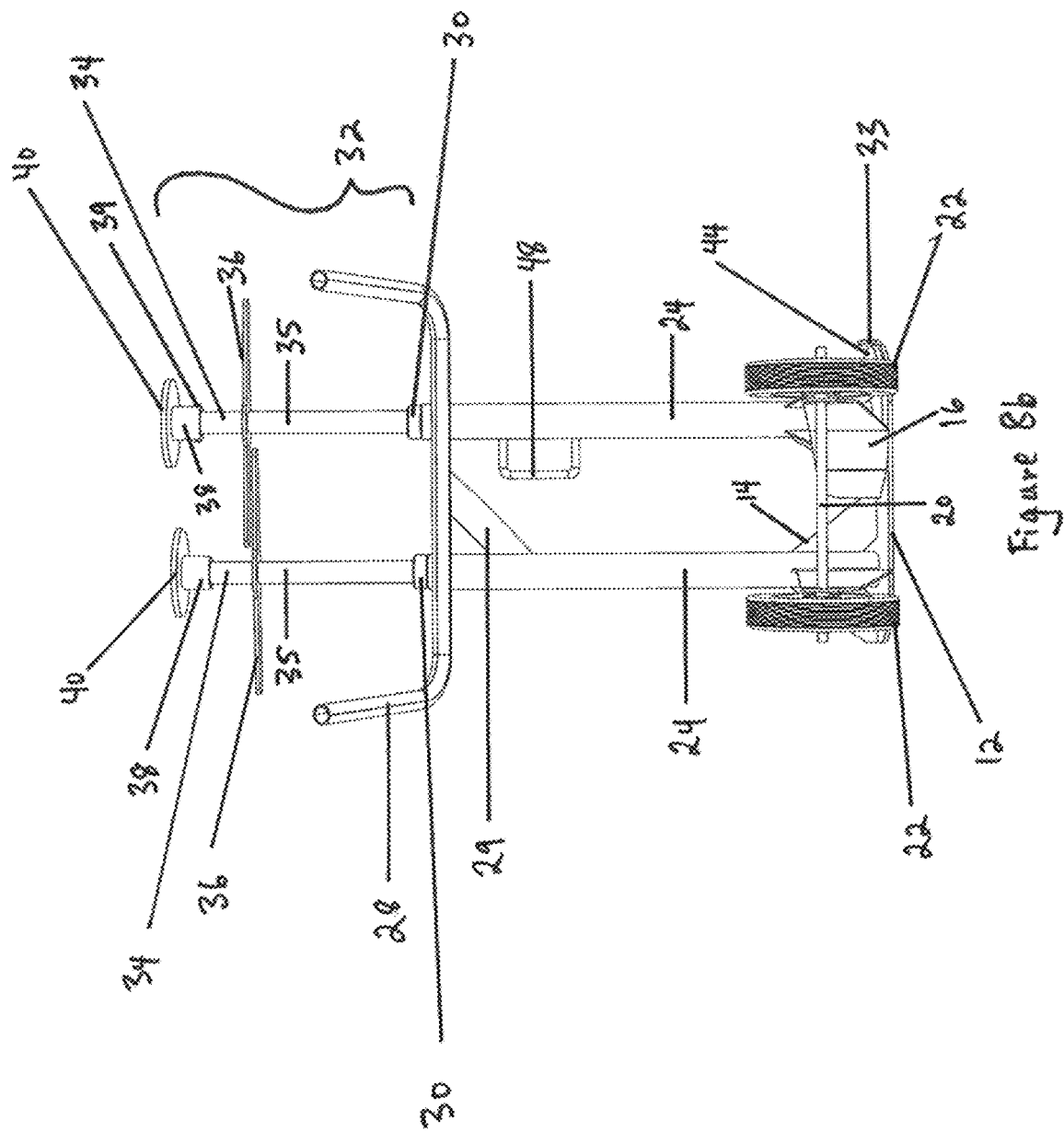

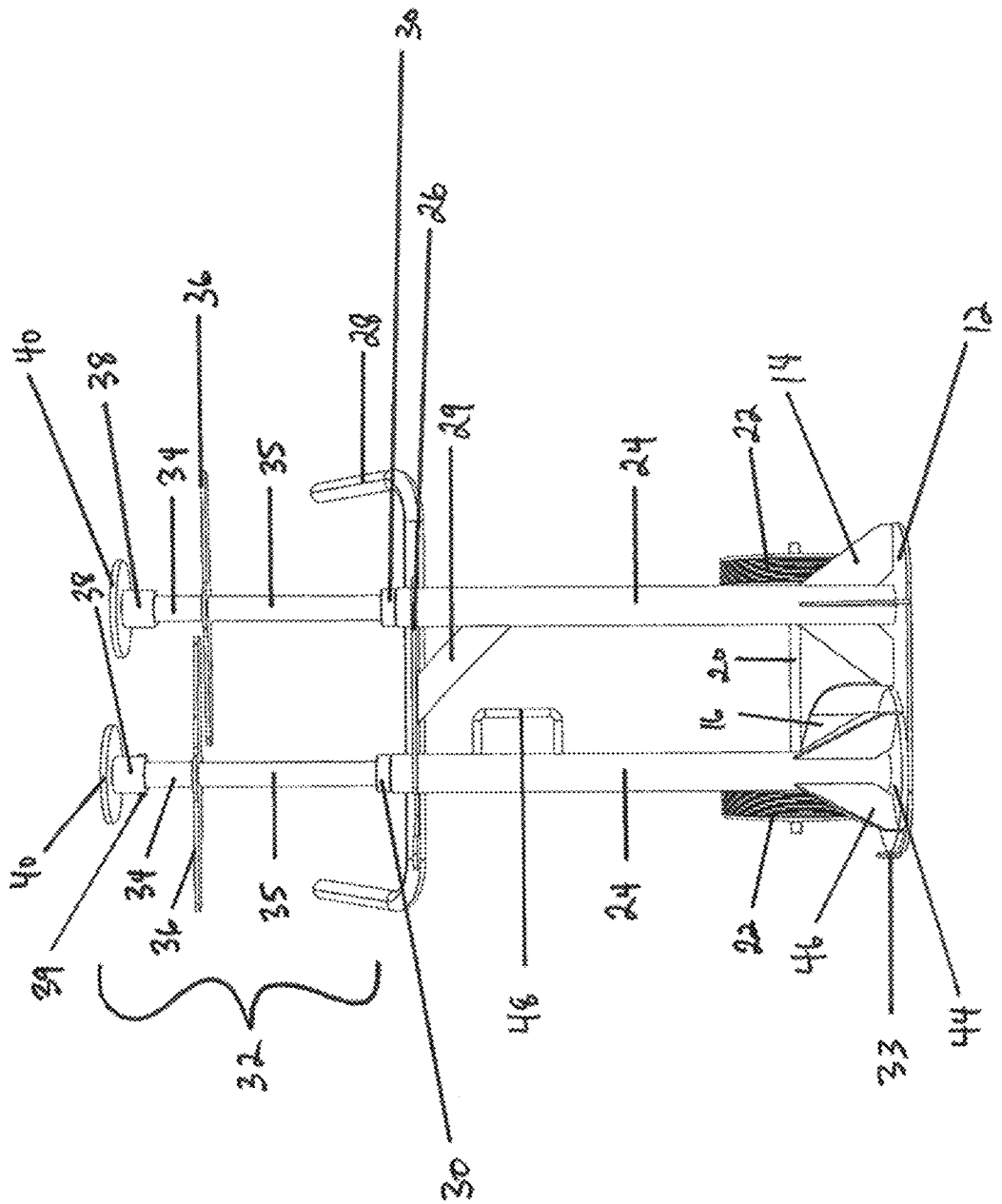

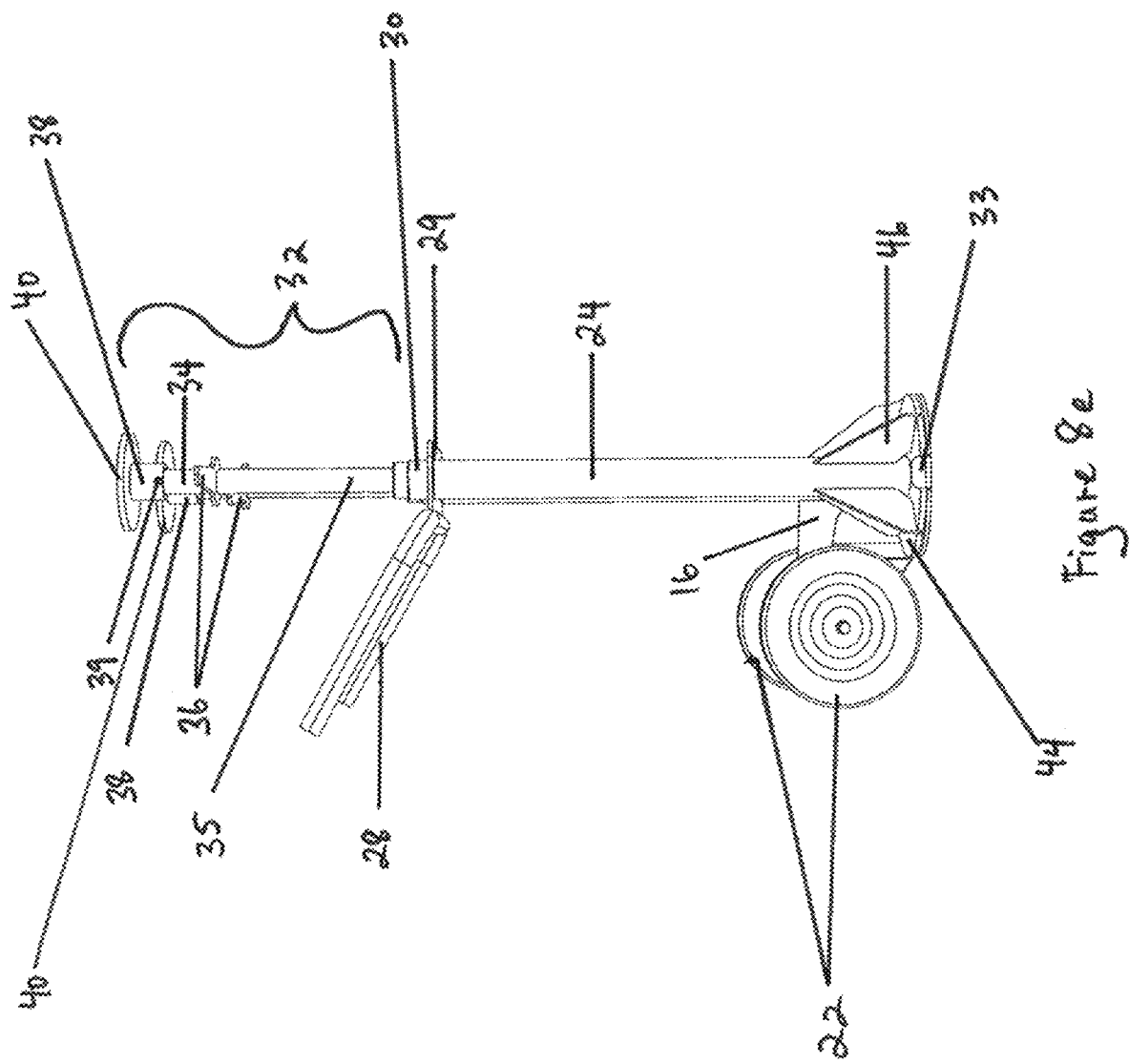

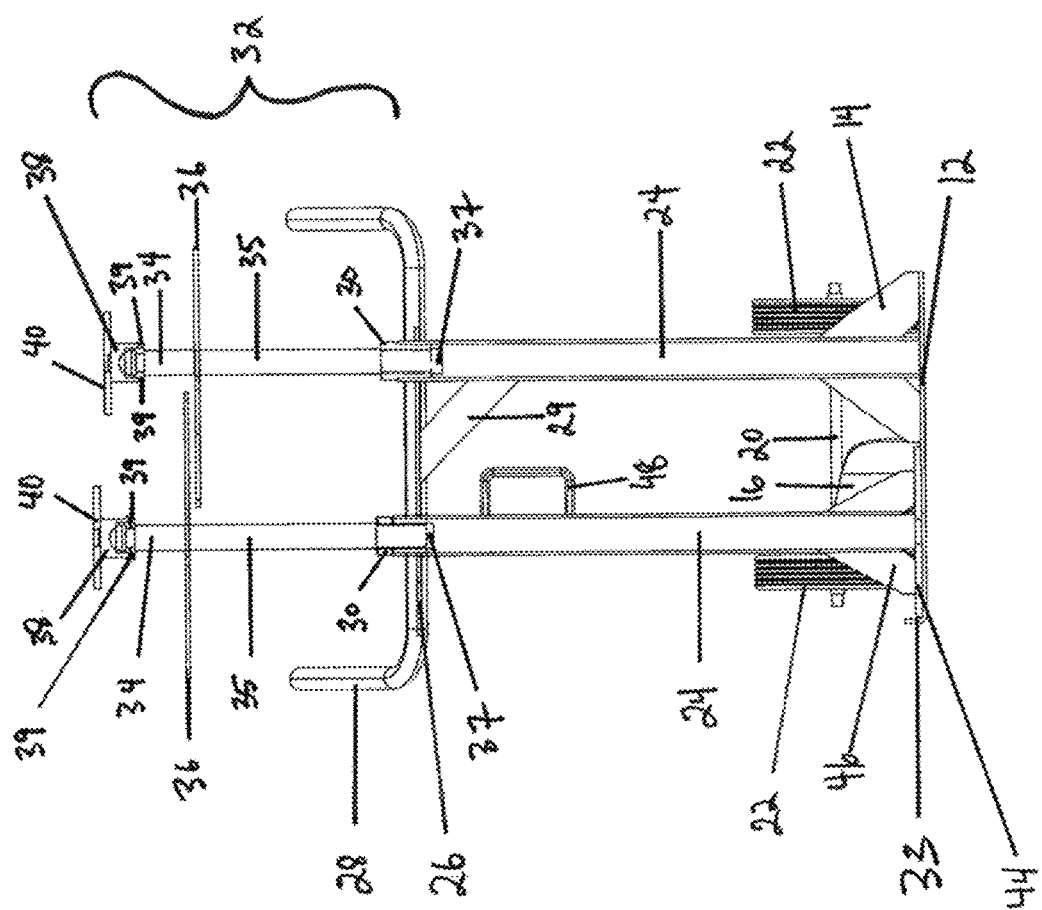

PORTABLE TRAILER STAND

RELATED APPLICATIONS

This application claims the benefit of U.S. Provisional Application No. 62/518,351 filed Jun. 12, 2017, which is hereby incorporated herein by reference.

FIELD OF THE INVENTION

The present invention relates generally to portable trailer stands and more particularly to portable trailer stands comprising more than one trailer stand including, in one embodiment, a transport, which may in itself be a trailer stand, and one or more auxiliary trailer stands.

BACKGROUND OF THE INVENTION

Landing gear for articulated trailers allows the raising, lowering and support of the forward end or nose of the trailer in the engagement with and in the disengagement from, the prime mover (alternatively known as the tractor or truck) and allows the trailer to be freestanding whilst not in transit and when disengaged from the prime mover. In most instances, the trailer itself is decoupled from a prime mover and then re-coupled to either the same prime mover or another prime mover depending on the logistics appropriate to the use.

A typical scenario is where a trailer is delivered to a loading dock for loading and/or unloading. The trailer will typically be loaded up to twenty tons in weight, and in some instances, up to twenty five tons, on one trailer. The prime mover positions the trailer at the loading dock. The operator will de-latch the kingpin from the turntable (alternatively known as the fifth wheel) and disconnect the service lines. The operator will then manually lower the legs of the trailer's landing gear. The operator will then raise the forward end or nose of the trailer to clear the trailer king pin from the turntable of the prime mover. Once the trailer king pin is clear of the prime mover turntable, the prime mover can be driven clear of the trailer to leave the trailer freestanding. The prime mover is then typically utilized elsewhere in a more productive role than being idle whilst the trailer is being loaded and/or unloaded. The trailer will then be loaded and/or unloaded which may take a portion of an hour or it may take several days. Once the trailer is loaded and/or unloaded, a prime mover will then return to the trailer for its removal from the loading dock.

Under certain conditions of loading and/or unloading, there is a potential for trailer nose or tail diving. Seldom used or rusted landing gear may collapse under extreme weight conditions. When fork-trucks load and/or unload at the front of trailers, the trailer can become nose heavy and tip over. An unsupported or poorly supported trailer can collapse with fork-truck and driver inside, creating a hazardous situation. Trailer tip over caused by rusted or faulty landing gear can be very costly with injuries to employees, damage equipment and product and downtime.

Loaded trailers may be dropped when moving between loading docks causing damage to the landing gear components thereby increasing the risk of landing gear failure. Trailer drops can occur when the landing gear legs have not been entirely lowered and an operator pulls away, leaving the trailer at a loading dock with insufficiently lowered legs resulting in a dropped trailer. In addition, trailers are often used beyond their suggested life span further increasing the risk of landing gear failure. Lack of proper maintenance can also increase the possibility of landing gear failure.

Currently, devices known as "trailer jacks" or "trailer stands" are often used to act as a safety support under the front end or nose of a trailer when it is being loaded and/or unloaded with the trailer resting on its support legs rather than on a tractor fifth wheel or converter dolly. Many of these known devices use mechanical means to adjust the height of the support such as cranks and gears that must be ratcheted or cranked up and down. Such devices include the Butler/Kelly Trailer Stand and T&S Models and the Roto Riser™ trailer stand from TMI Inc. Other devices use hydraulic or pneumatic means to adjust the height of the support. One such device is the AUTO-RISER™ trailer stand from TMI Inc. which uses a gas activated levelling system and a security locking pin.

In some instances, trailer stands comprise wheels to facilitate their movement to, and positioning at, the front end or nose of the trailer to support the trailer. With some portable trailer stands, the components required to allow for their movement increase their weight making manual movement and positioning cumbersome and difficult. Furthermore, the costs with some portable trailer stands, including, but not limited to, production costs and shipping costs, are increased due to the additional components and weight required to make them portable. In addition, some wheeled trailer stands have the potential for failure due to roll over.

It is therefore an object of an aspect of the present invention to provide a novel and inventive portable trailer stand. It is also an object of an aspect of the present invention to provide a trailer stand that overcomes some of the disadvantages of prior art trailer stands. Further and other objects of aspects of the present invention will become apparent to those skilled in the art from reading the following summary of the invention and the detailed description of the embodiments described and illustrated herein.

SUMMARY OF THE INVENTION

In accordance with an aspect of the present invention, there is provided a portable trailer stand for temporarily supporting a conventional trailer having a landing gear, said stand comprising: a pedestal having a top for engaging and supporting the underside of the nose portion of a trailer; a bottom for engaging the ground; wheel means mounted at substantially said bottom of said pedestal for moving said stand along the ground to and from a position under the nose portion of a trailer; means for adjusting the height of said pedestal; and a member for engaging and securing an auxiliary trailer stand to said portable trailer stand.

In an embodiment of the present invention, the member has a slot formed therein for engaging and securing the auxiliary trailer stand to said portable trailer stand.

In an embodiment of the present invention, the slot engages the pedestal of the auxiliary trailer stand.

In an embodiment of the present invention, the slot is an L-shaped slot.

In an embodiment of the present invention, said means for adjusting the height of the pedestal is contained within said pedestal.

In an embodiment of the present invention, said means for adjusting the height of the pedestal is an automatic gas activated leveling system.

In an embodiment of the present invention, said means for adjusting the height of the pedestal is a gas shock.

In an embodiment of the present invention, said means for adjusting the height of the pedestal is a jack screw assembly.

In an embodiment of the present invention, said wheel means comprises at least one wheel.

In an embodiment of the present invention, the portable trailer stand further comprises at least one handle connected to said pedestal whereby the pedestal is manually moveable to and from a position under the nose portion of a trailer.

In accordance with another aspect of the present invention, there is provided a portable trailer stand comprising: a top plate for engaging the underside of the nose portion of a trailer; a base pad for engaging the ground; at least one wheel mounted on said base pad for moving said stand along the ground to and from a position under the nose portion of a trailer; a post assembly extending upwardly from said base pad to said top plate; a member connected to said post assembly for engaging and supporting an auxiliary trailer stand; and means for adjusting the height of said post assembly.

In an embodiment of the present invention, the member has a slot formed therein for engaging and securing the auxiliary trailer stand to said portable trailer stand.

In an embodiment of the present invention, the slot engages the post assembly of the auxiliary trailer stand.

In an embodiment of the present invention, the slot is an L-shaped slot.

In an embodiment of the present invention, said post assembly comprises a lower post extending upwardly from said base pad and an upper post extending downwardly from said top plate, said lower post defined by a hollow core configured to accept said upper post therein such that there is a telescoping arrangement between said upper post and said lower post.

In an embodiment of the present invention, said means for adjusting the height of said post assembly is contained within said post assembly.

In an embodiment of the present invention, the portable trailer stand further comprises at least one handle connected to said post assembly for manually moving said stand to and from a position under the nose portion of a trailer.

In an embodiment of the present invention, said base pad of said trailer stand comprises at least one hole to drain rainwater collected thereon.

In accordance with another aspect of the present invention, there is provided a portable trailer stand having a longitudinal vertical axis, said stand comprising: a base for engaging the ground; at least one wheel mounted on said base for moving said stand along the ground to and from a position under the nose portion of a trailer; a load plate axially spaced above said base for engaging the underside of the nose portion of a trailer; an elongated axially extending tubular column having opposing upper and lower ends, the lower end thereof received by said base; a support plate connected to said column for engaging an auxiliary trailer stand; an elongated axially extending jack screw assembly having an upper portion and a lower portion, said lower portion comprising a tubular externally threaded screw member terminating at a lower end and said upper portion comprising a generally solid core member terminating at an upper end, said screw member being threadedly received by said column whereby said jack screw assembly moves together as a unit relative to said column; means for adjustably securing said load plate to the upper end of the core member; and a handle carried by said core member in the space between the top surface of said screw member and said load plate for rotating said jack screw assembly in opposite directions relative to said column and thereby raising or lowering said jack screw and said load plate.

In an embodiment of the present invention, the support plate has a slot formed therein for engaging and securing the auxiliary trailer stand to said portable trailer stand.

In an embodiment of the present invention, the slot engages the column of the auxiliary trailer stand.

In an embodiment of the present invention, the slot is an L-shaped slot.

In an embodiment of the present invention, a threaded nut is received in the upper end portion of the column and said screw member is threadedly received by said threaded nut.

In an embodiment of the present invention, said means provided for securing said load plate to said core member comprises a ball and ball seat, wherein the ball and a groove is provided in the upper end of the core member and the load plate comprises a downwardly opening axially extending tubular socket forming the ball seat that receives the ball wherein said socket contacts said ball and a pin is mounted on said load plate for movement in said groove.

In an embodiment of the present invention, said column is provided with a generally radially extending handle for use in maneuvering said portable trailer stand into position under a trailer.

In accordance with an aspect of the present invention, there is provided a combination of a portable trailer stand and an auxiliary trailer stand, both said portable trailer stand and said auxiliary trailer stand for temporarily supporting a conventional trailer having a landing gear, both of said portable trailer stand and said auxiliary trailer stand comprising: a pedestal having a top for engaging and supporting the underside of the nose portion of a trailer; a bottom for engaging the ground; and means for adjusting the height of said pedestal; wherein said portable trailer stand further comprises a member for engaging and securing said auxiliary trailer stand to said portable trailer stand and wheel means mounted at substantially said bottom of said pedestal for moving said portable trailer stand along the ground to and from a position under the nose portion of a trailer.

In accordance with another aspect of the present invention, there is provided a combination portable trailer stand and auxiliary trailer stand wherein both said portable trailer stand and said auxiliary trailer stand comprise: a top plate for engaging the underside of the nose portion of a trailer; a base pad for engaging the ground; a post assembly extending upwardly from said base pad to said top plate; and means for adjusting the height of said post assembly; wherein said portable trailer stand further comprises a member connected to said post assembly for engaging and supporting said auxiliary trailer stand and at least one wheel mounted on said base pad for moving said portable trailer stand along the ground to and from a position under the nose portion of a trailer.

In accordance with another aspect of the present invention, there is provided a combination portable trailer stand and auxiliary trailer stand, both of said portable trailer stand and said auxiliary trailer stand having a longitudinal vertical axis and comprising: a base for engaging the ground; a load plate axially spaced above said base for engaging the underside of the nose portion of a trailer; an elongated axially extending tubular column having opposing upper and lower ends, the lower end thereof received by said base; an elongated axially extending jack screw assembly having an upper portion and a lower portion, said lower portion comprising a tubular externally threaded screw member terminating at a lower end and said upper portion comprising a generally solid core member terminating at an upper end, said screw member being threadedly received by said column whereby said jack screw assembly moves together as a unit relative to said column; means for adjustably securing said load plate to the upper end of the core member; and a handle carried by said core member in the space between the top surface of said screw member and said load plate for rotating said jack screw assembly in opposite directions relative to said column and thereby raising or lowering said jack screw and said load plate; wherein said portable trailer stand further comprises a support plate connected to said column for engaging said auxiliary trailer stand and at least one wheel mounted on said base for moving said portable trailer stand along the ground to and from a position under the nose portion of a trailer.

In accordance with another aspect of the present invention, there is provided a transport for transporting a trailer stand, the transport comprising: a base; a central member comprising a handlebar, the central member connected to the base; a plurality of wheels rotatably connected to the base; at least one mounting peg extending from the base configured to interact with a component of a trailer stand during transport of the trailer stand; and at least one mounting pin connected to the central member configured to interact with another component of the trailer stand during transport of the trailer stand.

In another embodiment, the transport comprises two wheels rotatably connected to the base.

In another embodiment, the at least one mounting peg in inserted into an aperture of the trailer stand when transporting the trailer stand.

In another embodiment, the at least one mounting pin is inserted through a catch of the trailer stand when transporting the trailer stand.

In yet another embodiment, the transport comprises two mounting pegs, wherein one mounting peg is configured to interact with a component from a first trailer stand during transport of the first trailer stand, and the other mounting peg is configured to interact with a component from a second trailer stand during transport of the second trailer stand.

In yet another embodiment, the transport comprises two mounting pins, wherein one mounting pin is configured to interact with a component from a first trailer stand during transport of the first trailer stand, and the other mounting pin is configured to interact with a component from a second trailer stand during transport of the second trailer stand.

In still yet another embodiment, the transport further comprises an acme nut connected to the central member configured to receive a mounting platform.

In still yet another embodiment, the mounting platform is height adjustable.

In still yet another embodiment, the transport is provided in combination with the trailer stand. In yet another embodiment, the transport is provided in combination with two trailer stands.

Further advantages of the present invention will become apparent to those skilled in the art from reading the following detailed description of the embodiments described and illustrated herein.

BRIEF DESCRIPTION OF THE DRAWINGS

The present invention will be further understood from the following detailed description of the embodiments with reference to the following drawings in which:

FIG. 2 is a front elevation view of the portable trailer stand of FIG. 1;

FIG. 3 is a back elevation view of the portable trailer stand of FIG. 1;

FIG. 4 is a left side elevation view of the portable trailer stand of FIG. 1;

FIG. 5 is a right side elevation view of the portable trailer stand of FIG. 1;

FIG. 7a is an isometric view of the auxiliary trailer stand in accordance with an aspect of the invention;

FIG. 7b is a front elevation view of the auxiliary trailer stand of FIG. 7a;

FIG. 7c is a back elevation view of the auxiliary trailer stand of FIG. 7a;

FIG. 7d is a back elevation cross sectional view of the top portion of the auxiliary trailer stand of FIG. 7a;

FIG. 7e is a left side elevation view of the auxiliary trailer stand of FIG. 7a;

FIG. 7f is a right side elevation view of the auxiliary trailer stand of FIG. 7a;

FIG. 7g is a top view of the auxiliary trailer stand of FIG. 7a;

FIG. 7h is a bottom view of the auxiliary trailer stand of FIG. 7a;

FIG. 8a is an isometric view of the portable trailer stand of FIG. 1 in association with the auxiliary trailer stand of FIG. 7a;

FIG. 8b is a front elevation view of the portable trailer stand of FIG. 1 in association with the auxiliary trailer stand of FIG. 7a;

FIG. 8c is a back elevation view of the portable trailer stand of FIG. 1 in association with the auxiliary trailer stand of FIG. 7a;

FIG. 8d is a left side elevation view of the portable trailer stand of FIG. 1 in association with the auxiliary trailer stand of FIG. 7a;

FIG. 8e is a right side elevation view of the portable trailer stand of FIG. 8f in association with the auxiliary trailer stand of FIG. 7a;

FIG. 8f is a top view of the portable trailer stand of FIG. 1 in association with the auxiliary trailer stand of FIG. 7a;

FIG. 8g is a bottom view of the portable trailer stand of FIG. 1 in association with the auxiliary trailer stand of FIG. 7a;

FIG. 8h is an exploded view of the portable trailer stand of FIG. 1 in association with the auxiliary trailer stand of FIG. 7a;

FIG. 8i is a back elevation cross-sectional view of the portable trailer stand of FIG. 1 in association with the auxiliary trailer stand of FIG. 7a;

Figure 1:
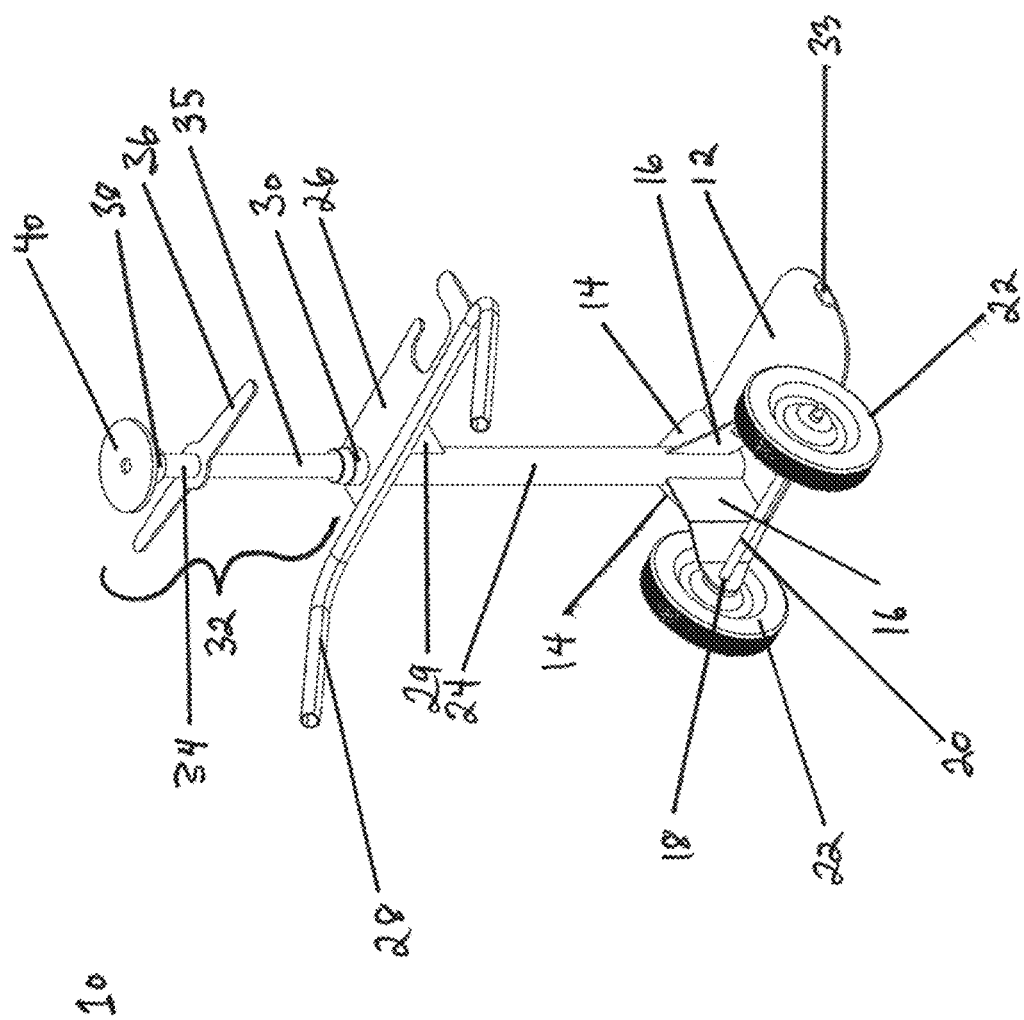
FIG. 1 is an isometric view of a portable trailer stand in accordance with an aspect of the invention.

Similar references are used in different figures to denote similar components.

DETAILED DESCRIPTION OF THE EMBODIMENTS

Turning now to FIGS. 1 to 6f, a portable trailer stand in accordance with an aspect of the present invention is shown and is generally identified by reference numeral 10. The portable trailer stand 10 comprises a base 12, two (2) base gussets 14, two (2) wheel gussets 16 having axle apertures 18, an axle 20 passing through the axle apertures 18 of the wheel gussets 16, wheels 22, a vertical support member 24 extending from, and perpendicular to, the base 12, a support plate 26, a handlebar 28 connected to the support plate 26, a support plate gusset 29 extending from the vertical support member 24 to the support plate 26, an acme nut 30, and a platform 32.

In this embodiment, the base gussets 14 extend from the base 12 and are connected to the base 12 and the vertical support member 24. The base gussets 14 provide additional rigidity to the base 12 and support the vertical support member 24. The wheel gussets 16 extend from the base 12 and are connected to the base 12 and the vertical support member 24. The wheel gussets 16 provide additional rigidity to the base 12 and support for the wheels 22. In this embodiment, the base gussets 14 and the wheel gussets 16 are welded to the base 12 and the vertical support member 24. The wheel gussets 16 have axle apertures 18 for insertion of the axle 20. The base 12 further comprises a guide 33 which extends from, and is perpendicular to, the base 12. The guide 33 interacts with an auxiliary trailer stand as will be described below.

The axle 20 passes through the axle apertures 18 in the wheel gussets 16. The wheels 22 are mounted on either longitudinal end of the axle 20. The vertical support member 24 is hollow and further comprises the acme nut 30 at an end opposite the base 12. The acme nut 30 interacts with the platform 32 as will be described below.

Figure 6B:
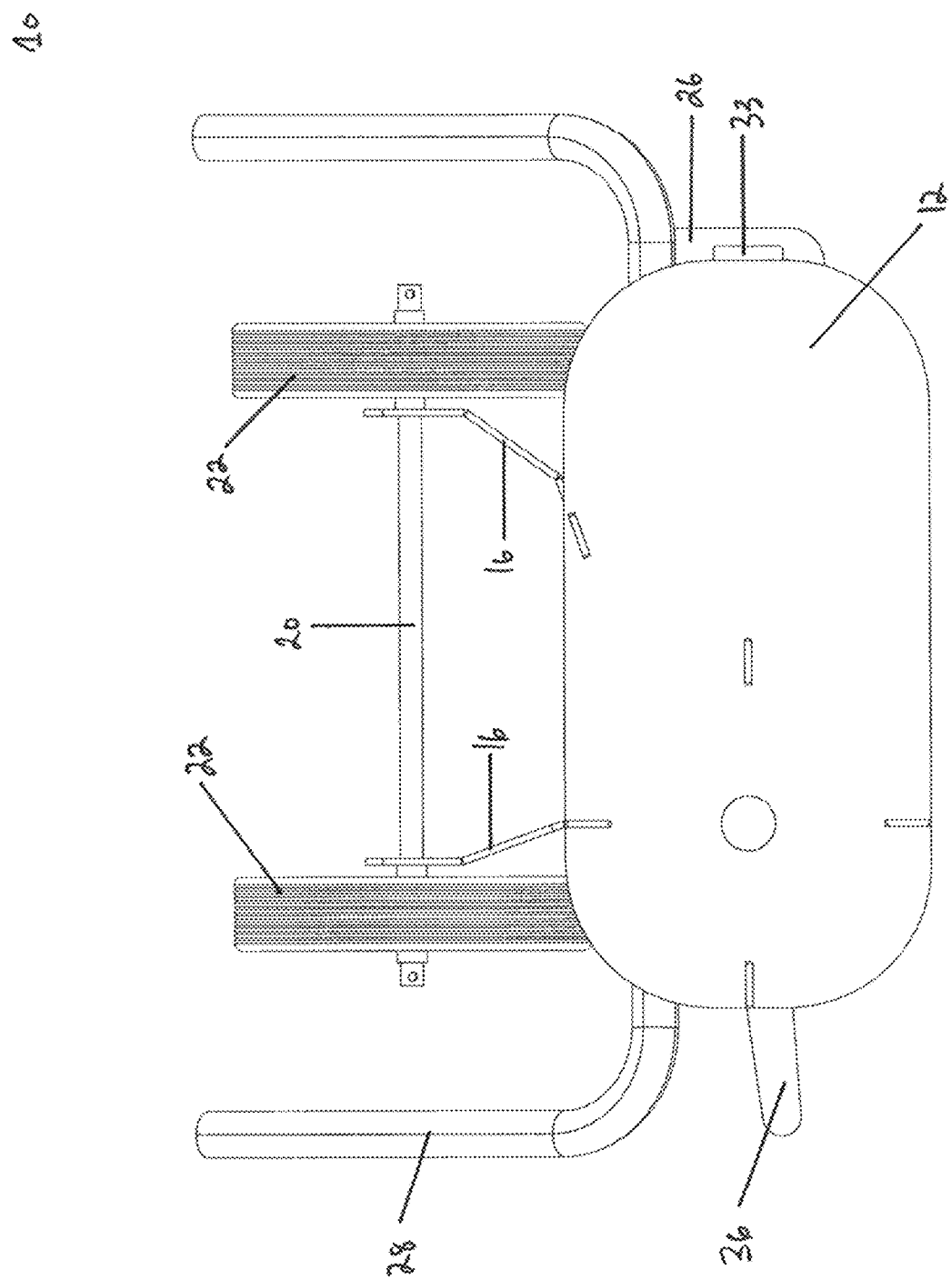
FIG. 6b is a bottom view of the portable trailer stand of FIG. 1.
Figure 6C:
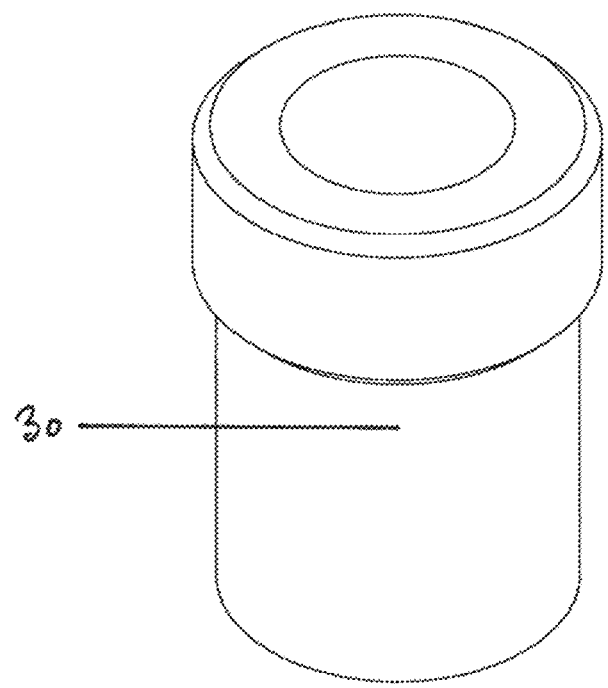
FIG. 6c is an isometric view of the acme nut of the portable trailer stand of FIG. 1.
Figure 6D:
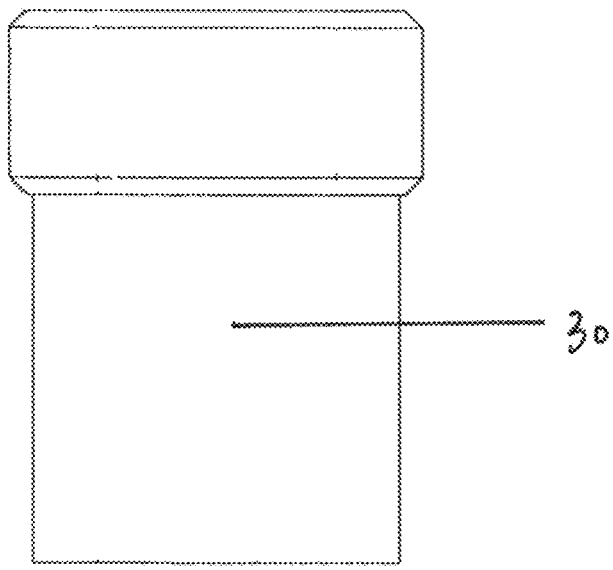
FIG. 6d is a front elevation view of the acme nut of the portable trailer stand of FIG. 1.

FIGS. 6c and 6d illustrate the acme nut 30. The acme nut 30 in this embodiment, is drilled and machined to accommodate the acme thread 35 therein.

The platform 32 is height adjustable and comprises an acme rod 34, a handle 36 connected to the acme rod 34, a mount 38, and a pad 40. The acme rod 34 comprises an acme thread 35 that rotates within the acme nut 30. In this embodiment, there is a single flat handle 36 welded to the acme rod 34 above the acme thread 35. Rotation of the acme rod 34 via the handle 36 moves the acme thread 35 within the acme nut 30 thereby adjusting the height of the platform 32. The mount 38 is connected to the acme rod 34 and to the pad 40. The pad 40 is configured to support the nose portion of a trailer as will be described. In this embodiment, the pad 40 is generally circular and is welded to the mount 38.

Figures 6E, 6F:
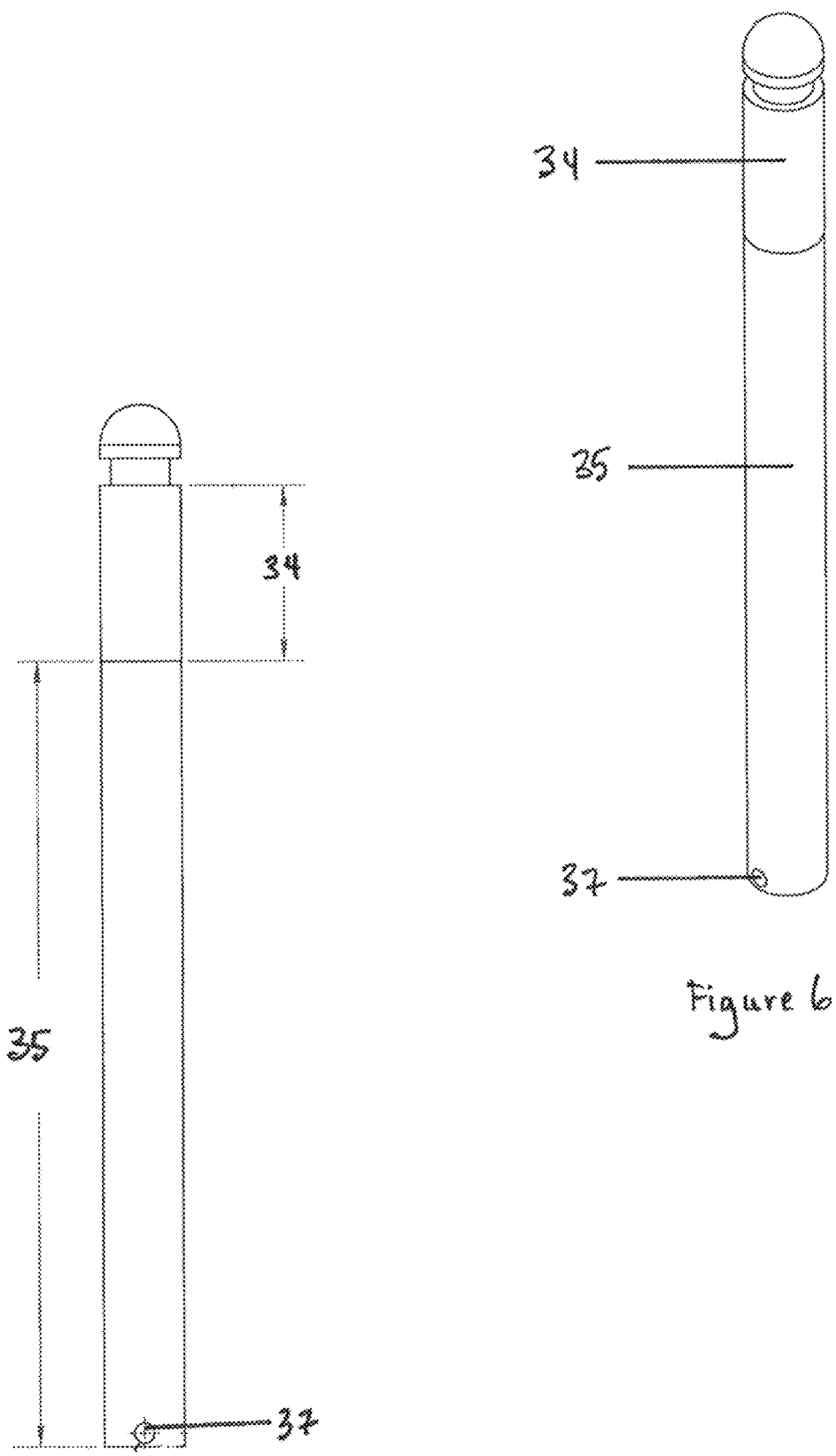
FIG. 6e is an isometric view of the acme rod and acme screw of the portable trailer stand of FIG. 1.
FIG. 6f is an front elevation view of the acme rod and acme screw of the portable trailer stand of FIG. 1.
Figure 7D:
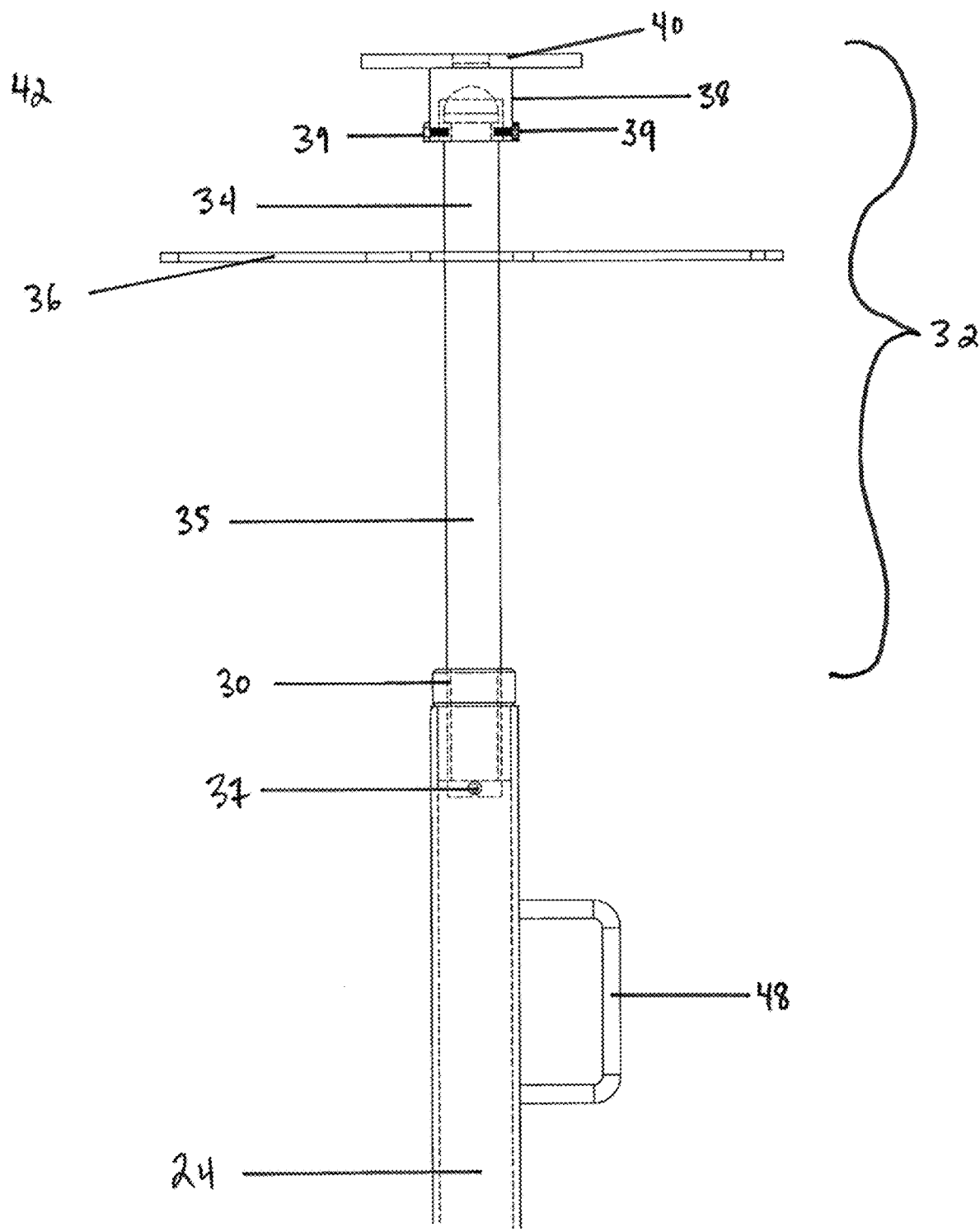
Figure 7G:
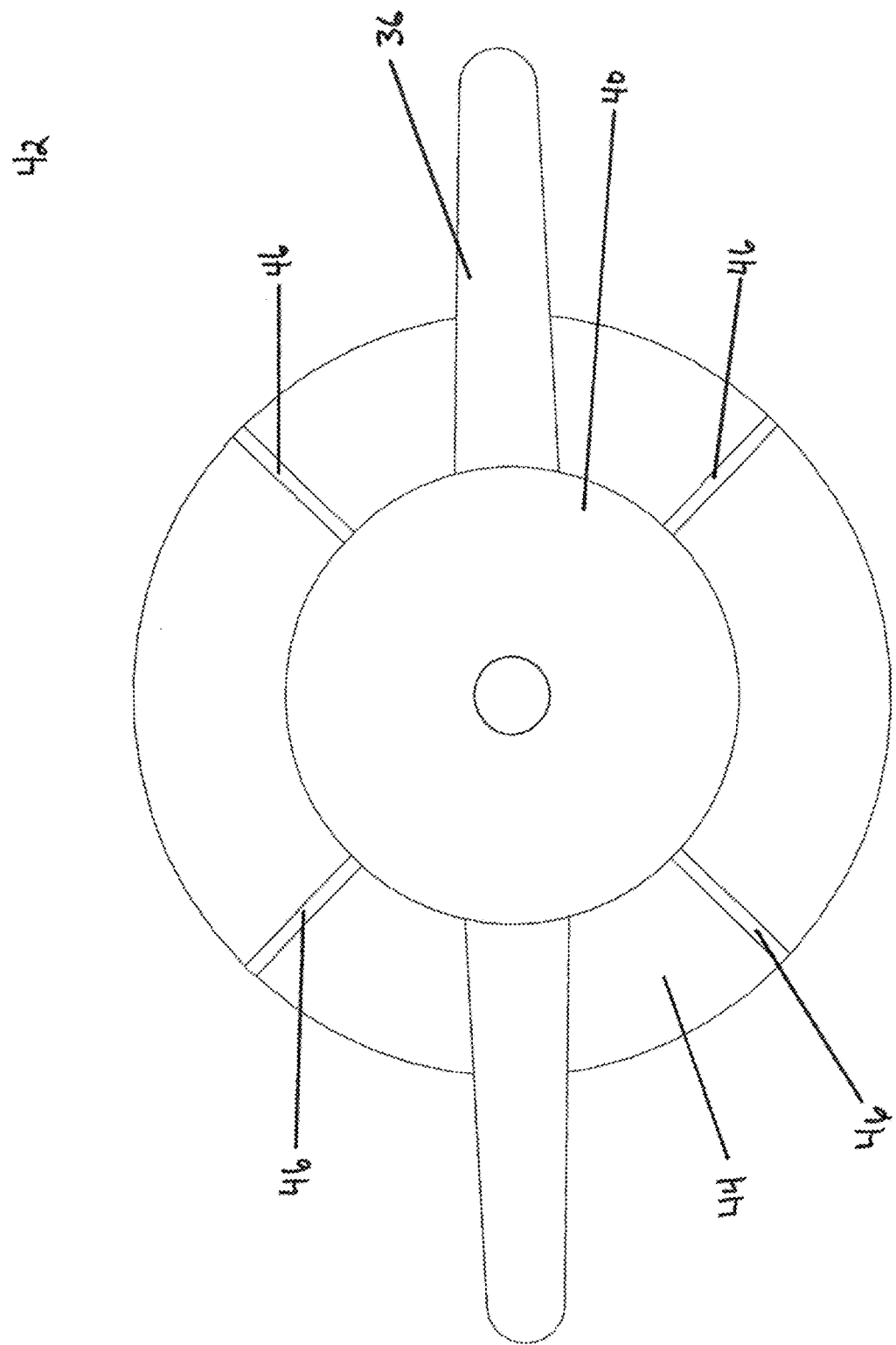
Figure 6A:
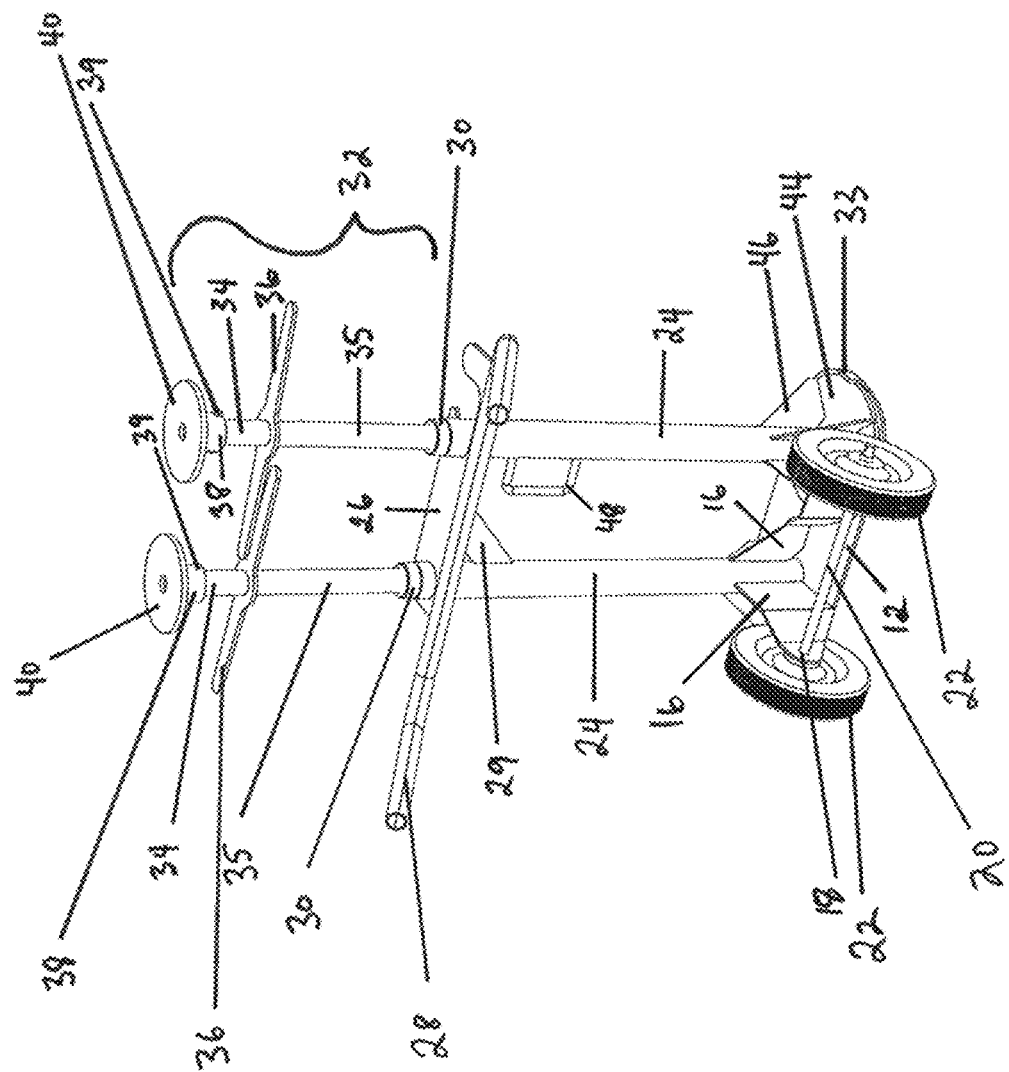
FIG. 6a is a top view of the portable trailer stand of FIG. 1.
Figure 6D:
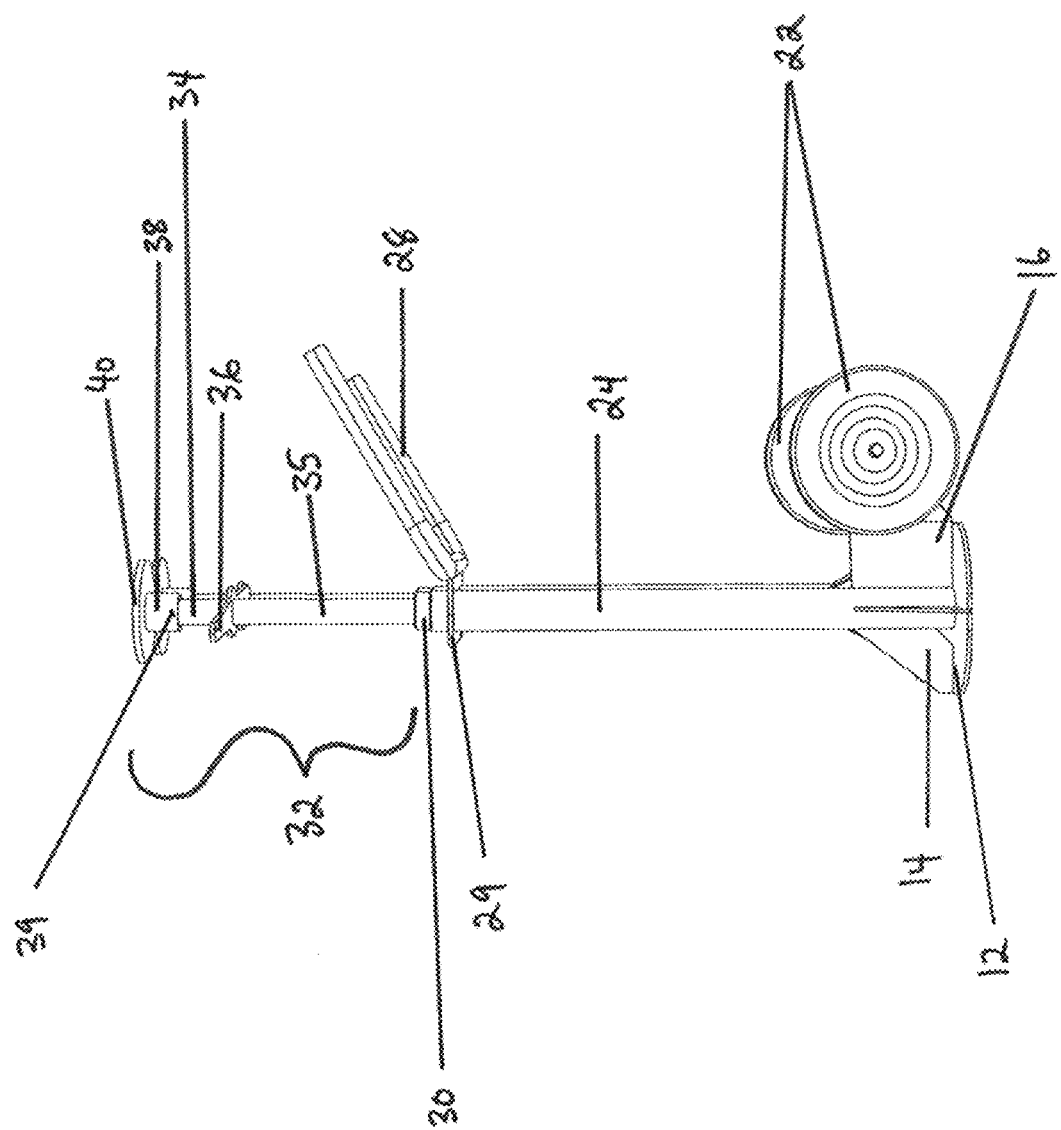
Figure 9F:
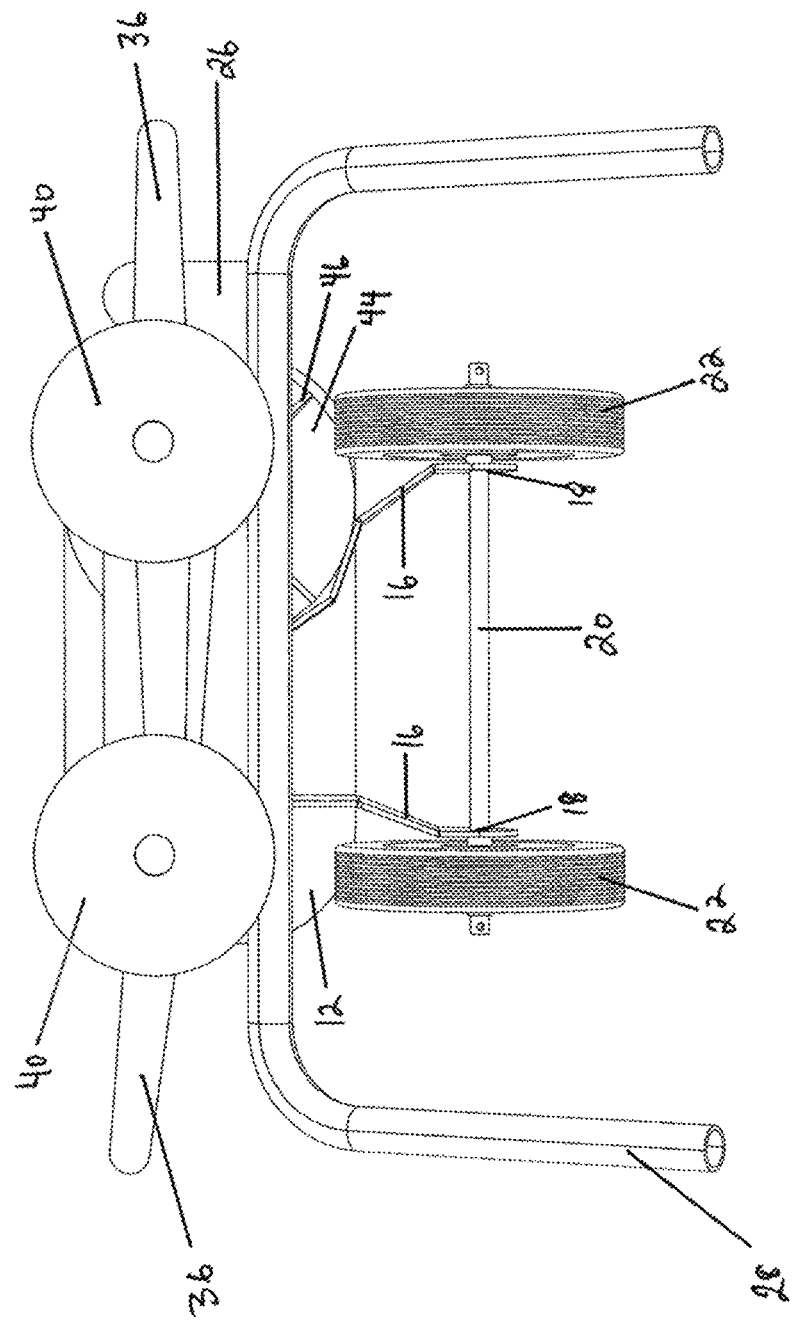
FIG. 9 is a perspective view of a portable trailer stand in accordance with another aspect of the invention.
Figure 8G:
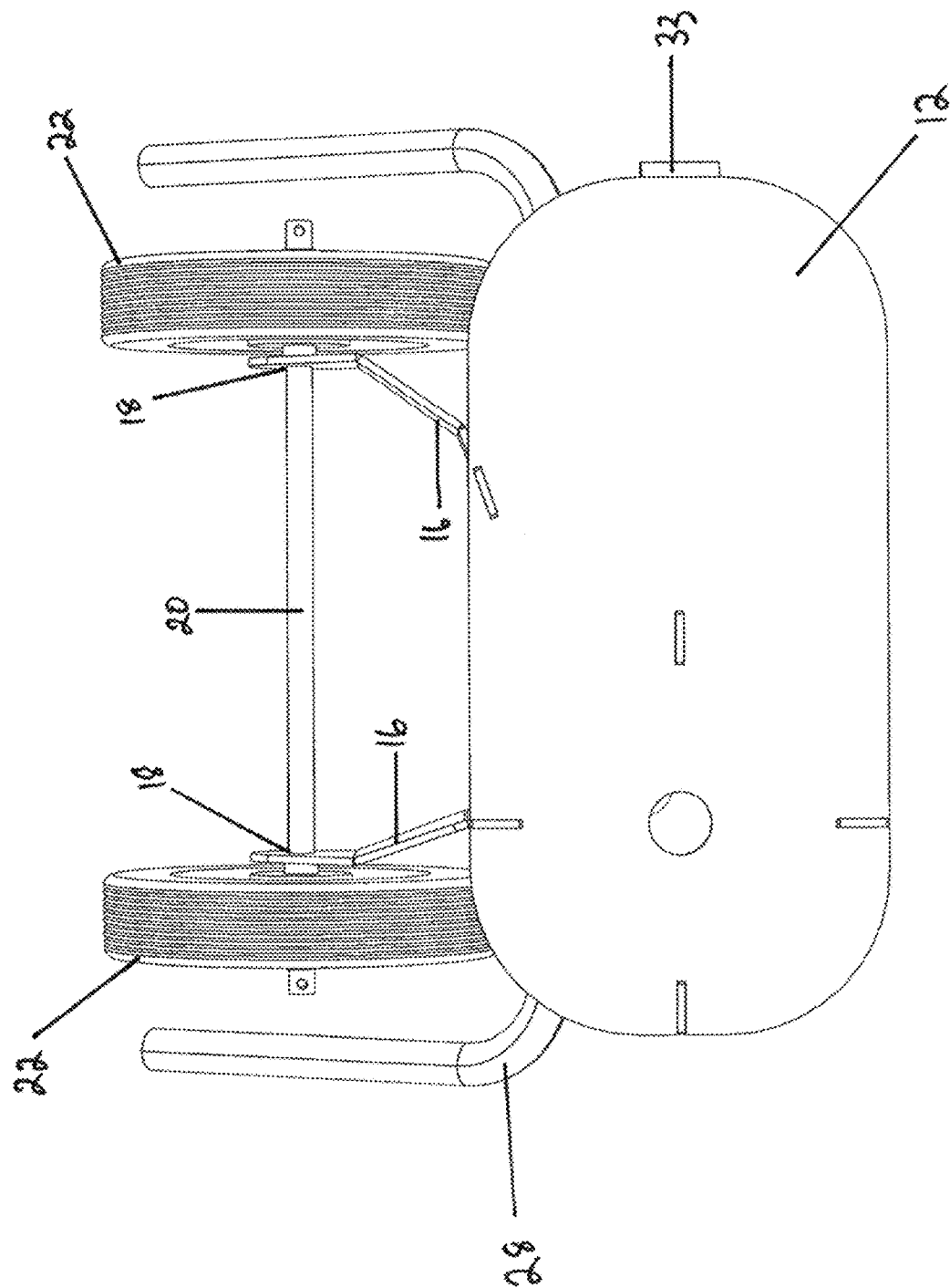
Figure 8H:
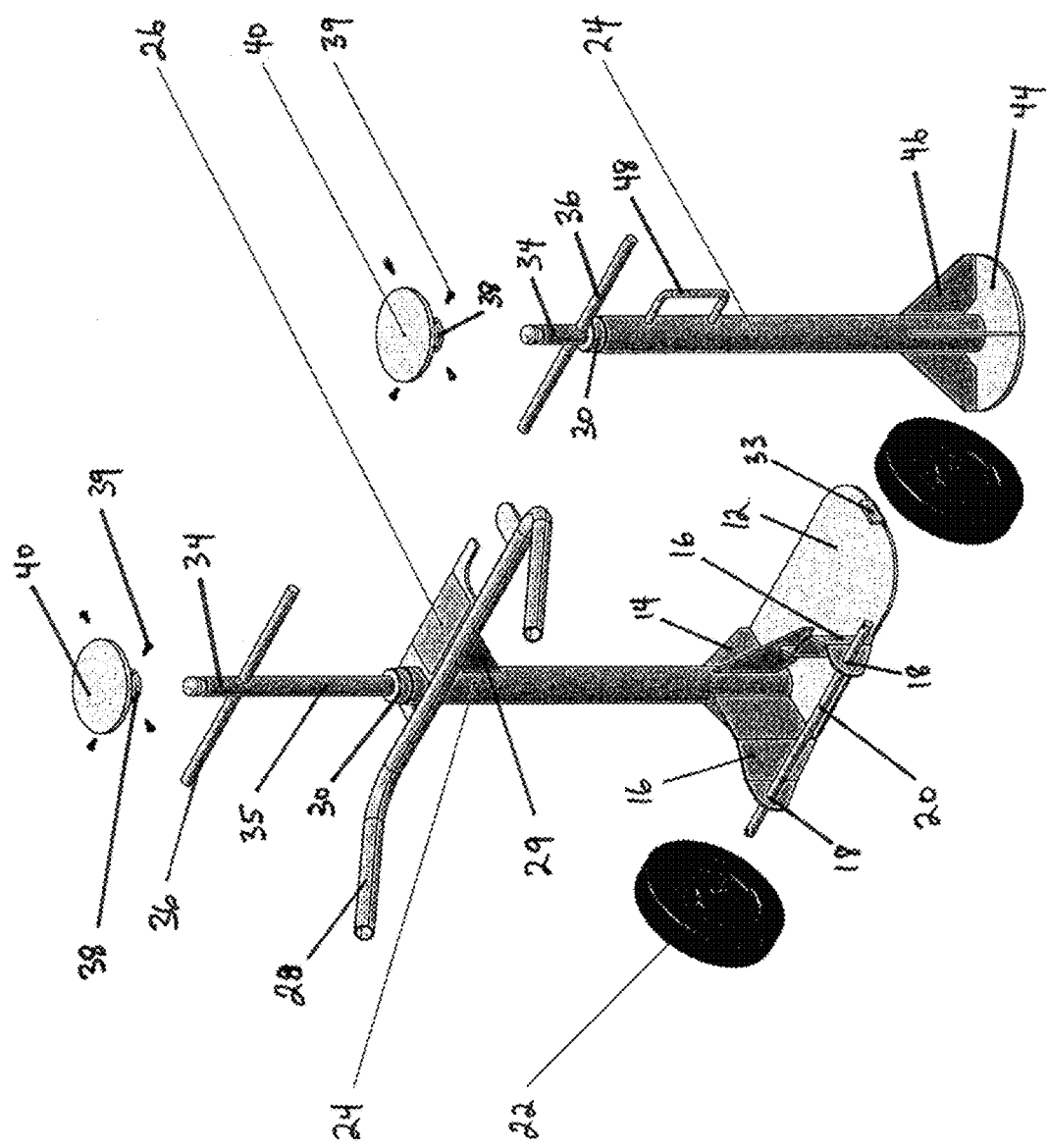
Figure 9:
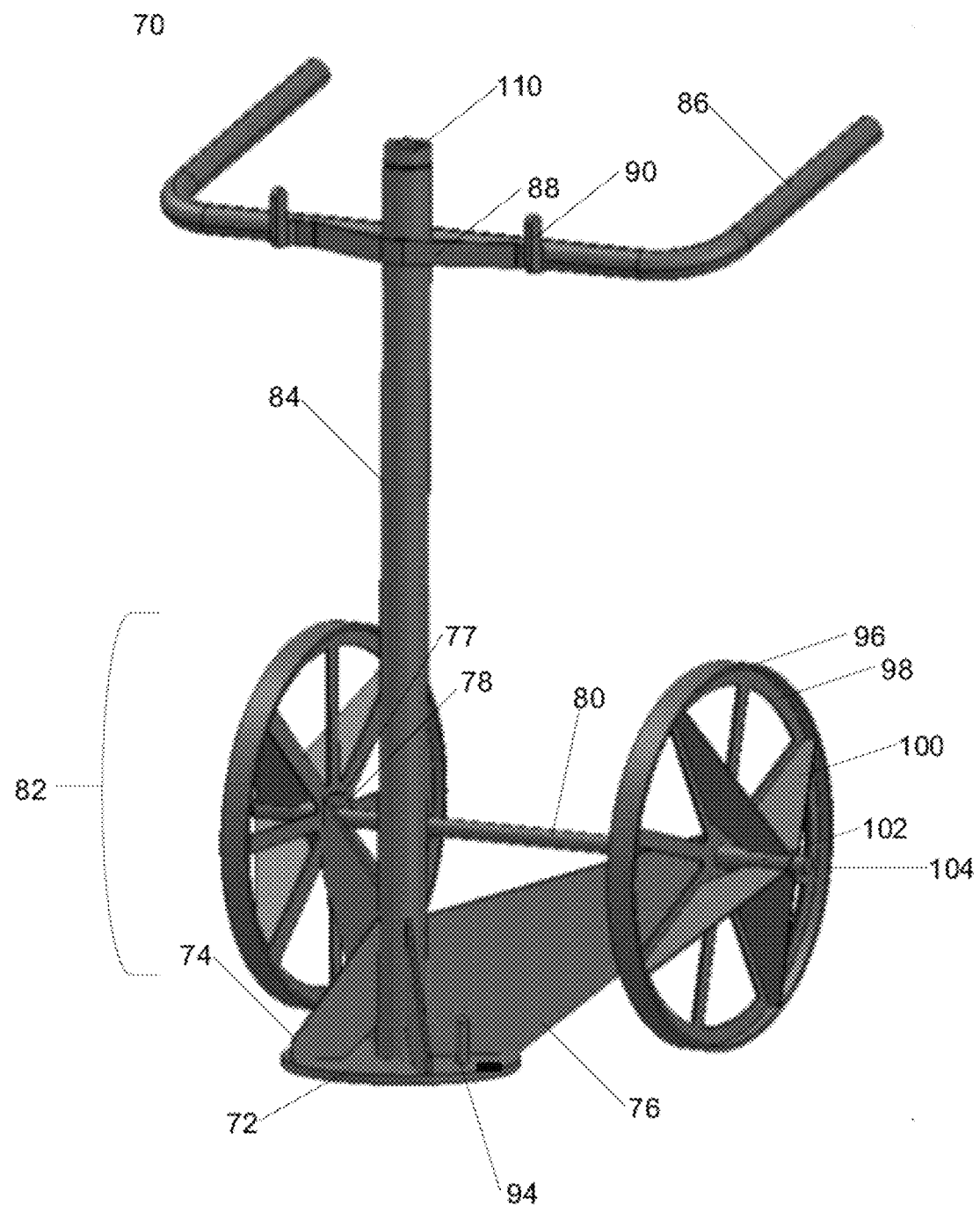
Figure 10:
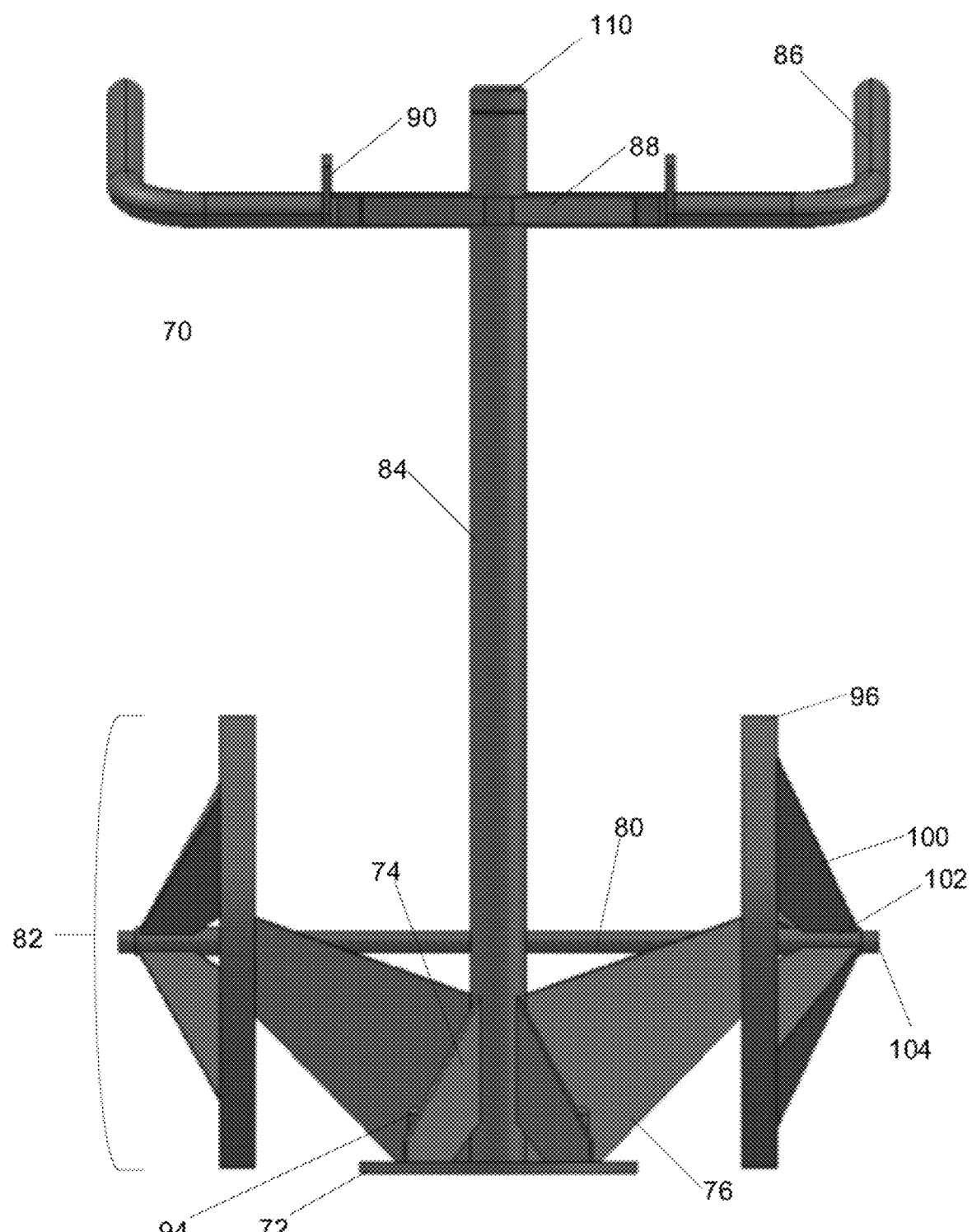
FIG. 10 is a front elevation view of the portable trailer stand of FIG. 9.
Figure 11:
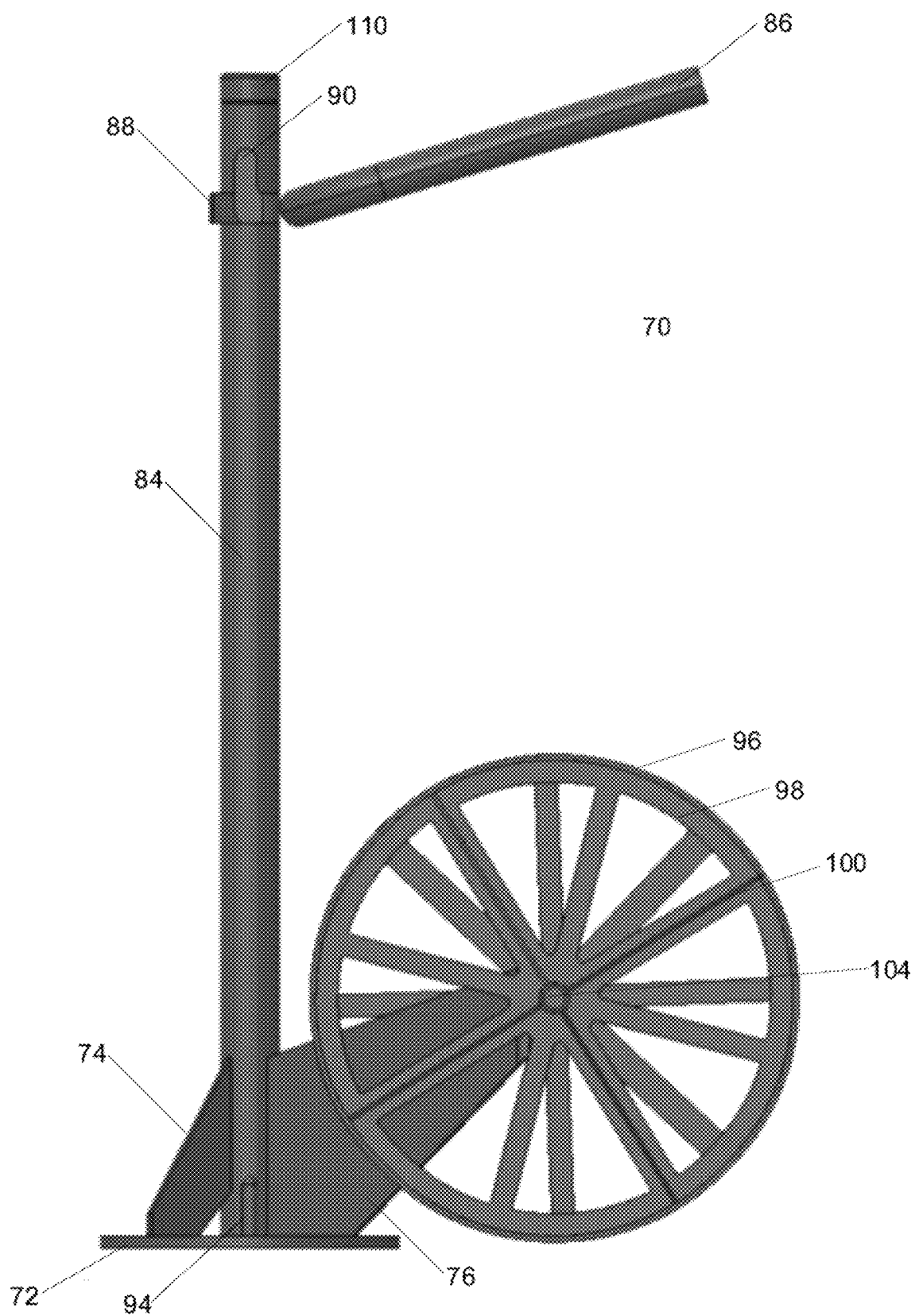
FIG. 11 is a side elevation view of the portable trailer stand of FIG. 9.
Figure 12:
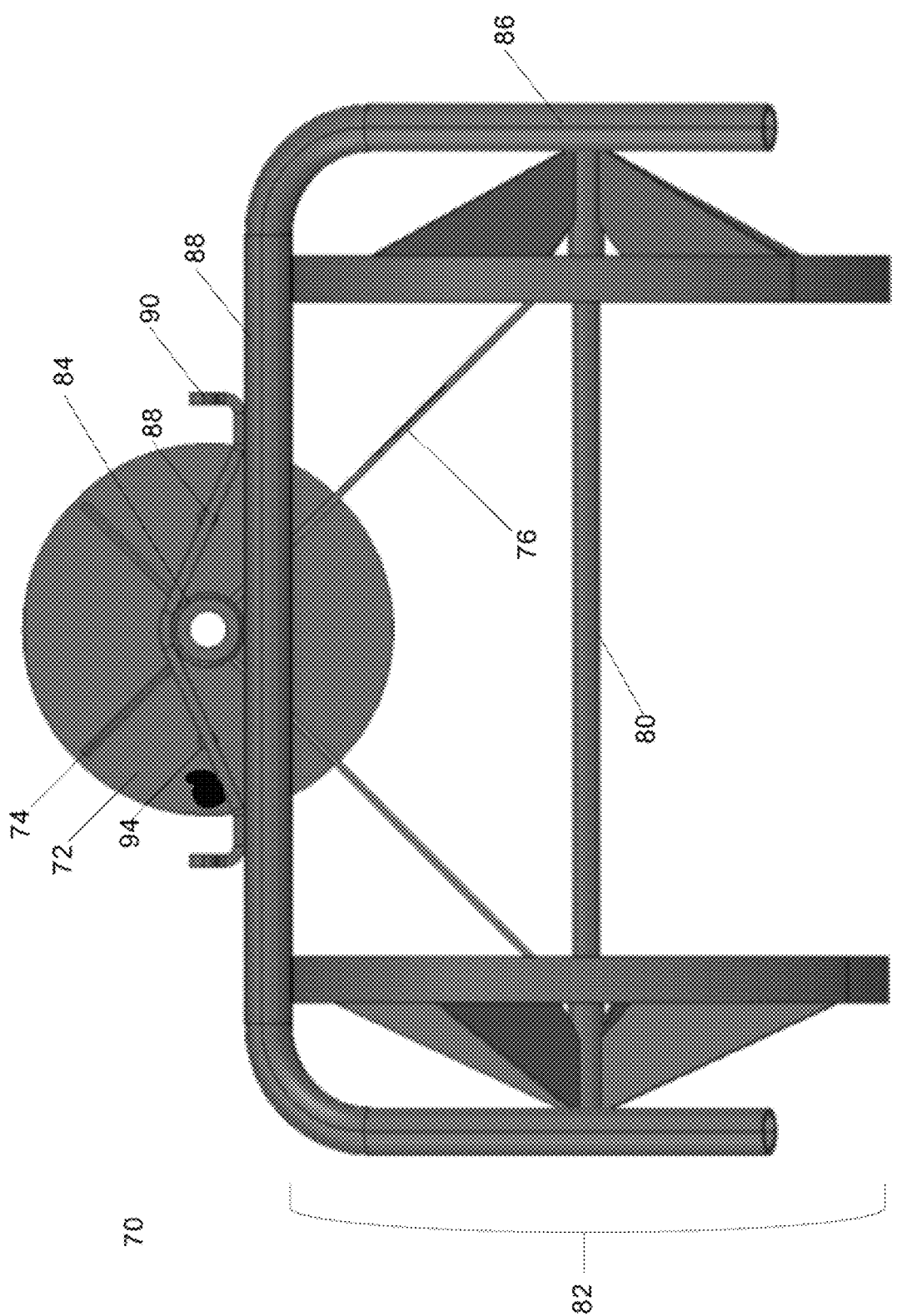
FIG. 12 is a top view of the portable trailer stand of FIG. 9.

FIGS. 6e and 6f illustrate the acme rod 34 and acme nut 35. The acme rod 34 with the acme thread 35 has a steel slotted spring pin (not shown) inserted through a hole 37 at the end thereof such that the acme thread 35 cannot be removed from the vertical support member 24. The top of the acme rod 34 comprises a ball which interacts with the mount 38 to form a ball and socket joint such that the mount 38 can tilt on the acme rod 34 to account for variations between the surface in contact with the base 12 and the surface of the underside of the nose portion of a trailer in contact with the pad 40. The mount 38 is mounted on the acme rod 34 with cap screws 39 that extend into a groove formed into the acme rod 34 under the ball. Grease may be put into the ball and socket joint to facilitate tilting of the mount 38 on the acme rod 34.

The handlebar 28 is connected to the vertical support member 24 via the support plate 26 which is connected to the handlebar 28 and the vertical support member 24. In this embodiment, the support plate 26 is welded to the vertical support member 24 and the handlebar 28. The support plate gusset 29 is connected to, and extends from, the vertical support member 24 to, and is connected to, the support plate 26. The vertical support plate gusset 29 provides additional rigidity and support to the support plate 26. The support plate 26 interacts with an auxiliary trailer stand. In this embodiment, the support plate 26 comprises an L-shaped slot which interacts with an auxiliary trailer stand, as will be described below.

Turning now to FIGS. 7a to 7h, an auxiliary trailer stand in accordance with an aspect of the present invention is shown and is generally identified by reference numeral 42. The auxiliary trailer stand 42 comprises a base 44, base gussets 46 extending from the base 44, a vertical support member 24 extending from the base 44, a handle 48 connected to the vertical support member 24, an acme nut 30, and a platform 32.

The base gussets 46 extend from, and are perpendicular to, the base 44 and provide rigidity and support to the base and the vertical support member 24. In this embodiment, there are four (4) base gussets 46 and the base 44 is circular.

The vertical support member 24 extends from, and is perpendicular to, the base 44. In this embodiment, the base gussets 46 are welded to the base 44 and the vertical support member 24. The handle 48 is connected to the vertical support member 24 and is configured to facilitate lifting of the auxiliary trailer stand 24. In this embodiment, the auxiliary trailer stand 42 weights approximately 37 lbs. Moving the auxiliary trailer stand 42 significant distances by lifting via the handle 48 may be problematic due to the weight of the auxiliary trailer stand 42.

The vertical support member 24 is hollow and further comprises the acme nut 30 at an end opposite the base 44. The acme nut 30 interacts with the platform 32 as will be described below.

The platform 32 is height adjustable and comprises an acme rod 34, a handle 36 connected to the acme rod 34, a mount 38, and a pad 40. The acme rod 34 comprises an acme thread 35 that rotates within the acme nut 30. In this embodiment, there is a single flat handle 36 welded to the acme rod 34 above the acme thread 35. Rotation of the acme rod 34 via the handle 36 moves the acme thread 35 within the acme nut 30 thereby adjusting the height of the platform 32. The mount 38 is connected to the acme rod 34 and to the pad 40. The pad 40 is configured to support the nose portion of a trailer as will be described. In this embodiment, the pad 40 is generally circular and is welded to the mount 38.

The acme rod 34 with the acme thread 35 has a steel slotted spring pin (not shown) inserted through a hole 37 at the end thereof such that the acme thread 35 cannot be removed from the vertical support member 24. The top of the acme rod 34 comprises a ball which interacts with the mount 38 to form a ball and socket joint such that the mount 38 can tilt on the acme rod 34 to account for variations between the surface in contact with the base 12 and the surface of the underside of the nose portion of a trailer in contact with the pad 40. The mount 38 is mounted on the acme rod 34 with cap screws 39 that extend into a groove formed into the acme rod 34 under the ball. Grease may be put into the ball and socket joint to facilitate tilting of the mount 38 on the acme rod 34.

As shown in FIGS. 8a to 8i, the auxiliary trailer stand 42 can be carried and transported by the portable trailer stand 10. The auxiliary trailer stand 42 is lifted by gripping the handle 48, placing the vertical support member 24 into, and securing it within, the L-shaped slot formed in the support plate 26 and resting the base 44 of the auxiliary trailer stand 42 on the base 12 of the portable trailer stand 10, which base 12 is supported by guide 33. Once the auxiliary trailer stand 42 is secured on the portable trailer stand 10, a user can tilt the portable trailer stand 10 off of its base 12 onto its wheels 22 and move the combination portable trailer stand 10 and auxiliary trailer stand 42 via wheels 22 of portable trailer stand 10. The auxiliary trailer stand 42 is prevented from disengaging from the portable trailer stand 10 by the L-shaped slot of the support plate 26 and the guide 33. While only one guide 33 has been shown, one of skill in the art will appreciate that additional guides 33 may be present to further support the auxiliary trailer stand 42 on the portable trailer stand 10.

In this configuration, the base 44 of the auxiliary trailer stand 42 rests on the base 12 of the portable trailer stand 10. The operator then tilts the portable trailer stand 10 toward himself/herself by gripping the handlebar 28 and rotating the portable trailer stand 10 such that the base 12 no longer contacts the resting surface and the weight of the combined portable trailer stand 10 and the auxiliary trailer stand 42 is on the wheels 22. The operator can then move the portable trailer stand 10 with the auxiliary trailer stand 42 to the desired location. Once the desired location is reached, the auxiliary trailer stand 42 is then removed from the portable trailer stand 10 by removing its vertical support member 24 from the confines of the L-shaped slot of the support plate 26 of the portable trailer stand 10 and by removing its base 44 from the base 12 of the portable trailer stand 10. The auxiliary trailer stand 42 is then positioned under the nose portion of a trailer, either in the centre, equidistant from the front corners of the nose portion, if used alone, or at one corner of the nose portion if used in association with another auxiliary trailer stand 42 or the portable trailer stand, positioned at the other corner of the nose portion. The height of the platform 32 is then adjusted as necessary as described below.

In use, once the auxiliary trailer stand 42 and/or portable trailer stand 10 is positioned under the nose portion of a trailer, the handle 36 is gripped by the operator and the platform 32 is rotated to adjust the height of the platform 32 to contact the underside of the nose portion of the trailer. As the platform 32 is rotated, the acme thread on the acme rod 34 rotates within the acme nut 30 increasing the height of the platform 32 until the pad 40 contacts the underside of the nose portion of the trailer. The height of the platform 40 may need to be reduced prior to placing the auxiliary trailer stand 42 and/or portable trailer stand 10 under the nose portion of the trailer. This is achieved by rotating the platform 32 in the opposite direction such that acme thread on the acme rod 34 rotates within the acme nut 30 and decreases the height of the platform 32.

The ability of the portable trailer stand 10 to transport the auxiliary trailer stand 42 reduces the components needed on the auxiliary trailer stand 42 thereby reducing the weight and cost of the auxiliary trailer stand 42. Furthermore, as the auxiliary trailer stand 42 has no wheels, the likelihood of trailer tip over is reduced. A single site can have a single portable trailer stand 10 that can be used to move several different auxiliary trailer stands 42 on the site rather than making each individual auxiliary trailer stand 42 equipped for individual transport.

Turning now to FIGS. 9 to 12, another embodiment of a transport for a trailer stand in accordance with an aspect of the present invention is shown and is generally identified by reference numeral 70. The transport 70 comprises a base 72, two (2) gussets 74 connected to the base 72, two wheels supports 76 with members 77 having axle apertures 78, an axle 80 passing through the axle apertures 78 of the wheels supports 76, wheels 82, a central member 84 extending from and perpendicular to the base 72, a handlebar 86 connected to the central member 84 by a support bar 88, and mounting pins 90.

In this embodiment, the base 72 is a generally circular disc. The gussets 74 extend from the base 72 and are connected to the base 72 and the central member 84. The gussets 74 provide additional rigidity to the base 72. The wheel supports 76 extend from the base 72 and are connected to the base 72 and the central member 84. In this embodiment, the gussets 74 and the wheel supports 76 are welded to the base 72 and the central member 84. The wheels supports 76 are connected to members 77 having axle apertures 78 for insertion of the axle 80. In this embodiment, the members 77 and the wheels supports 76 are integral. The base 72 further comprises two mounting pegs 94 which extend from and perpendicular to the base 72. The mounting pegs 94 interact with components of trailer stand as will be described.

The axle 80 passes through the axle apertures 78 in the wheel supports 76. The wheels 82 are mounted on either longitudinal end of the axle 80. Each wheel 82 comprises a ring 96 mounted to a disc 98 having eight (8) spokes upon which four (4) wheel gussets 100 are connected, a hub 102, and a fastener 104. The gussets 100 extend from four different spokes and are connected to the disc 98 and hub 102. In this embodiment, the gussets 100 are welded to the spokes and the hub 102. The hub 102 is hollow and configure such that the axle 80 passes through the axles apertures 78 and the hub 102. The fasteners 104 are connected to either end of the axle 80 such that the discs 98 are rotatable on the axle 80 and do not slide off of the axle 80. Although a disc 98 with eight spokes having four gussets 100 extending therefrom is described, one skilled in the art will appreciate that more or fewer spokes and/or gussets 100 are possible.

The central member 84 is hollow and further comprises an acme nut 110 at an end opposite the base 72. The acme nut 110 interacts with a platform as will be described.

The handlebar 86 is connected to the central member 84 via the support bar 88 which is connected to the handlebar 86 and the central member 84. In this embodiment, the support bar 88 is welded to the central member 84 and the handlebar 86. Two (2) mounting pins 90 extend from the support bar 88 in the same direction as the mounting pegs 94. One mounting pin 90 extends from one end of the support bar 88 and the other mounting pin 90 extends from the other end of the support bar 88. In this embodiment, the mounting pins 90 are welded to the support bar 88. The mounting pegs 94 and the mounting pins 90 interact with a trailer stand mounted on the transport as will be described.

Figure 13:
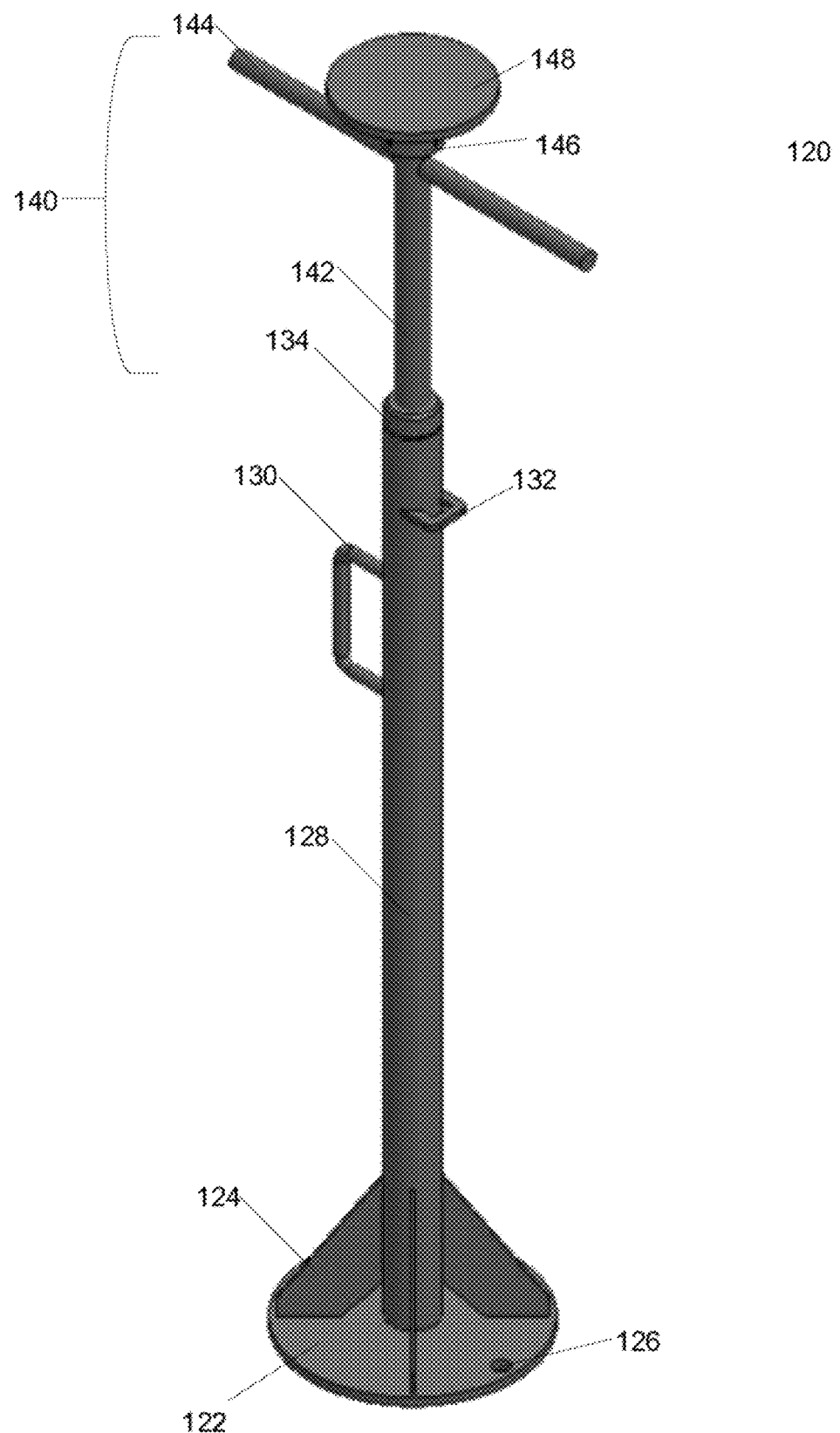
FIG. 13 is a perspective view of an auxiliary trailer stand for use with the portable trailer stand of FIG. 9.
Figure 14:
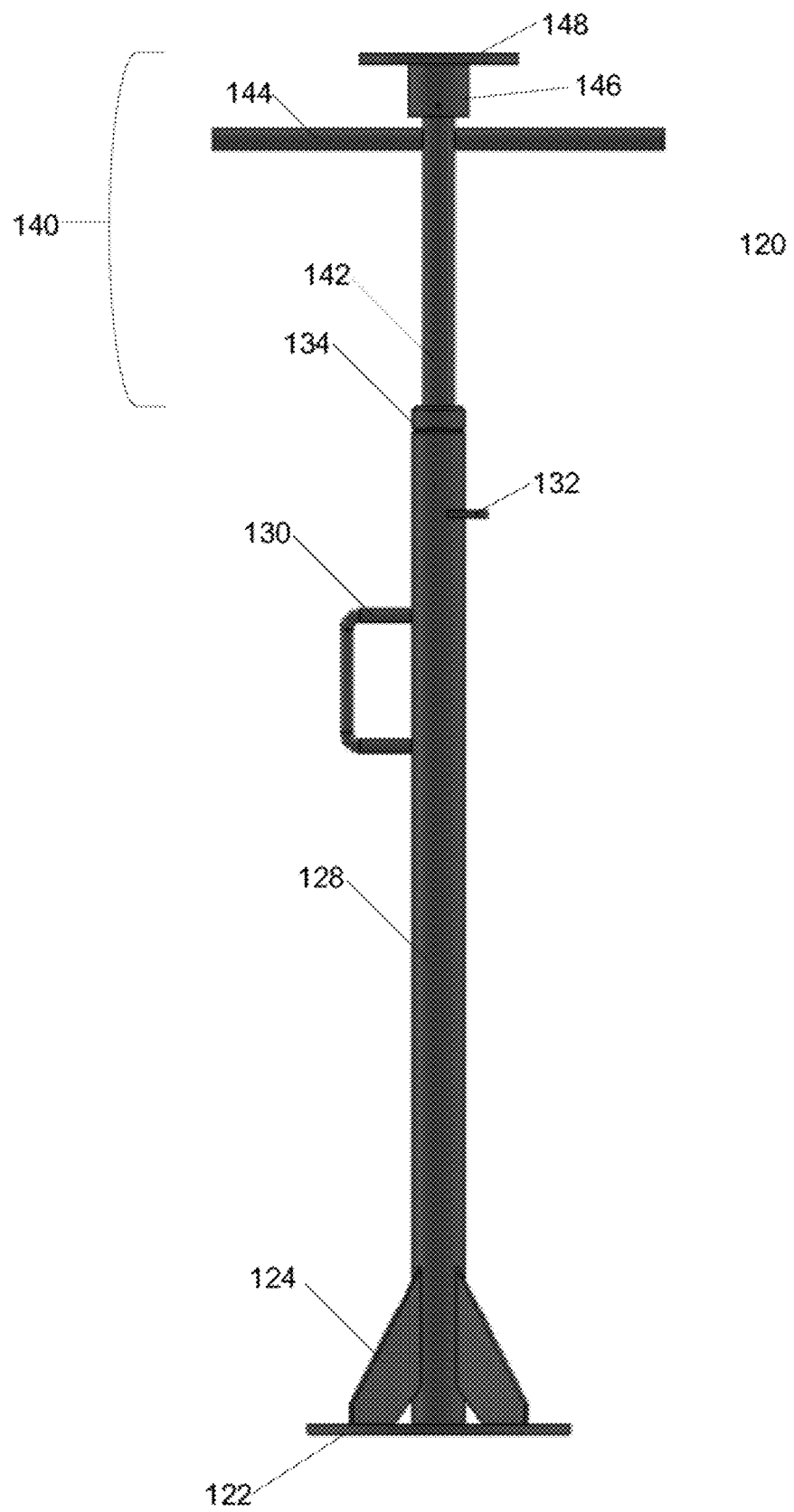
FIG. 14 is a front elevation view of the auxiliary trailer stand of FIG. 13.
Figure 15:
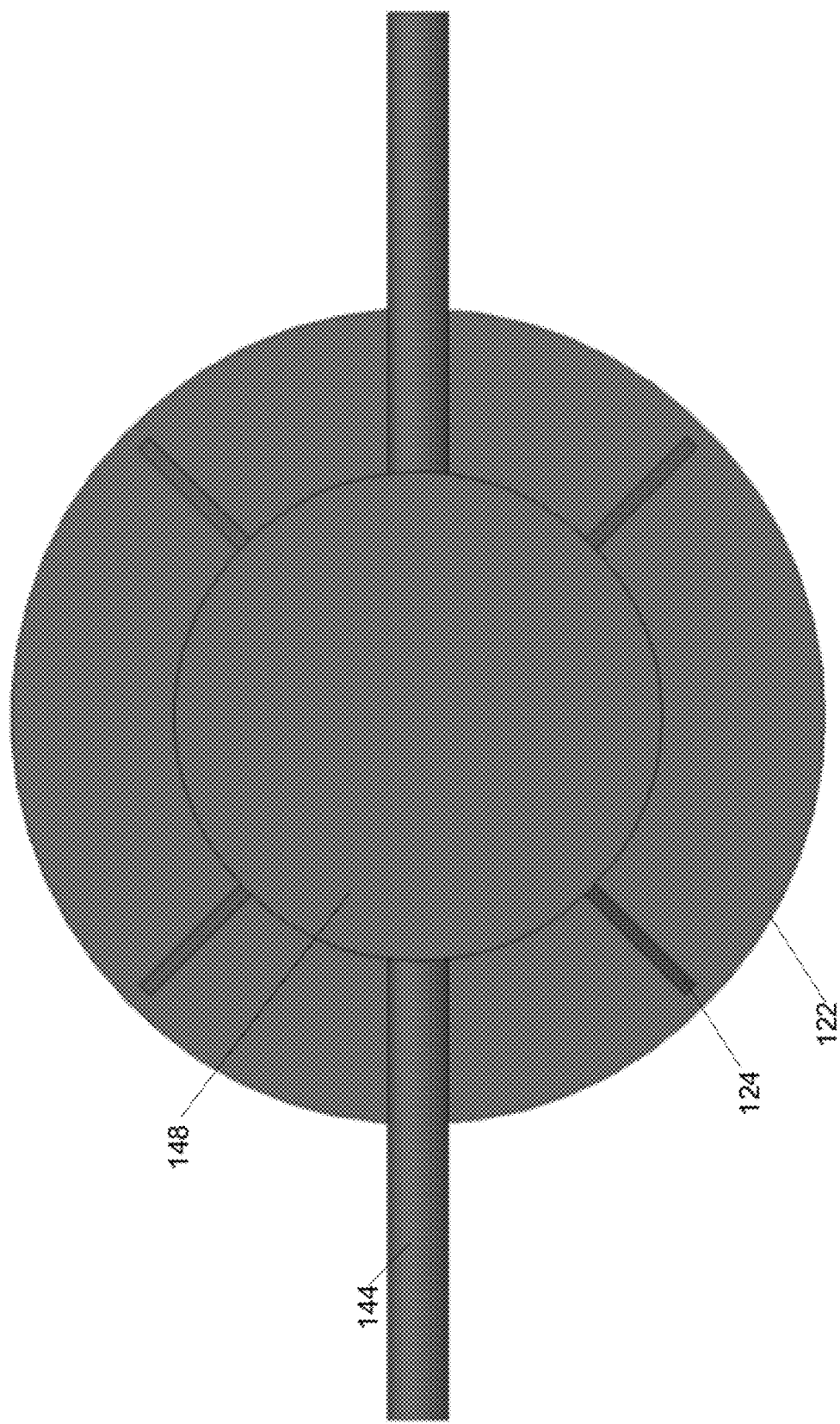
FIG. 15 is a top view of the auxiliary trailer stand of FIG. 13.

Turning now to FIGS. 13 to 15, a trailer stand in accordance with an aspect of the present invention is shown and is generally identified by reference numeral 120. The trailer stand 120 comprises a base 122, gussets 124 extending from the base 122, a mounting aperture 126 in the base 122, an outer tube 128 extending from the base 122, a handle 130 connected to the outer tube 128, a catch 132 connected to the outer tube 128, an acme nut 134, and a platform 140.

The gussets 124 extend from and perpendicular to the base 122 and provide rigidity to the trailer stand 120. In this embodiment, there are four (4) gussets 124 and the base 122 is circular. The mounting aperture 126 interacts with one of the mounting pegs 94 of the transport 70 as will be described.

The outer tube 128 extends from and perpendicular to the base 122. In this embodiment, the gussets 124 are welded to the base 122 and the outer tube 128. The handle 130 is connected to the outer tube 128 and is configured to facilitate lifting of the trailer stand 120. In this embodiment, the trailer stand 120 weights approximately 37 lbs. Moving the trailer stand 120 significant distances by lifting via the handle 130 is problematic due to the weight of the trailer stand 120.

The catch 132 is connected to the outer tube 128. In this embodiment, the catch 132 is a loop that is generally perpendicular to the handle 130. The handle 130 and the catch 132 are welded to the outer tube 128. The acme thread 134 interacts with the platform 140 as will be described.

The platform 140 is height adjustable and comprises an inner tube 142, handlebars 144 connected to the inner tube 142, a mount 146, and a pad 148. The inner tube 142 comprises an acme thread (not shown) that rotates within the acme nut 134. Rotation of the inner tube 142 moves the acme thread within the acme nut 134 thereby adjusting the height of the platform 140. In this embodiment, there are two handlebars 144 connected to the inner tube 142. The mount 146 is connected to the inner tube 142 and to the pad 148. The pad 148 is configured to support the nose portion of a trailer stand as will be described. In this embodiment, the pad 148 is generally circular.

The inner tube 142 with the acme thread has a stopper at the end within the outer tube 128 such that the inner tube 142 cannot be removed from the outer tube 128.

The mount 146 is connected to the inner tube 142 such that the mount can swivel on the inner tube 142 to account for variations between the surface in contact with the base 122 and the surface of the underside of a nose portion of a trailer in contact with the pad 148.

In use, once the trailer stand 120 is positioned under the nose portion of a trailer, the handlebars 144 are gripped by the operator and the platform 140 is rotated to adjust the height of the platform 140 to contact the underside of the nose portion of the trailer. As the platform 140 is rotated, the acme thread on the inner tube 142 rotates within the acme nut 134 increasing the height of the platform 140 until the pad 148 contacts the underside of the nose portion of the trailer. The height of the platform 140 may need to be reduced prior to placing the trailer stand 120 under the nose portion of the trailer. This is achieved by rotating the platform in the opposite direction such that acme thread on the inner tube 142 rotates within the acme nut 134 and decreases the height of the platform 140.

Figure 16:
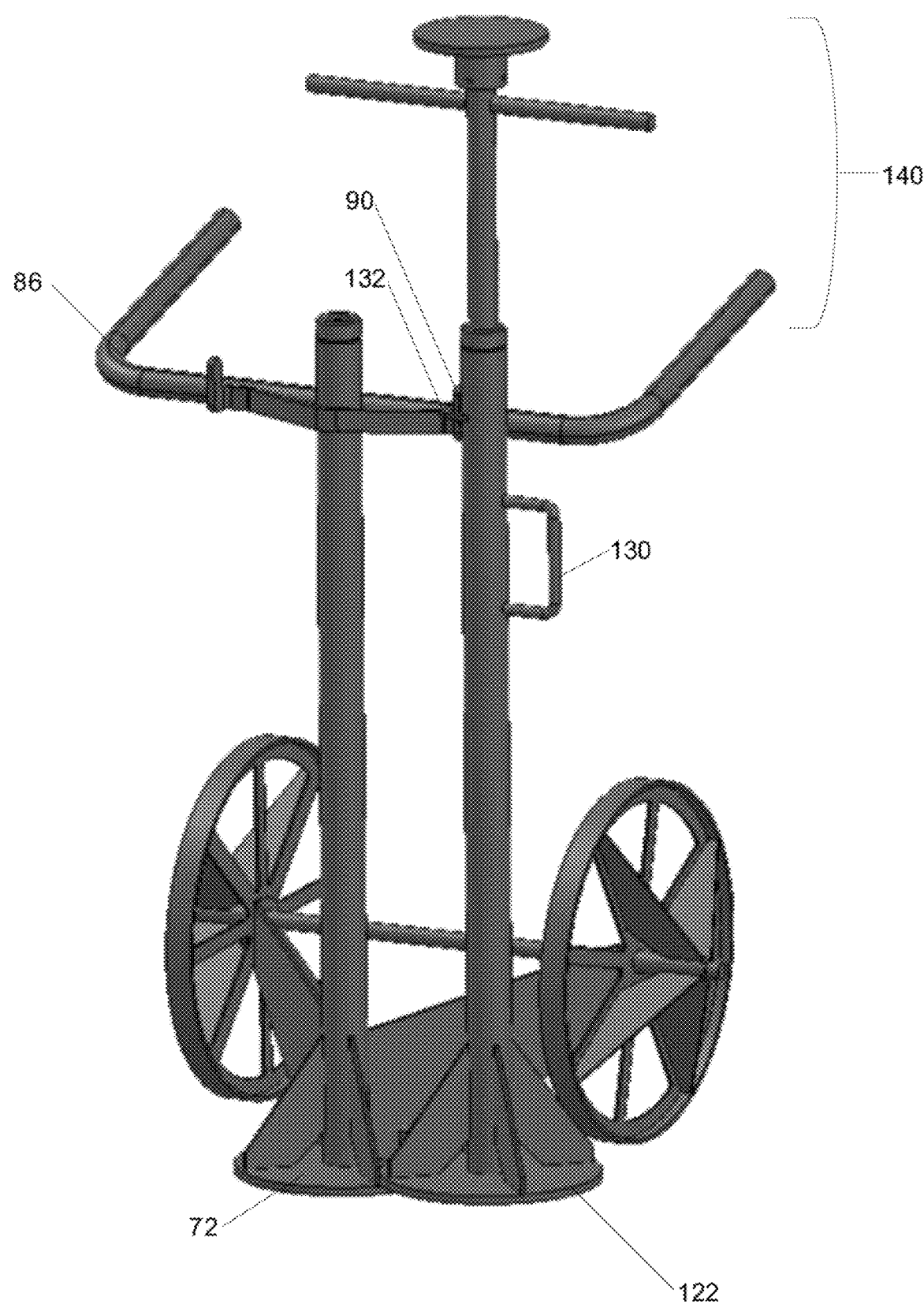
FIG. 16 is a perspective view of the portable trailer stand of FIG. 9 comprising the auxiliary trailer stand of FIG. 13.
Figure 17:
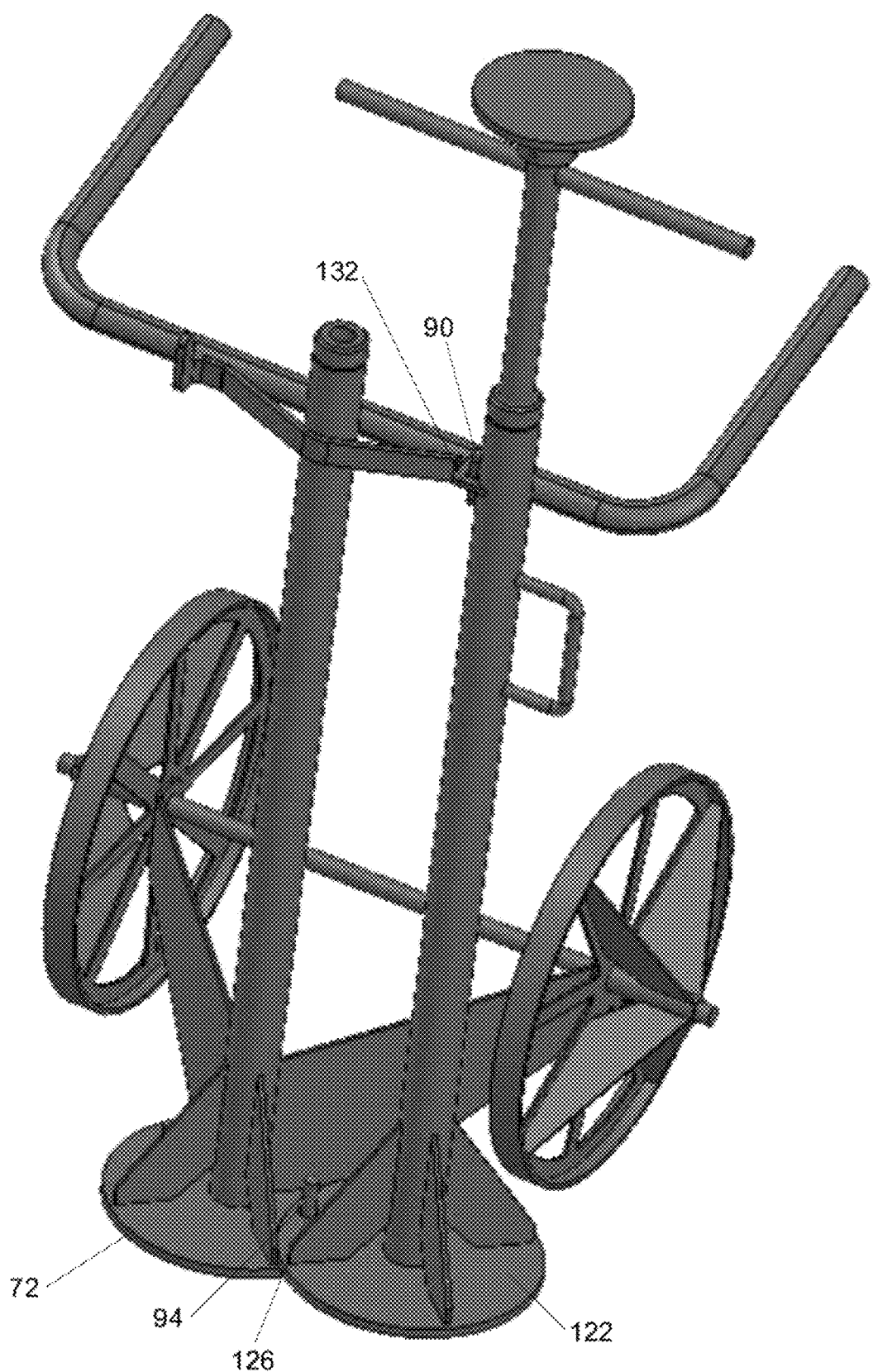
FIG. 17 is another perspective view of the portable trailer stand of FIG. 9 comprising the auxiliary trailer stand of FIG. 13.

As shown in FIGS. 16 and 17, the trailer stand 120 can be carried and transported by the transport 70. The trailer stand 120 is lifted by gripping the handle 130 and placed such that one mounting peg 94 of the transport 70 is inserted into the mounting aperture 126 of the trailer stand 120, and the mounting pin 90 of the transport 70 is inserted into the catch 132 of the trailer stand 120. In this configuration the base 122 of the trailer stand 120 rests on the base 72 of the transport 70. The operator then tilts the transport 70 by gripping the handlebar 86 and rotating the transport 70 such that the base 72 no longer contacts the resting surface and the weight of the transport 70 and trailer stand 120 is on the wheels 82. The operator can then move the transport 70 and trailer stand 120 to the desired location. Once the desired location is reached, the trailer stand 120 is then removed from the transport 70 by lifting the trailer stand 120 such that the mounting peg 94 of the transport 70 is removed from the mounting aperture 126 of the trailer stand 120, and the catch 132 is no longer around the mounting pin 90. The trailer stand 120 is then positioned under the nose portion of a trailer and the height of the platform 140 adjusted as necessary as already described.

Figure 18:
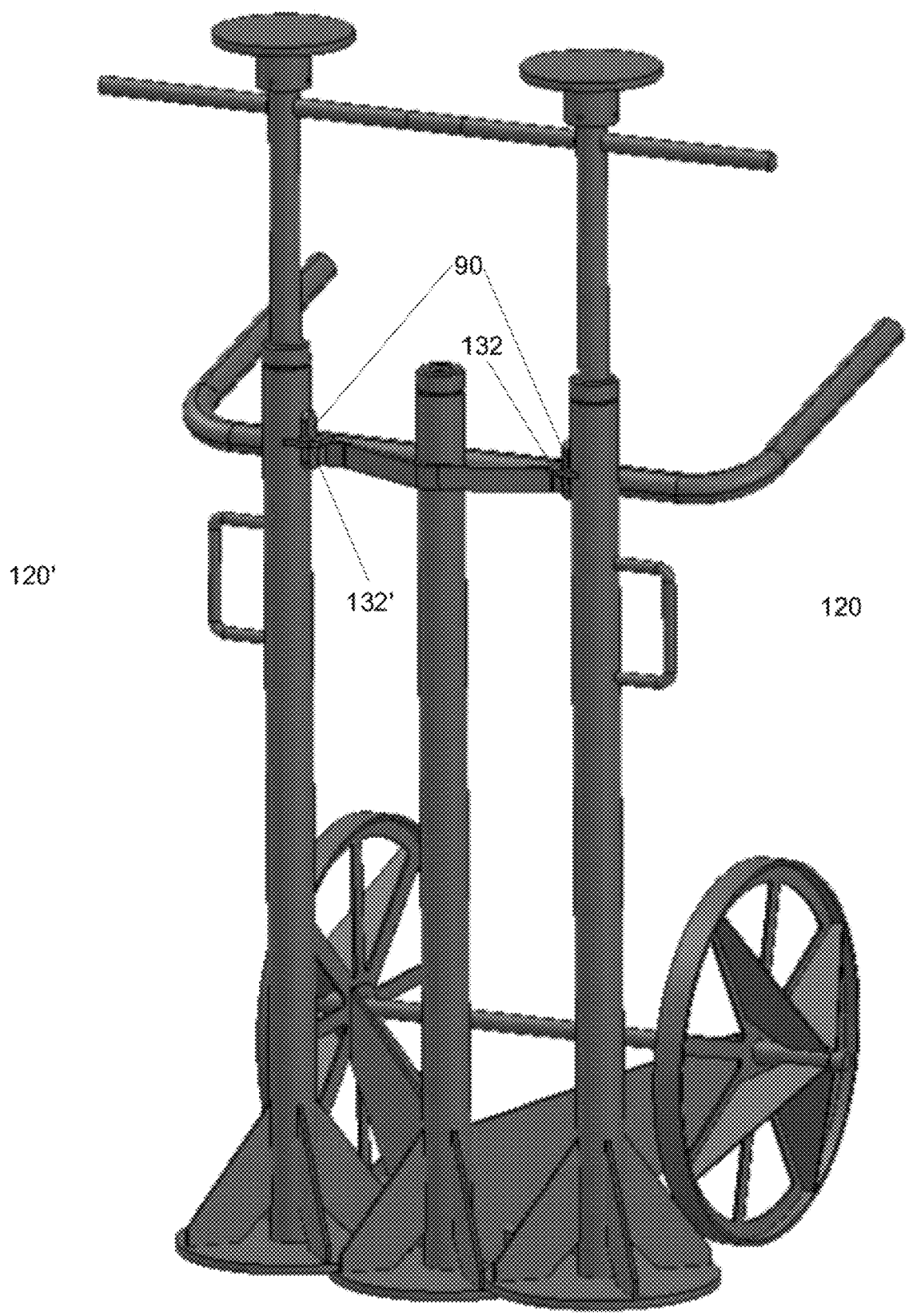
FIG. 18 is a perspective view of the portable trailer stand of FIG. 9 comprising two auxiliary trailer stands of FIG. 13.
Figure 19:
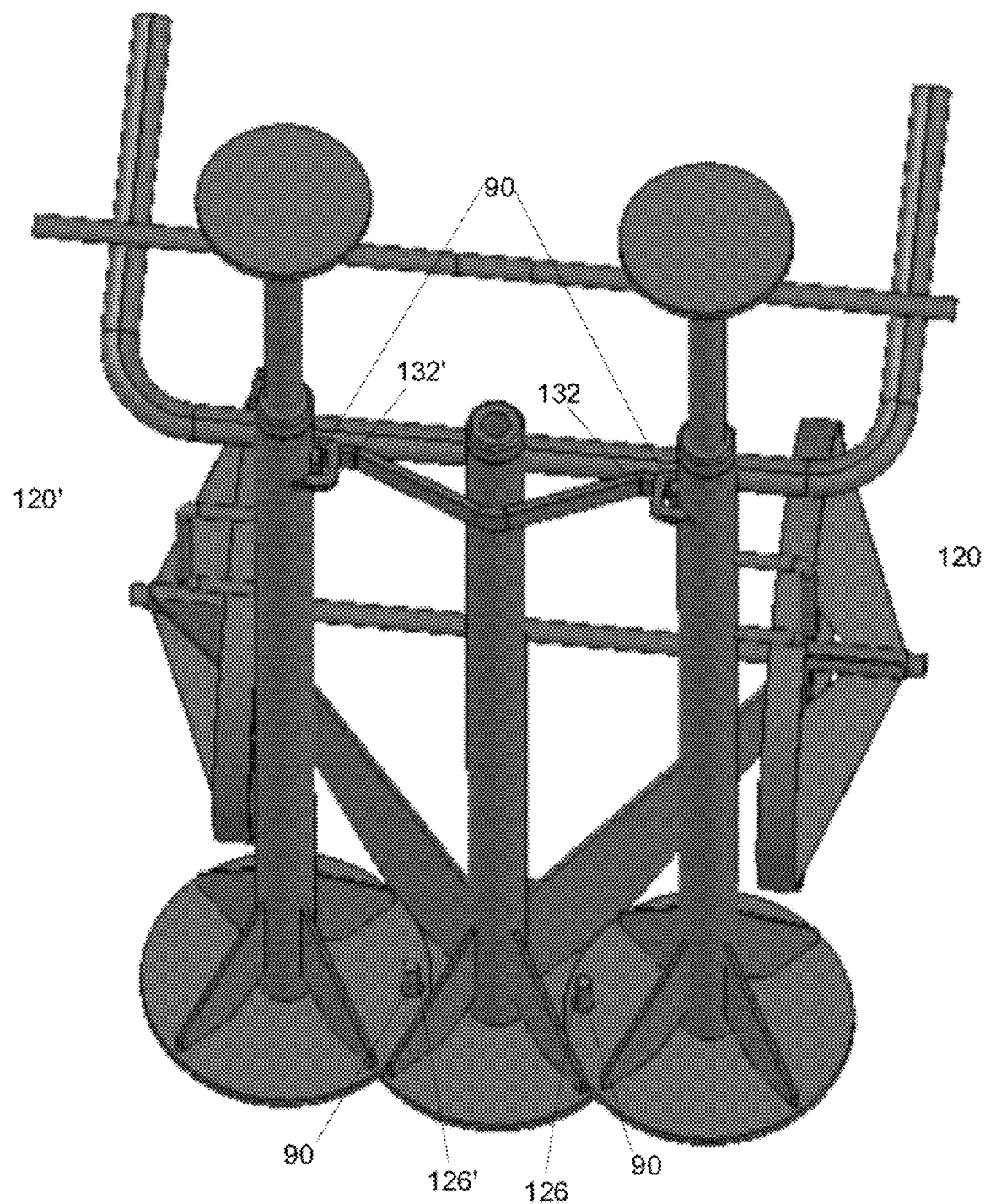
FIG. 19 is another perspective view of the portable trailer stand of FIG. 9 comprising two auxiliary trailer stands of FIG. 13.

As shown in FIGS. 18 and 19, the transport 70 can carry and transport two (2) trailer stands 120. A second trailer stand 120' comprises the same components as the first trailer stand 120. For ease of reference, the components of the second trailer stand 120' are identified with the suffix "'". Both trailer stands (120, 120') can be carried and transported by the transport 70. One mounting peg 94 of the transport 70 is inserted into the mounting aperture 126 of the trailer stand 120, while the other mounting peg 94 of the transport 70 is inserted into the mounting aperture 126' of the second trailer stand 120'. Furthermore, one mounting pin 90 of the transport 70 is inserted into the catch 132 of the trailer stand 120 while the other mounting pin 90 of the transport 70 is inserted into the catch 132' of the trailer stand 120'.

Figure 20:
FIG. 20 is a perspective view of another embodiment of the portable trailer stand of FIG. 9.

Turning now to FIG. 20, another embodiment of a transport for a trailer stand in accordance with an aspect of the present invention is shown and is generally identified by reference numeral 150. In this embodiment, the transport 150 comprises all of the components of transport 70 and further comprises a platform 152 with the same components as platform 140 of trailer stand 120. The inner tube of the platform 152 comprises an acme thread that cooperates with the acme nut of the transport 150 to allow the height of the platform 152 to be adjusted as already described with reference to the platform 140. The transport 150 can also be used to carry and transport one or two trailer stands as described with reference to the transport 70. Once the trailer stands have been removed from the transport 150 and positioned under the nose portion of a trailer, the transport 150 can be positioned such that the pad of the platform 152 can provide support to the nose portion of the trailer in addition to a trailer stand.

Figure 21:
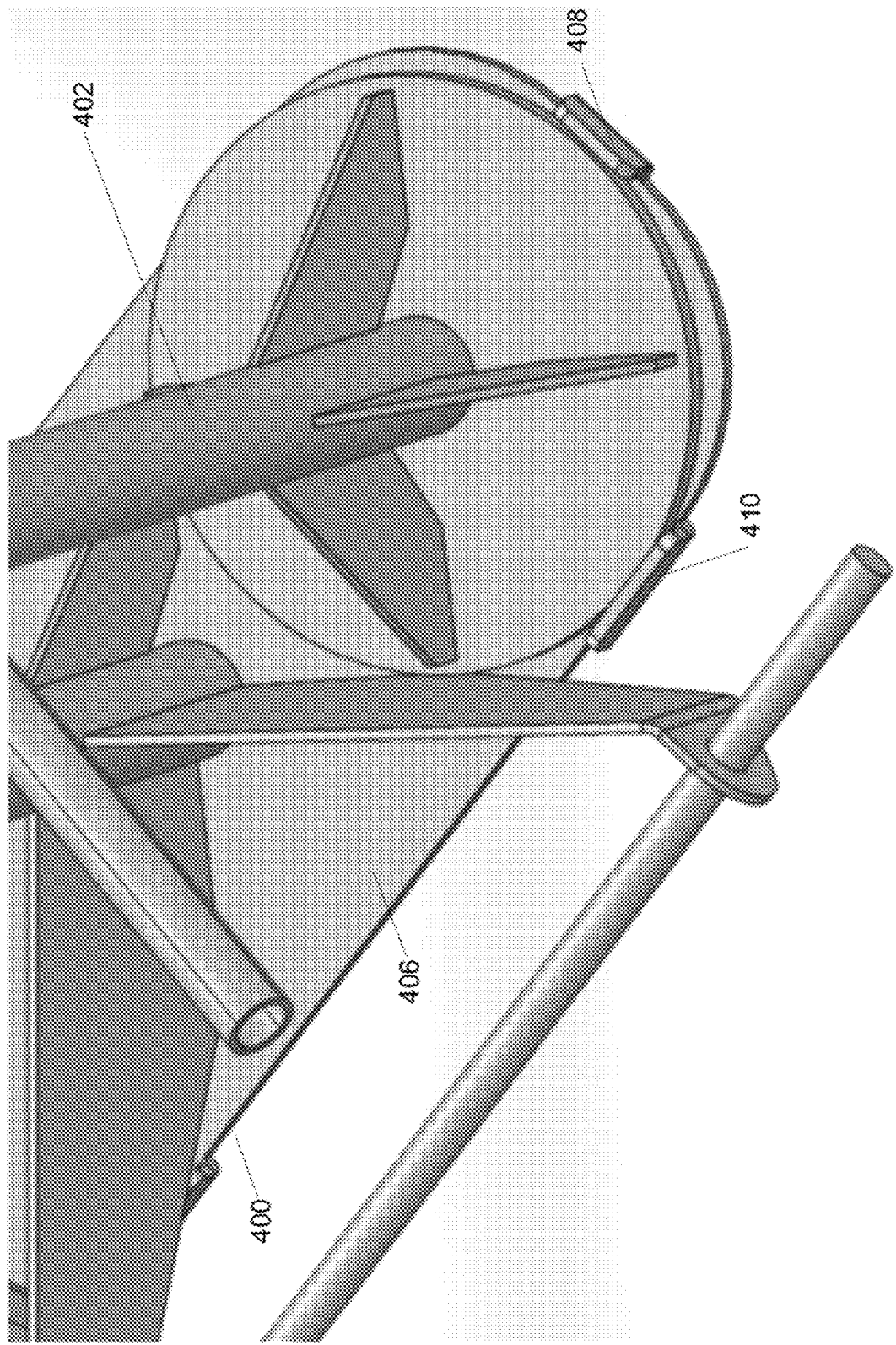
FIG. 21 is a perspective view of another embodiment of the portable trailer stand of FIG. 9 comprising the auxiliary trailer stand of FIG. 13.
Figure 22:
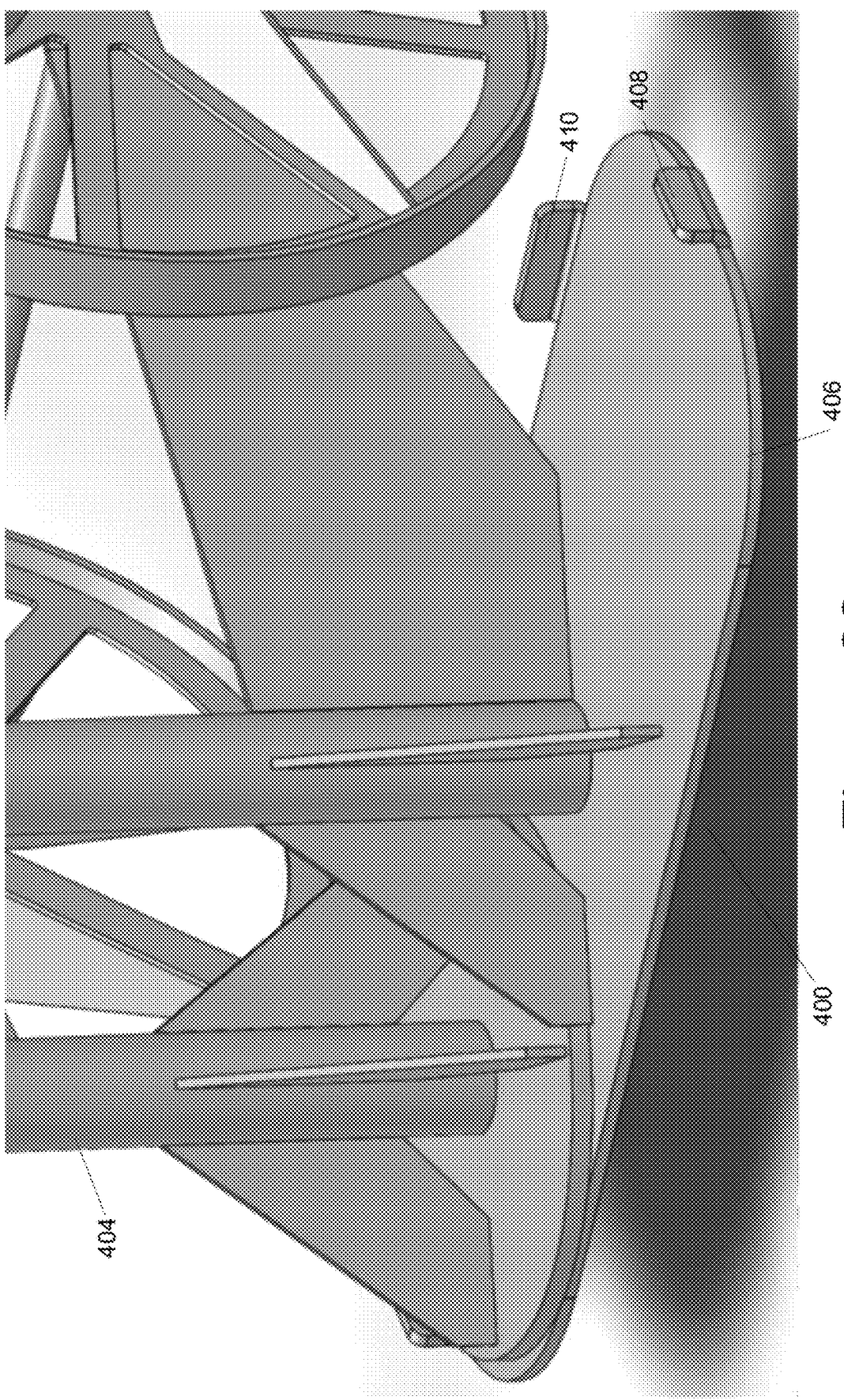
FIG. 22 is a another perspective view of the portable trailer stand of FIG. 21 comprising the auxiliary trailer stand of FIG. 13.
Figure 23:
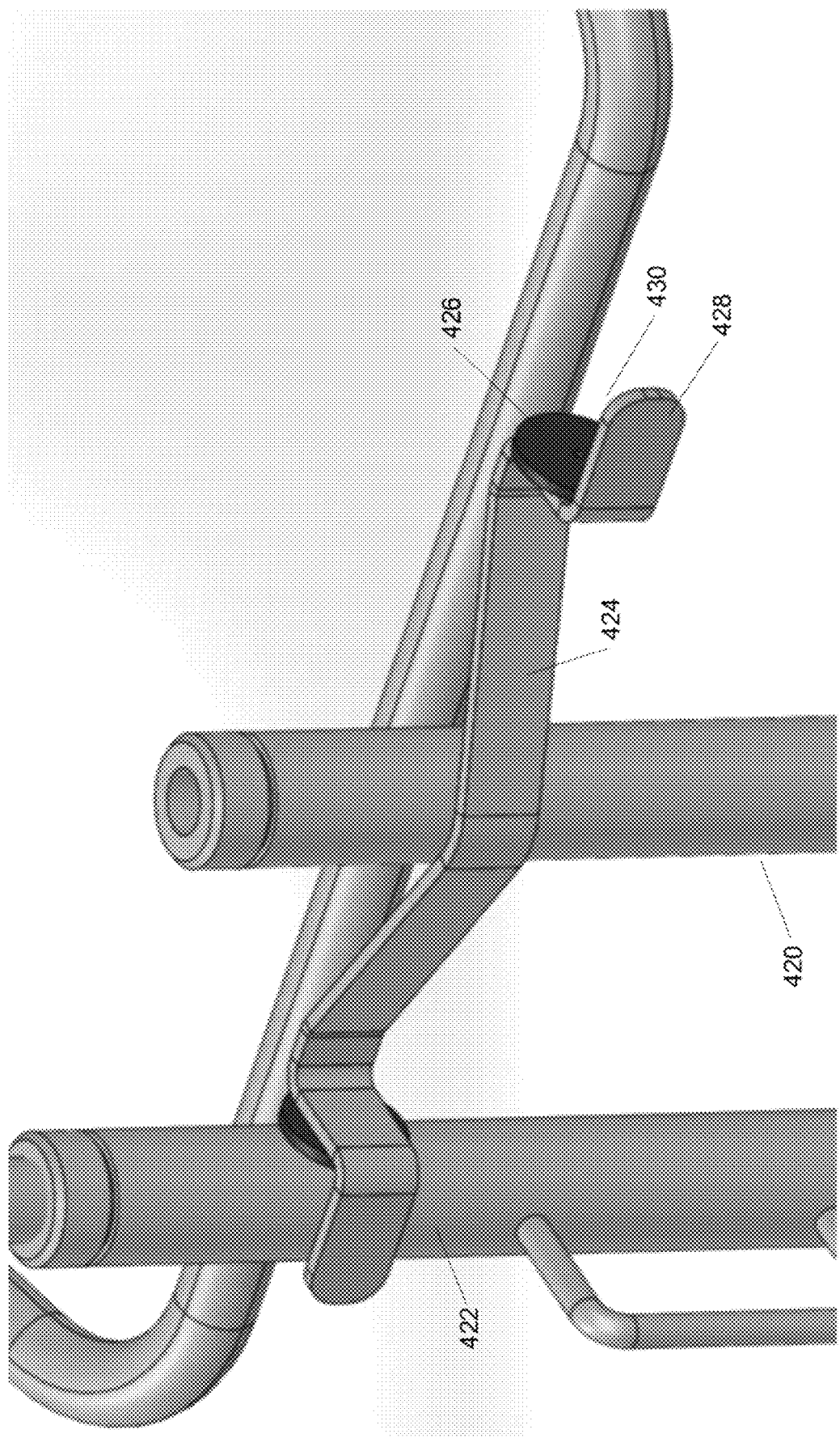
FIG. 23 is perspective view of another embodiment of the portable trailer stand of FIG. 9 comprising the auxiliary trailer stand of FIG. 13.
Figure 24:
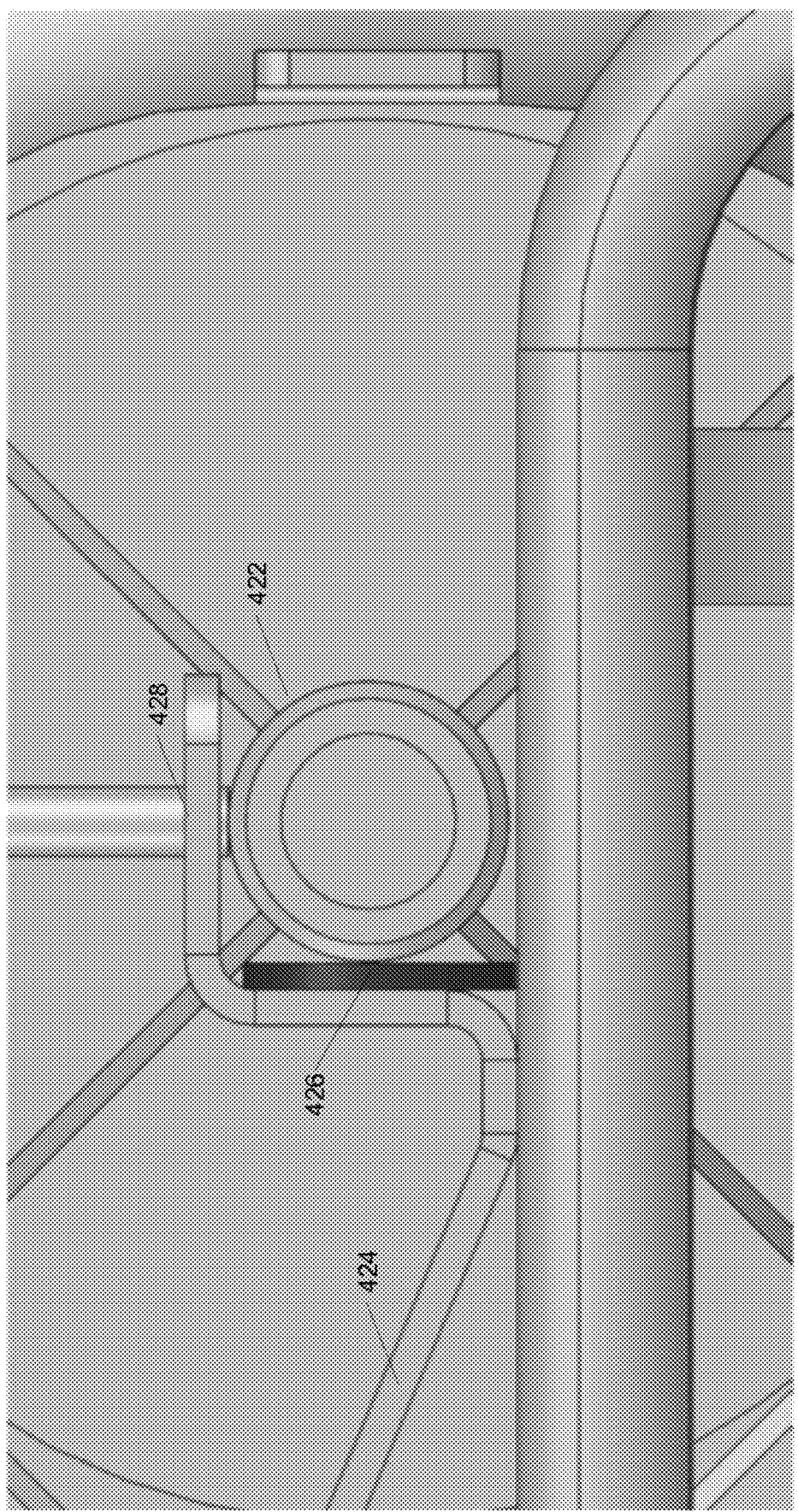
FIG. 24 is a top view of the portable trailer stand of FIG. 23 comprising the auxiliary trailer stand of FIG. 13.

Turning now to FIGS. 21 and 22, another embodiment of a transport for a trailer stand in accordance with an aspect of the present invention is shown and is generally identified by reference numeral 400. The transport 400 comprises all of the components of transport 70 unless stated otherwise. In this embodiment, the transport 400 is configured to carry and transport a first and a second trailer stand 402 and 404, respectively. The first and second trailer stand 402 and 404, respectively, comprises all of the components of trailer stand 120 unless stated otherwise. The transport 400 comprises an extended base 406 that is configured to support the first and second trailer stands 402 and 404, respectively. The transport 400 further comprises first supports 408 and second supports 410 Supports 408 and 410 extend from the extended base 404 and are configured to secure the first and second trailer stands 402 and 404, respectively, as will be described. In FIG. 21 the wheel of the transport 400 is not shown for illustrative purposes only.

In use, as shown in FIG. 21, the first trailer stand 402 is placed on the extended base 406 and supported by the first and second supports 408 and 410, respectively. Once the first trailer stand 402 is placed on the extended base 406, a user can tilt the transport 400 is move the transport via the wheels of the transport 400. The first trailer stand 402 is prevented from moving off of the extended base 406 by the first and second supports 408 and 410, respectively. While only two supports 408 and 410 have been shown, one of skill in the art will appreciate that a third support may be added to further support the first trailer stand 402.

Furthermore, as shown in FIG. 22, the second trailer stand 404 is placed on the extended base 406 and supported by the first and second supports 408 and 410, respectively. Once the second trailer stand 404 is placed on the extended base 406, a user can tilt the transport 400 is move the transport via the wheels of the transport 400. The second trailer stand 404 is prevented from moving off of the extended base 406 by the first and second supports 408 and 410, respectively. While only two supports 408 and 410 have been shown, one of skill in the art will appreciate that a third support may be added to further support the second trailer stand 404.

Turning now to FIGS. 21 and 22, another embodiment of a transport for a trailer stand in accordance with an aspect of the present invention is shown and is generally identified by reference numeral 420. The transport 420 comprises all of the components of transport 70 unless stated otherwise. In this embodiment, the transport 420 can store two trailer stands 422. Each trailer stand 422 comprises all of the components of trailer stand 120 unless stated otherwise. The transport 420 comprises a support bar 424 connected to the central member and the handlebar, magnets 426 connected to the support bar 424, and capturing elements 428 associated with the support bar 424 that, along with the support bar 424, define capturing areas 428. In this embodiment, the magnets 426 are disc shaped, but one of skill the art will appreciate that other shapes are possible. The capturing area 430 is sized to fit a trailer stand 422. In this embodiment, the capture element 428 is parallel with the handlebar of the transport 420.

In order to obtain a magnetic connection as will be described, the trailer stand 422 is manufactured, at least in part, of a ferromagnetic material. Unlike the trailer stand 120, the trailer stand 422 does not comprise a catch.

In use, a trailer stand 422 secured to the transport 420 by placing the trailer stand 422 within the capturing area 430 such that the trailer stand is magnetically held in the capturing area by the magnet 426. To remove the trailer stand 422 from the capturing area 430, a user simply pulls on the trailer stand 422 or transport 422 until the magnetic connection is severed. While magnets 426 have been used to secure the trailer stand 422 in the capturing area, one of skill in the art will appreciate that other methods are possible. These include, but are not limited to: Velcro, friction fit catches and clips.

Figure 25:
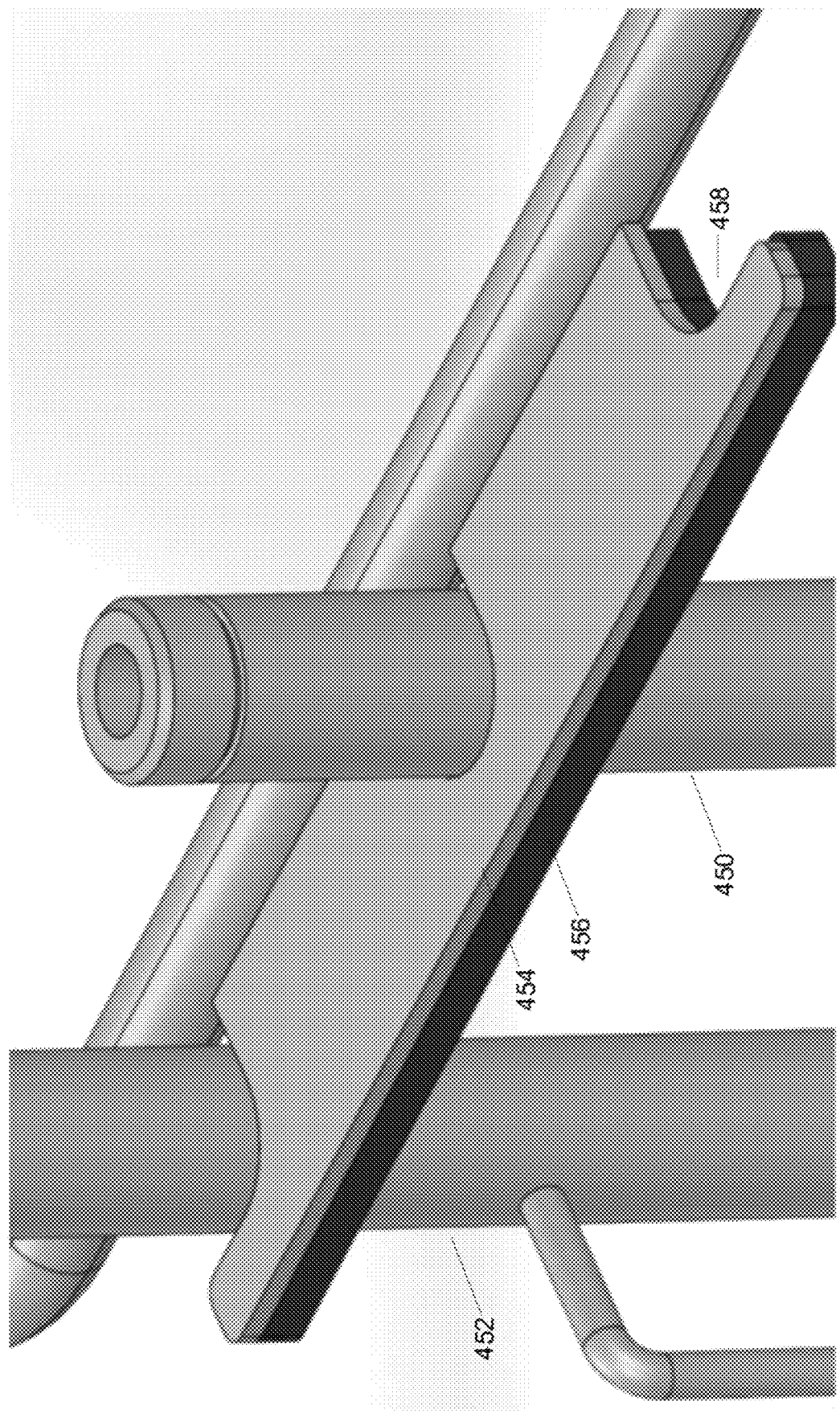
FIG. 25 is a perspective view of another embodiment of the portable trailer stand of FIG. 9 comprising the auxiliary trailer stand of FIG. 13.
Figure 26:
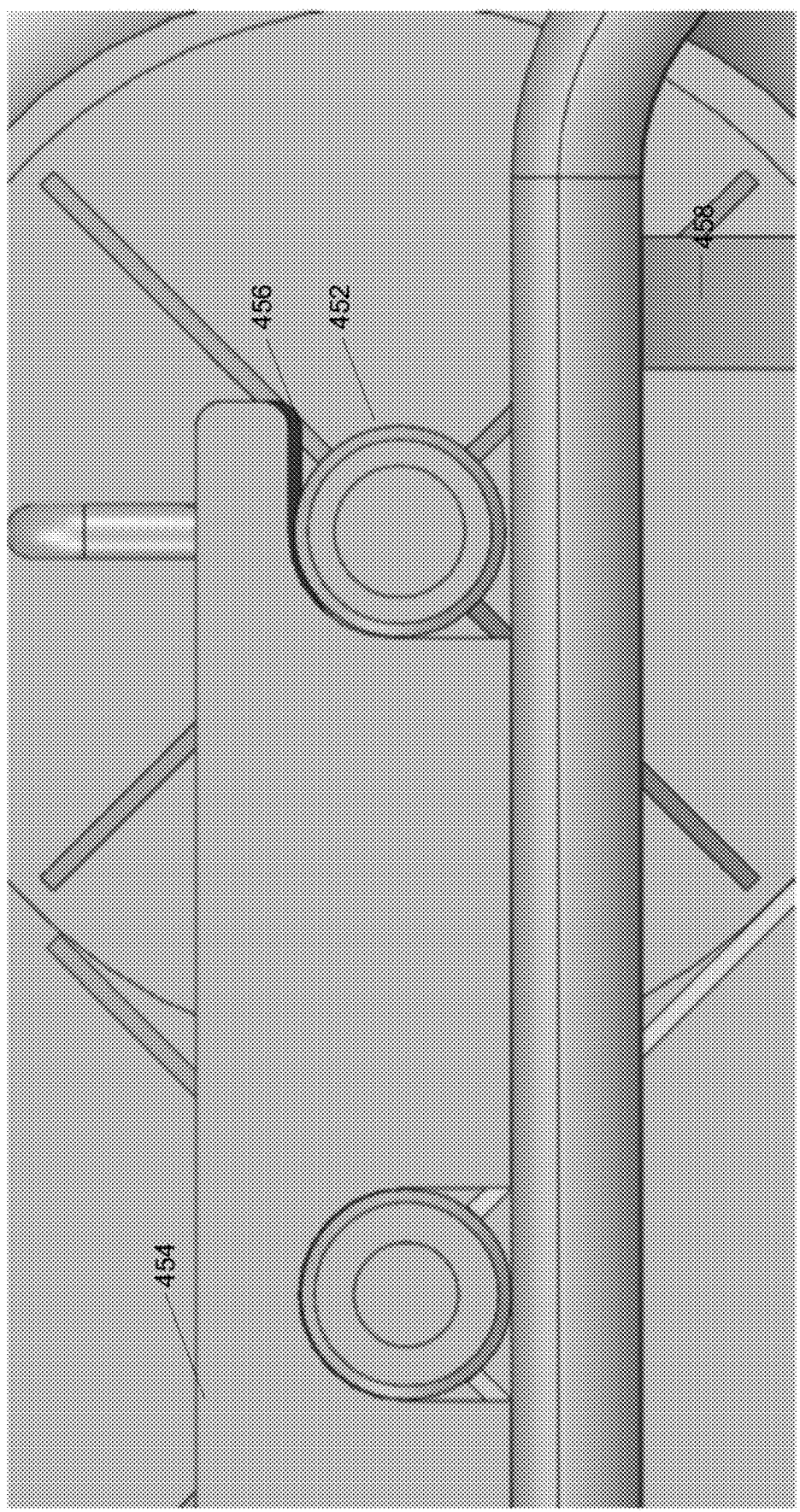
FIG. 26 is a top view of the portable trailer stand of FIG. 25 comprising the auxiliary trailer stand of FIG. 13.

Turning now to FIGS. 25 and 26, another embodiment of a transport for a trailer stand in accordance with an aspect of the present invention is shown and is generally identified by reference numeral 450. The transport 450 comprises all of the components of transport 70 unless stated otherwise. In this embodiment, the transport 450 can store two trailer stands 452. Each trailer stand 452 comprises all of the components of trailer stand 120 unless stated otherwise. Unlike the trailer stand 120, the trailer stand 452 does not comprise a catch. The transport 450 comprises a support plate 454 connected to the central member and handlebar of the transport 450, and a rubber member 458 affixed to the underside of the support plate 454. The support plate 454. The support plate 454 has a notch 458 in it on either longitudinal end of the support plate 454. Each notch 458 is sized to receive a trailer stand 452. The rubber member 456 is configured to encroach into the notches 458 of the support plate 454 as shown in FIG. 26.

In use, a trailer stand 452 is secured to the base of the transport 450 and then rested in a notch 458 in the support plate 454. The trailer stand 452 rests on the rubber member 456.

Figure 27:
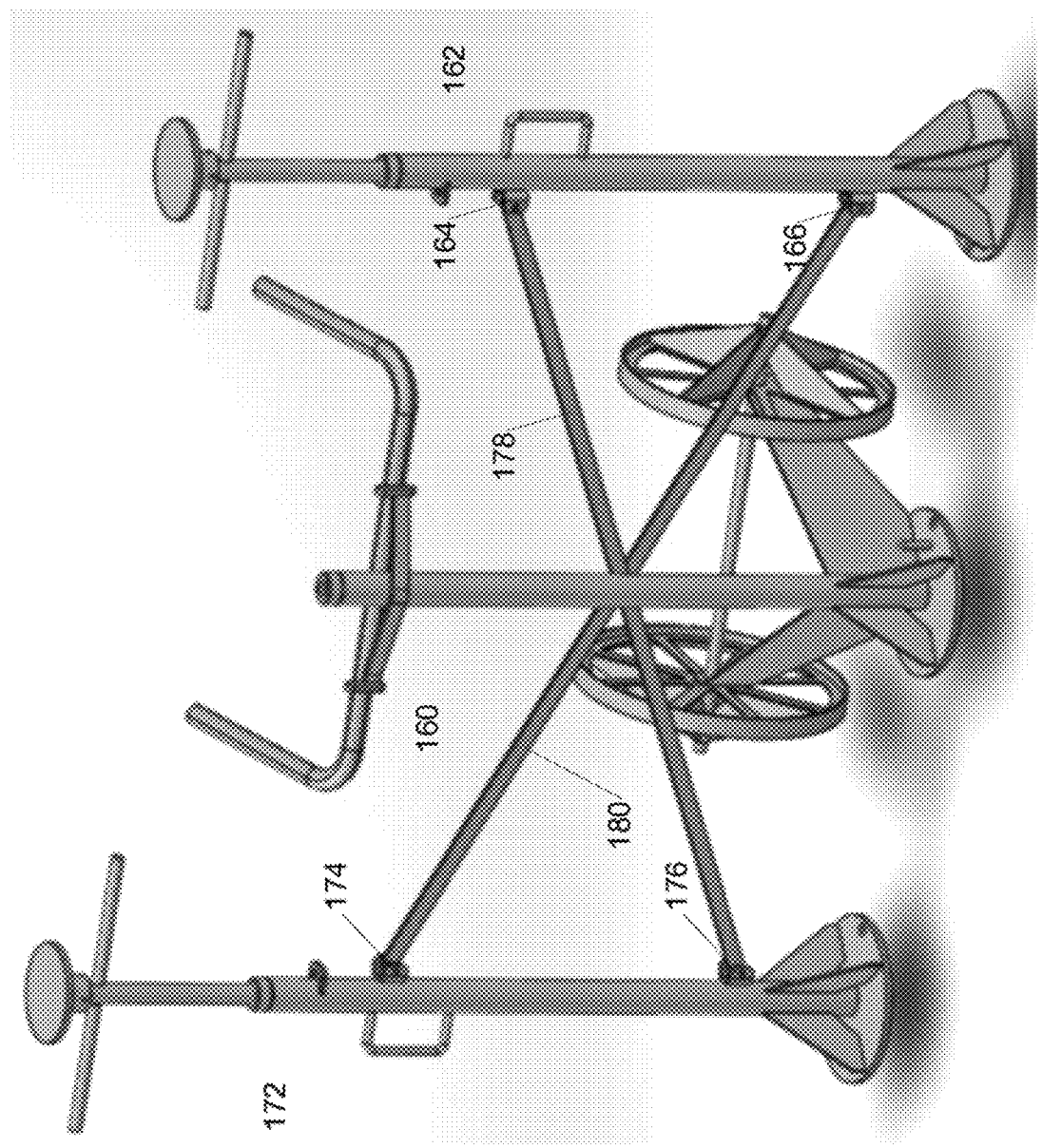
FIG. 27 is a perspective view of another embodiment of the portable trailer stand of FIG. 9 comprising two auxiliary trailer stands of FIG. 13.

Turning now to FIG. 27, another embodiment of a transport for a trailer stand in accordance with an aspect of the present invention is shown and is generally identified by reference numeral 160. In this embodiment, the transport 160 is configured to carry and transport a first and a second trailer stand 162 and 172, respectively. The transport 160 comprises all of the components of transport 70. The first trailer stand 162 comprises all of the components of trailer stand 120. The first trailer stand 162 further comprises a first U-clamp 164 and a second U-clamp 166. The first and second U-clamps 164 and 166, respectively, are connected to the outer tube of the first trailer stand 162.

The second trailer stand 172 comprises all of the components of trailer stand 120. The second trailer stand 172 further comprises a first U-clamp 174 and a second U-clamp 176. The first and second U-clamps (174, 176) of the second trailer stand 172 are connected to the outer tube of the second trailer stand 172.

The transport 160 further comprises a first connecting bar 178 and a second connecting bar 180. The first and second connecting bars (178, 180) are rigidly connected to the transport 160. One end point of the first connecting bar 178 is welded to the first U-clamp 164 of the first transport 162 while the other end point is welded to the second U-clamp 176 of the second transport 172. One end point of the second connecting bar 180 is welded to the second U-clamp 166 of the first transport 162 while the other end is welded to the first U-clamp 174 of the second transport 172. The connecting bars (178, 180) provide structural integrity to the first and second trailer stands (162, 172).

Figure 28:
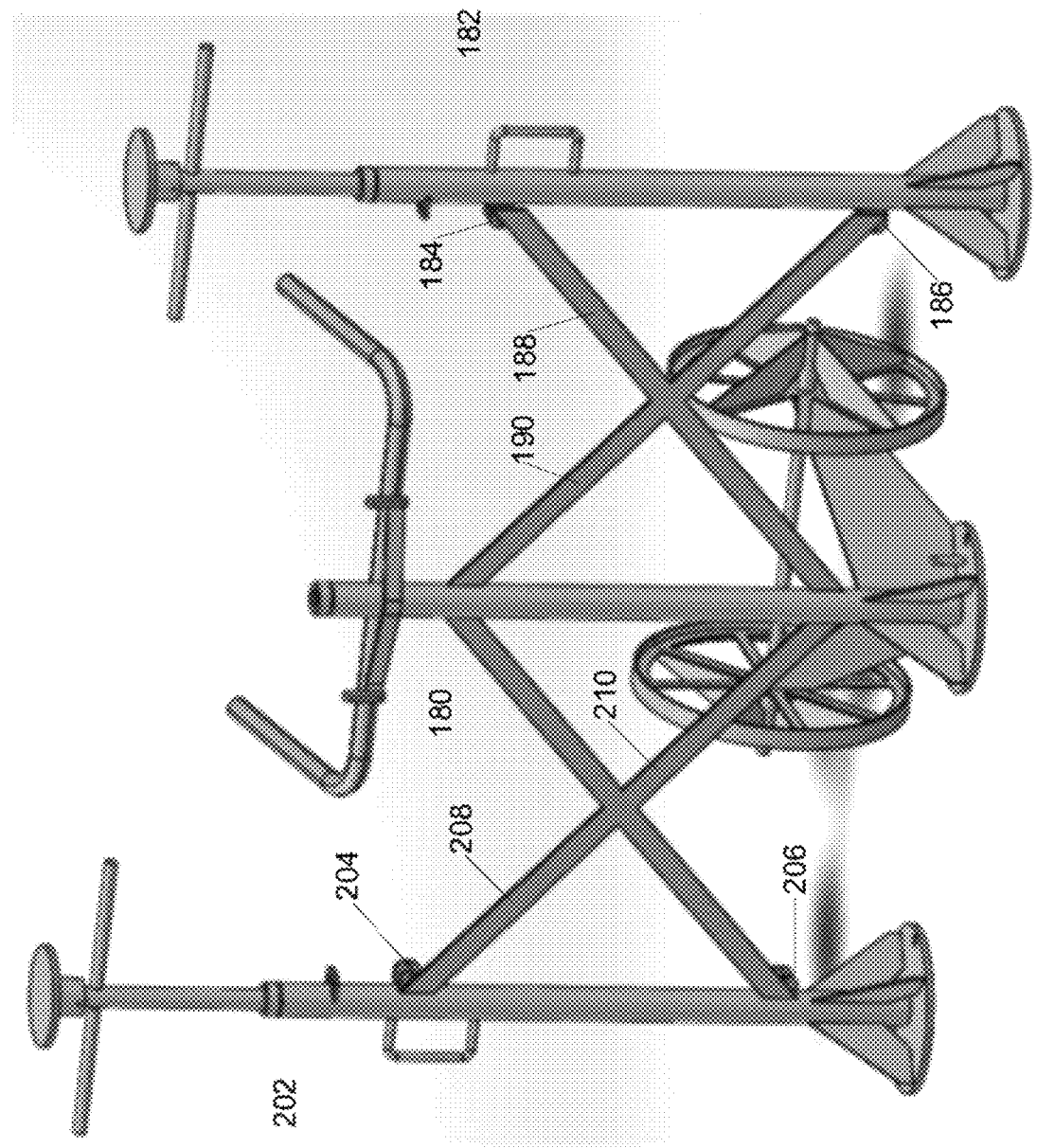
FIG. 28 is a perspective view of another embodiment of the portable trailer stand of FIG. 9 comprising two auxiliary trailer stands of FIG. 13.
Figure 29:
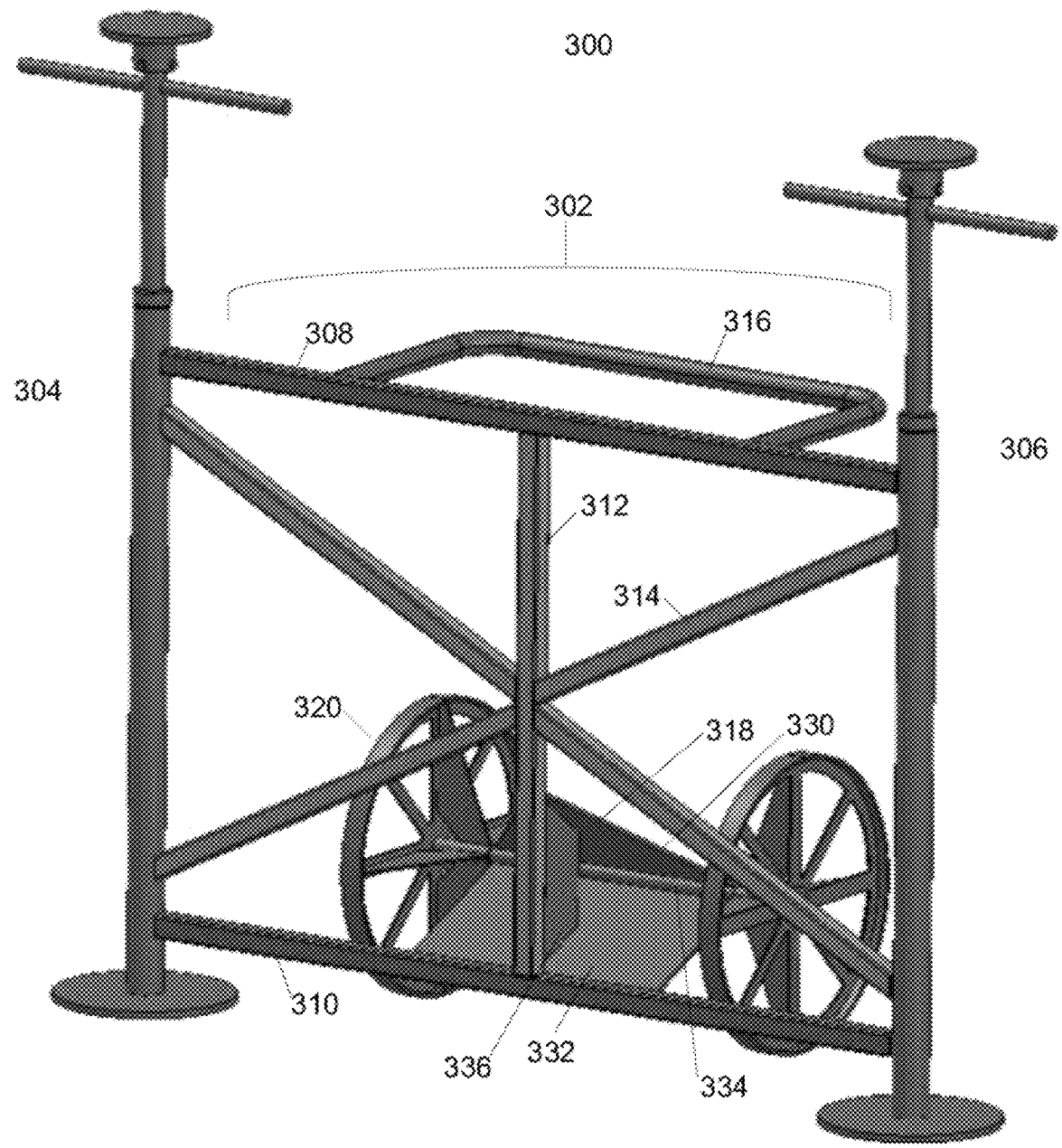
FIG. 29 is a perspective view of a portable trailer stand comprising two auxiliary trailer stands in accordance with an aspect of the invention.
Figure 30:
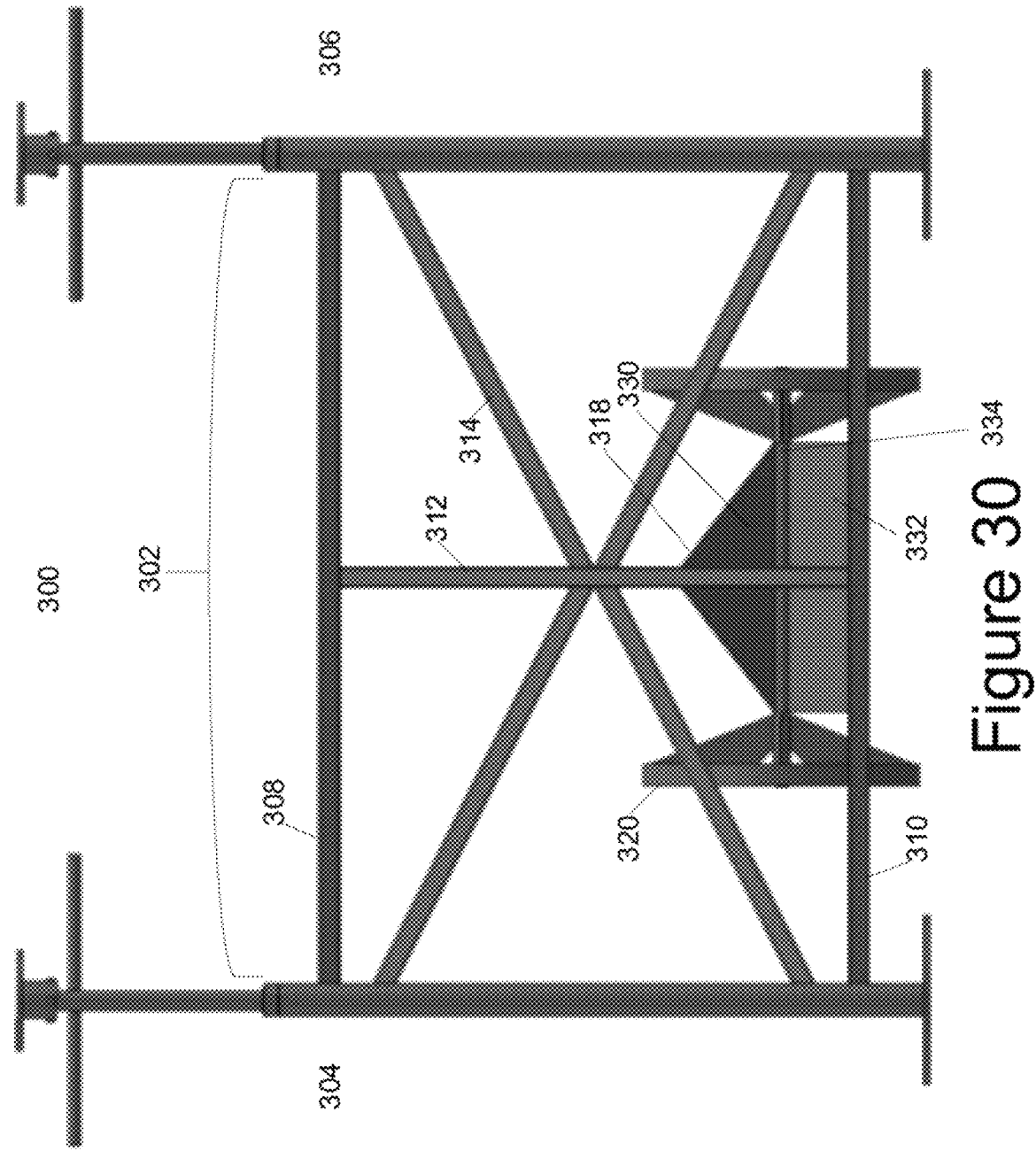
FIG. 30 is a front elevation view of the portable trailer stand of FIG. 29.
Figure 31:
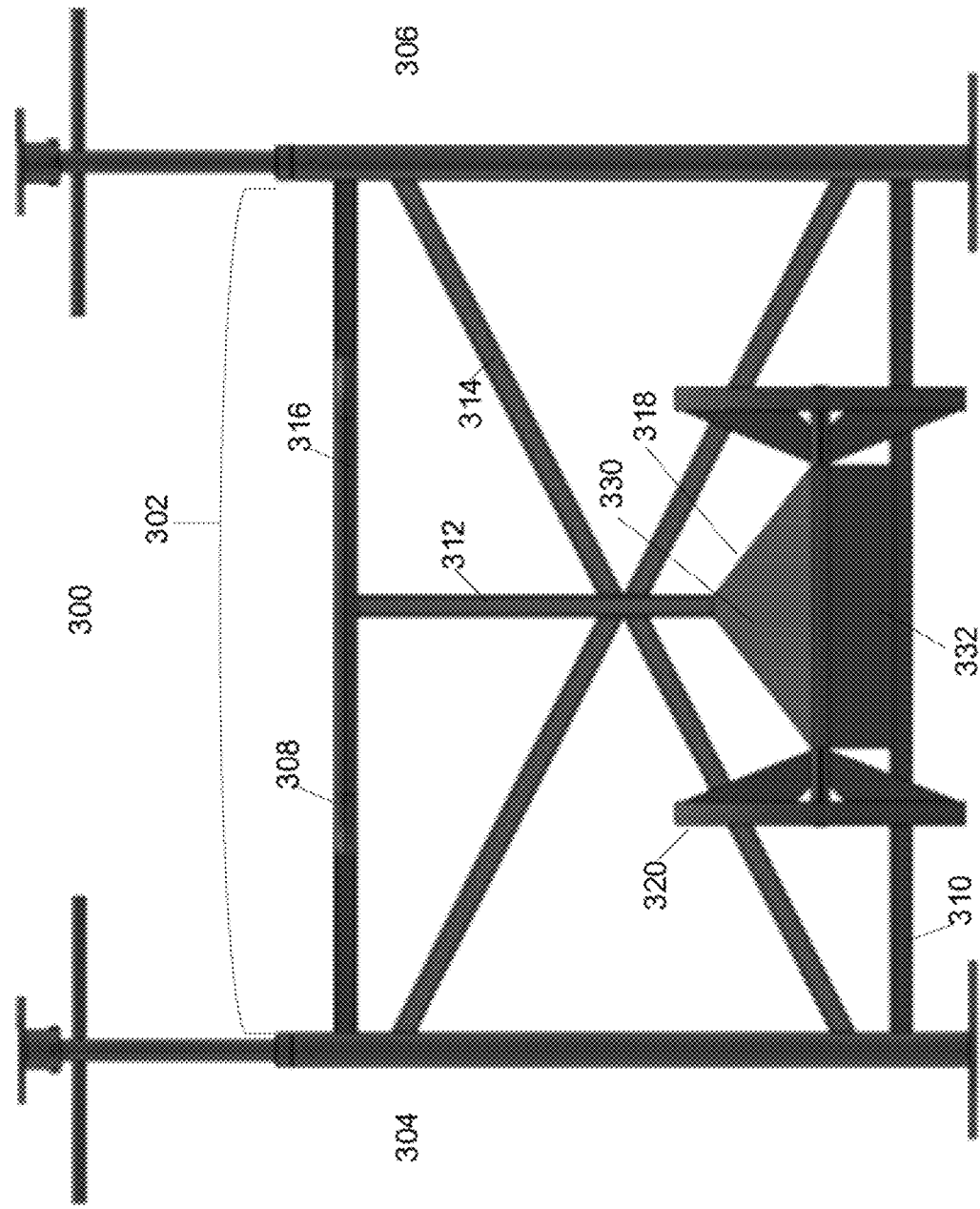
FIG. 31 is a back elevation view of the portable trailer stand of FIG. 29.
Figure 32:
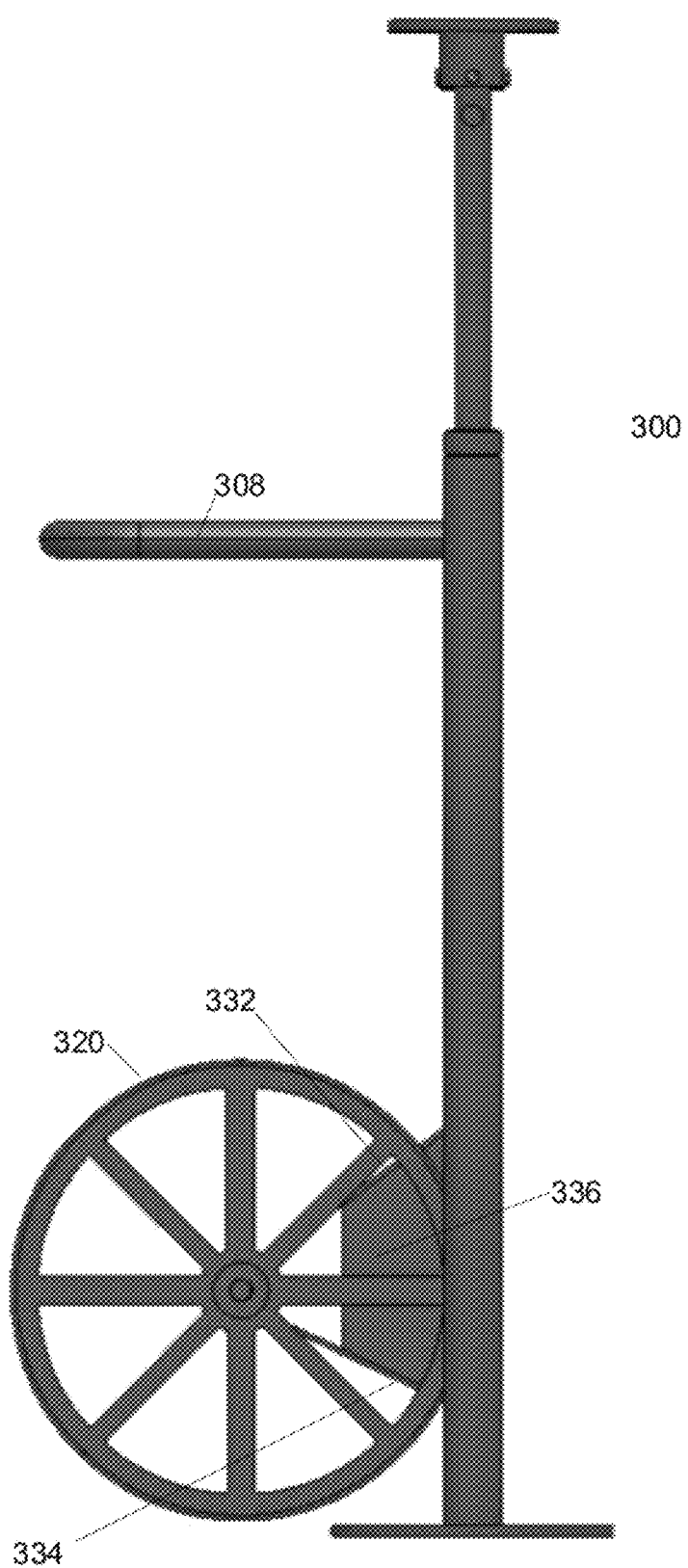
FIG. 32 is a side elevation view of the portable trailer stand of FIG. 29.
Figure 33:
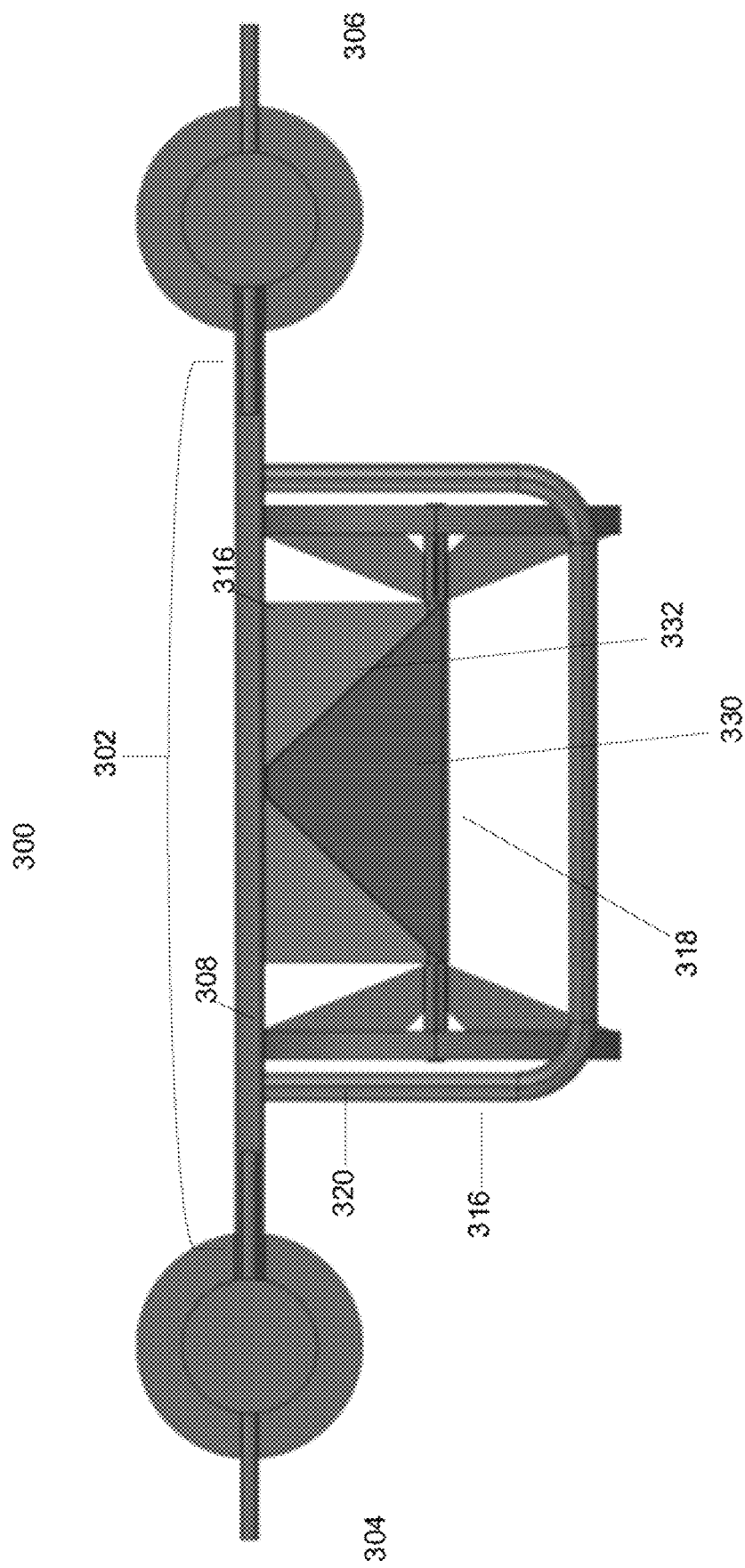
FIG. 33 is a top view of the portable trailer stand of FIG. 29.

Turning now to FIG. 28, another embodiment of a transport for a trailer stand in accordance with an aspect of the present invention is shown and is generally identified by reference numeral 180. The transport 180 is configured to carry and transport a first trailer stand 182 and a second trailer stand 184. The transport 180 comprises all of the components of transport 70. The first trailer stand 182 comprises all of the components of trailer stand 120. The second trailer stand 202 comprises all of the components of trailer stand 120.

The first trailer stand 182 further comprises a first U-clamp 184 and a second U-clamp 186. The first and second U-clamps (184, 186) are connected to the outer tube of the first trailer stand 182 via a track (not shown) such that the clamps (184, 186) can slide along the longitudinal outer surface of the outer tube of the first trailer stand 182.

The second trailer stand 202 further comprises a first U-clamp 204 and a second U-clamp 206. The first and second U-clamps (204, 206) are connected to the outer tube of the first trailer stand 202 via a track (not shown) such that the clamps (204, 206) can slide along the longitudinal outer surface of the outer tube of the first trailer stand 202.

The transport 180 further comprises a first collar and a second collar (not shown) around the central member of the transport 180. The second collar is connected to a first connecting bar 188 at one end of the bar 188 and the first collar is connected to a second connecting bar 190 at one end of the bar 190. The first connecting bar 188 is connected to the first U-clamp 184 of the first trailer stand 182 at the other end. Similarly, the second connecting bar 190 is connected to the second U-clamp 186 of the first trailer stand 182 at the other end. The first and second connecting bars (188, 190) are connected to the first and second collars and the first and second U-clamps (184, 186) of the first trailer stand 182 such that the bars (188, 190) can pivot. The pivoting of the bars (188, 190), and the sliding of the first and second collars and the first and second U-clamps (184, 188) permit for adjustment of the distance between the first trailer stand 182 and the transport 180.

The second collar is also connected to a third connecting bar 208 at one end of the bar 208 and the first collar is also connected to a third connecting bar 210 at one end of the bar 210. The first connecting bar 208 is connected to the first U-clamp 204 of the second trailer stand 202 at the other end. Similarly, the second connecting bar 210 is connected to the second U-clamp 206 of the second trailer stand 202 at the other end. The third and fourth connecting bars (208, 210) are connected to the first and second collars and the first and second U-clamps (204, 206) of the second trailer stand 202 such that the bars (208, 210) can pivot. The pivoting of the bars (208, 210), and the sliding of the first and second collars and the first and second U-clamps (204, 206) permit for adjustment of the distance between the second trailer stand 202 and the transport 180.

The first and second connecting bars (188, 190) are pivotally connected at a midpoint thereof. Similarly, the third and fourth connecting bars (208, 210) are pivotally connected at a midpoint thereof.

The distance between the first trailer stand 182 and the transport 180 and the distance between the second trailer stand 202 and the transport 180 can be adjusted to maximize the support provided by the platforms of the first and second trailer stands (182, 202) to the nose portion of the trailer resting on the pads of the trailer stands (182, 202). The distance between the first trailer stand 182 and the transport 180 and the distance between the second trailer stand 202 and the transport 180 can be adjusted for enabling multiple units comprising the transport 180 and first and second trailer stands (182, 202) to be arranged and stored in a compact stacked or nested formation. Furthermore, the transport 180 can be used to transport the trailer stands (182, 202) to and from the underside of the nose portion of a trailer.

Turning now to FIGS. 29 to 33, a transport with trailer stands in accordance with an aspect of the present invention is shown and is generally identified by reference numeral 300. The transport with trailer stands 300 comprises intermediate framework 302 connecting a first trailer stand 304 and a second trailer stand 306. The intermediate framework 302 comprises an upper bar 308, a lower bar 310, a central bar 312, four (4) bracing bars 314, a handlebar 316, a wheel support 318, two (2) wheels 320, and an axle.

The upper bar 308 is connected to the first trailer stand 304 at one end and to the second trailer stand 306 at the other end. The lower bar 310 is similarly connected to the first trailer stand 304 at one end and to the second trailer stand 306 at the other end. The central bar 312 is connected to an approximate midpoint of the upper bar 308 at one end and to an approximate midpoint of the lower bar 310 at the other end. Two of the bracing bars 314 are connected to the first trailer stand 304 at one end and to the central member 312 at the other end, while the other two bracing bars 314 are connected to the second trailer stand 306 at one end and to the central member 312 at the other end. The bracing bars 314 are configured to form an "X" design to increase the structural integrity of the intermediate framework 302. The handlebar 316 is connected to the upper bar 308.

The first trailer stand 304 comprises all of the components of trailer stand 120 as previously described and the second trailer stand 306 comprises all of the components of the trailer stand 120 as previously described.

The wheel support 318 comprises an upper portion 330, a lower portion 332, a hollow tube 334, and a strut 336. The upper portion 330 is connected to the central member 312 and to the lower portion 332. The lower portion 332 is connected to the upper portion 330 and to the lower bar 310. The upper portion 330 has a generally triangular shape with the apex of the triangle being connected to the central member 312. The lower portion 332 has a generally rectangular shape. The hollow tube 334 is connected to both the upper portion 330 and the lower portion 332 along the edges of both portions (330, 332). The axle passes through the hollow tube 334 and is connected and either end to a wheel 320. The strut 336 is connected to both the upper portion 330 and the lower portion 332 and provide additional rigidity to the wheel support 318. In this embodiment, the components of the transport with trailer stands 300 are welded together with the exception of the wheels 320. Each wheel 320 comprises all of the components of wheels 82 as previously described. While not shown in the FIGS. 23 to 27, a company logo or name can be imprinted into the upper portion 330.

The length of the components of the intermediate framework 320 are such that the pads of the first and second trailer stand (304, 306) are positioned and intermediate points along the underside of a nose portion of a trailer when the transport with trailer stands 300 is in use. In this embodiment, the length of the intermediate framework 302 is 50 inches. In this configuration, the support to the nose portion provided by the pads of the first and second trailer stands (304, 306) is maximized.

In use, an operator grips the handlebar 316 and tilts the transport such that it can be moved along the wheels 320 on the surface. The transport is moved until the first and second trailer stands (304, 306) are positioned under a nose portion of a trailer. The operator then tilts the transport back towards the surface until the bases of the first and second trailer stands (304, 306) contact the surface. If necessary the height of the platforms of the first and second trailer stands (304, 306) is adjusted such that the first and second trailer stands (304, 306) can fit under the nose portion. The height of the platforms of the first and second trailer stands (304, 306) is then increased until the pads contact the underside of the nose portion and the nose portion of the trailer is resting on the pads.

The transport of the transport with trailer stands 300 may have a weight of approximately 120 to 140 lbs. The first trailer stand 304 and second trailer stand 306 can support a weight of approximately 30,000 to 75,000 lbs. Accordingly, the transport with trailer stands 300 can support a weight of 60,000 to 150,000 lbs.

Figure 34:
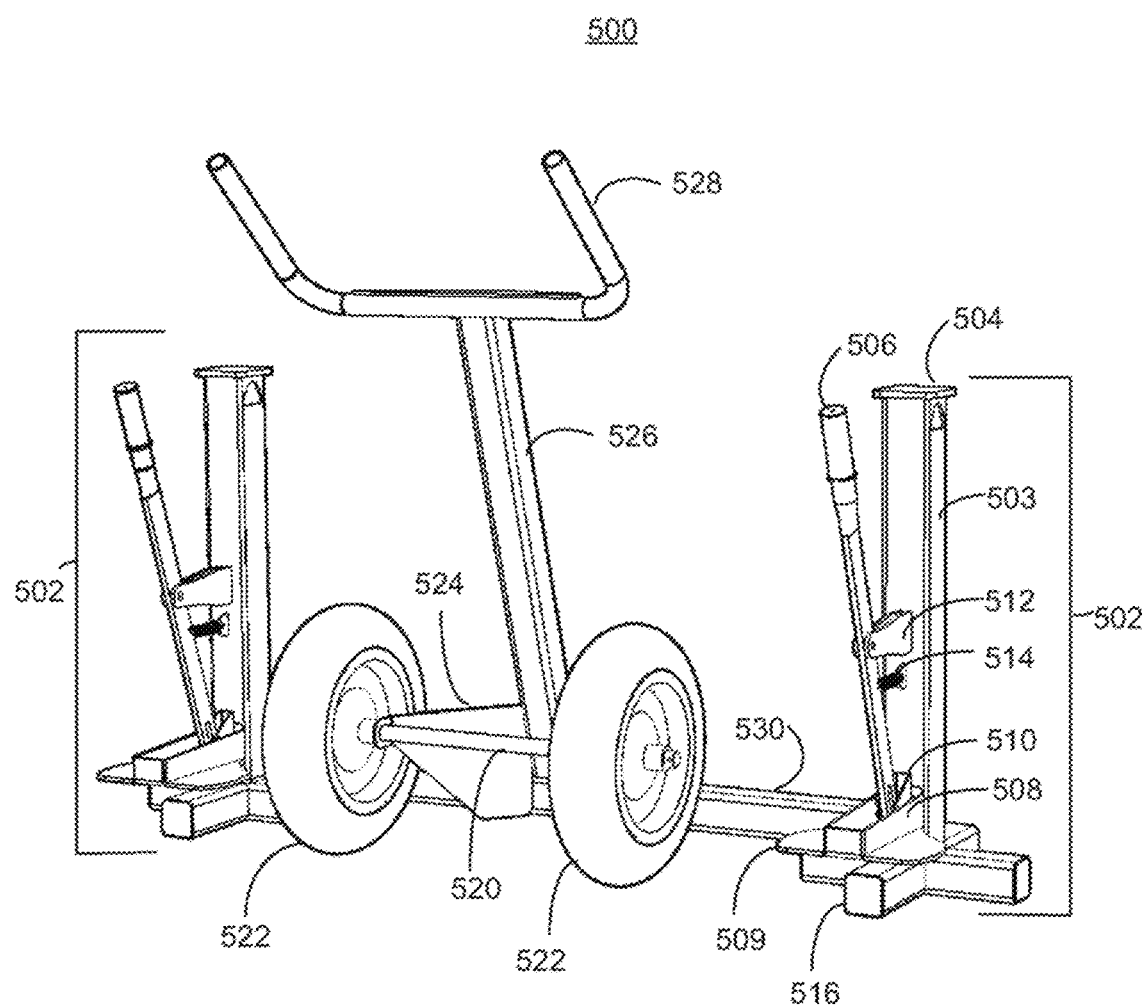
FIG. 34 is a perspective view of a portable trailer stand comprising two auxiliary trailer stands in accordance with an aspect of the invention.
Figure 35:
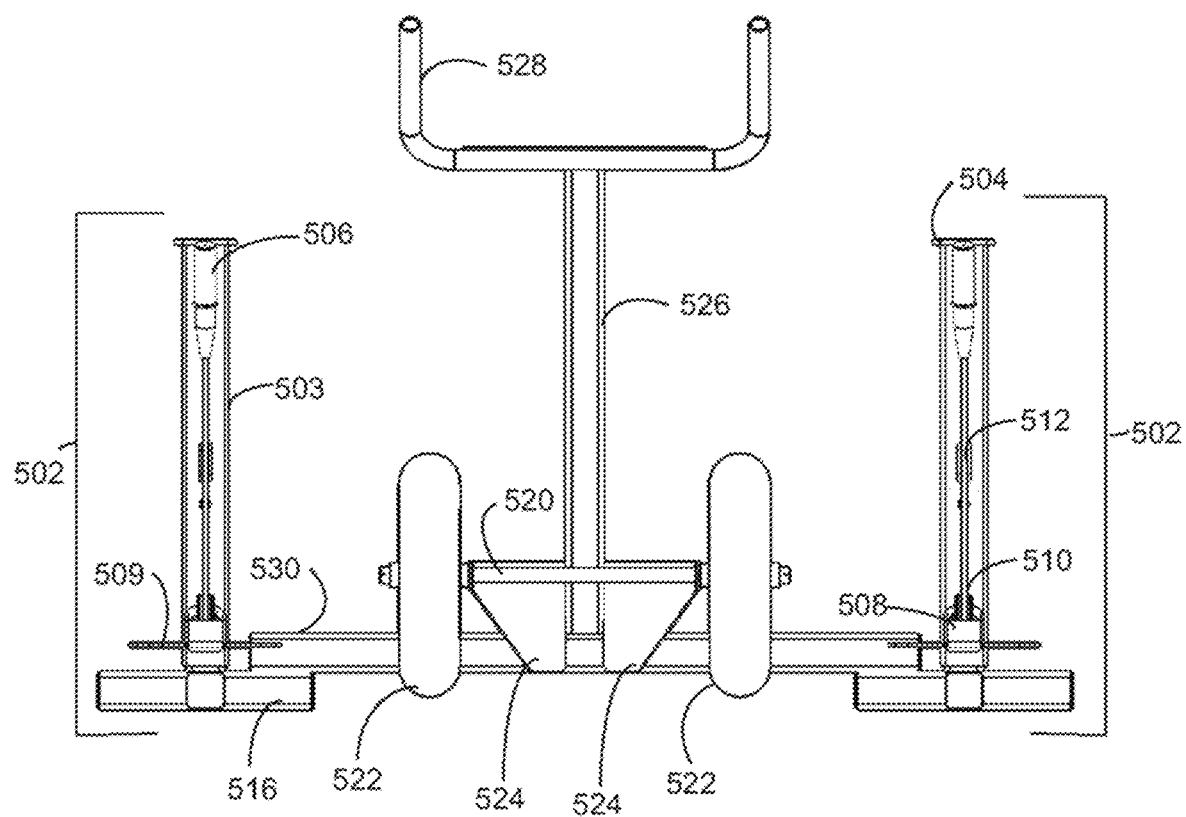
FIG. 35 is a back elevation view of the portable trailer stand of FIG. 29.
Figure 36:
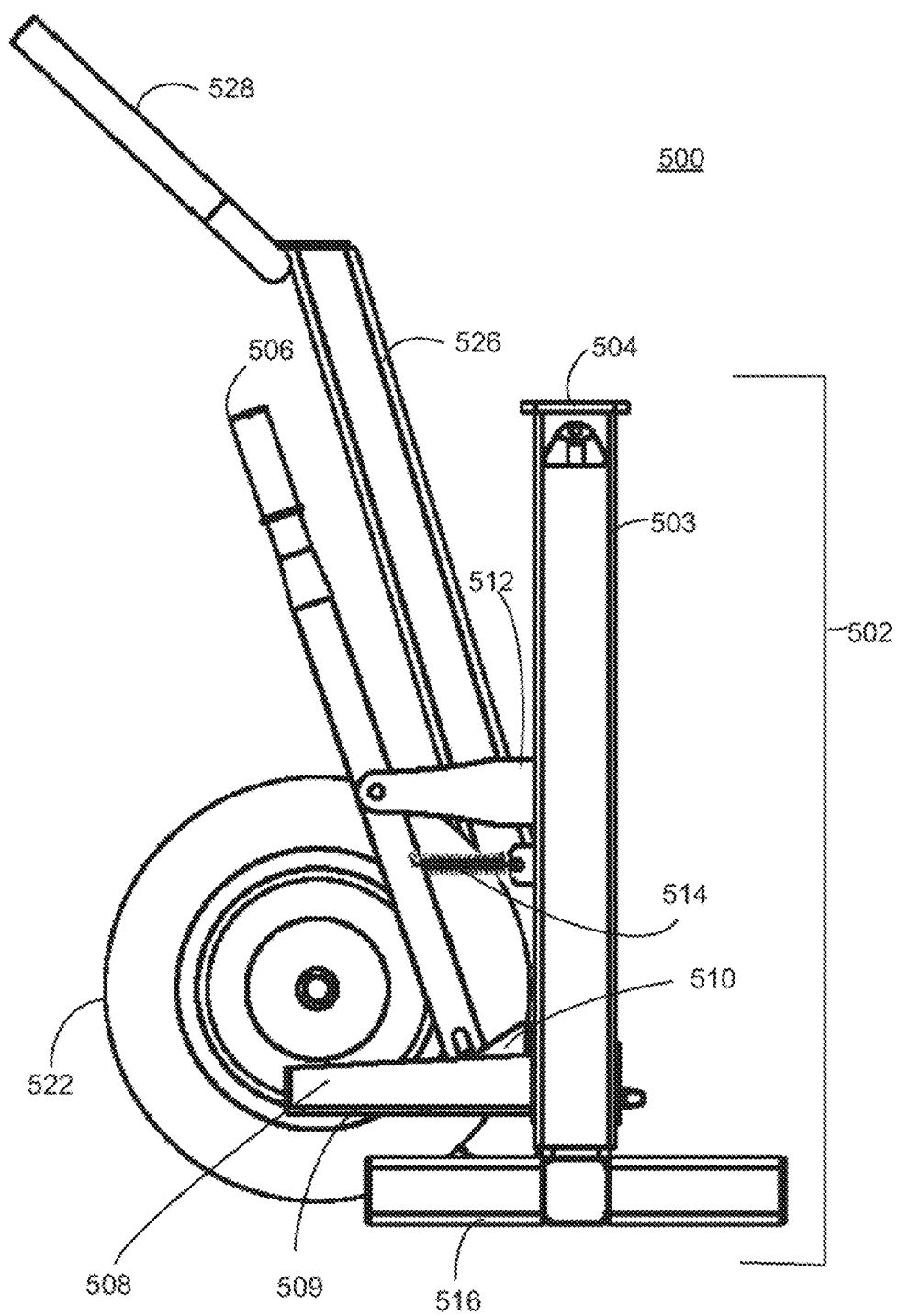
FIG. 36 is a side elevation view of the portable trailer stand of FIG. 29.

Turning now to FIGS. 34 to 36, a transport with trailer stands in accordance with an aspect of the present invention is shown and is generally identified by reference numeral 500.

The transport comprises intermediate framework connecting a first trailer stand 502 and a second trailer stand 502. The intermediate framework comprises a lower bar 530, a central member 526, a handlebar 528, two (2) wheel support brackets 524, two (2) wheels 522, and an axle 520. The lower bar 530 is connected to the first trailer stand 502 at one end and to the second trailer stand 502 at the other end. The central member 526 is connected to an approximate midpoint of the lower bar 530 at one end and to an approximate midpoint of the handlebar 528 at the other end.

The two wheel support brackets 524 are secured, in one embodiment by welding, to the lower bar 530 and extend upwardly therefrom. These brackets 524 support the single axle 520 upon which the wheels 522 are journalled for rotation and it will be observed that the lower peripheries of the wheels 522 are situated just above the lower surface of the base pads 516 when the transport is situated upon a supporting surface in a horizontal position. In this embodiment, the single axle 520 forms a bar upon which the operator can place his/her foot to facilitate the tilting of the first and second trailer stands 502, off of their respective base pads 516, and onto the wheels 522 and vice versa. In an embodiment of the present invention, the wheels are 16" diameter solid rubber tires. In another embodiment of the present invention, the wheels are 10" diameter semi-pneumatic rubber tires.

Handlebar 528 extends from one side of the central member 526 on the same side as the wheels 522 so that the transport can readily be tipped onto the wheels 522, maneuvered from one location to the other, and tipped back onto the base pads 516. In the exemplary embodiment, the handlebar 528 is in the form of a U- or C-shape, thus providing dual positioning handles. In one embodiment, the dual positioning handles are each 16" long. The handlebar 528 may comprise grips for the operator's hand(s).

The first and second trailer stands 502 are identical and may be similar in structure to the trailer support safety stand disclosed in U.S. Pat. No. 8,016,257 to Di Biase, the teachings of which are incorporated herein by reference in their entirety. The first and second trailer stands 502 each comprise a base pad 516 for engaging a surface and a post assembly 503, having a lower end and an upper end, extending upwardly from the base pad 516 to a top plate 504 running perpendicular to the post assembly 503 for receiving the underside of the nose portion of a trailer. The lower end of the post assembly 503 is secured, in one embodiment as by welding, to the base pad 516 to restrict motion between the post assembly 503 and the base pad 516 while the load is applied. The upper end of the post assembly 503 is secured, in one embodiment as by welding, to the top plate 504 to restrict motion between the post assembly 503 and the top plate 504 while the load is applied. In another embodiment, the base pad 516 and the top plate 504 are integral with the post assembly 503.

In the exemplary embodiment, the post assembly 503 consists of a lower post extending upwardly from the base pad 516 and an upper post extending downwardly from the top plate 504. The lower post is a tubular member having a square cross-sectional shape and, in one embodiment, is made of heavy gauge steel construction. The upper post is a hollow tubular member having a square cross-sectional shape and having slightly larger dimensions than those of the lower post such that it is configured to slidingly accept the lower post therein providing a telescoping arrangement between the two. In one embodiment of the present invention, the upper post is made of heavy gauge, 5½" square steel construction.

In the exemplary embodiment, the lower post comprises a plurality of apertures disposed along the length thereof arranged in a vertically spaced apart relationship that are formed in the front of the lower post and extend through the back of the lower post. In one embodiment, the lower post apertures have a rounded rectangular shape. The upper post comprises a single aperture formed in the front of the upper post and extending through the back of the upper post. The upper post aperture optionally aligns with the plurality of lower post apertures for fixing the vertical position of the upper post relative to the lower post by a locking device. In one embodiment, the upper post aperture has a rounded rectangular shape and is of a size such that, when aligned with the plurality of lower post apertures, it is simultaneously aligned with two vertically adjacent lower post apertures.

The locking device is a locking pin having slightly smaller dimensions than those of the lower post apertures such that the locking pin is insertable through the aligned upper and lower post apertures to fix the vertical position of the upper post relative to the lower post. The locking pin is inserted through the upper post aperture and the bottom aperture of the two vertically adjacent lower post apertures.

In one embodiment, the locking pin has a rounded rectangular cross-sectional shape; the forward end of which is may be tapered to provide for easier insertion through the aligned upper and lower post apertures. In one embodiment, when the vertical position of the upper post relative to the lower post is fixed by the locking pin, there is still allowance for a ½" downward telescopic movement of the upper post relative to the lower post in order to make it easier to remove the locking pin from the aligned upper and lower post apertures.

The first and second trailer stands 502 further comprise means for actuating the locking device. The actuating means is moveable between at least a first position wherein the locking device is engaged with the post assembly 503, thus securing the height of the post assembly 503 and at least a second position wherein the locking device is disengaged from the post assembly 503, thus allowing adjustment of the height of the post assembly 503.

The actuating means is a vertically arranged lever 506 connected at the bottom end thereof to the locking pin and pivotally connected to the upper post at a predetermined distance along the lever 506 up from the locking pin such that when the top end of the lever 506 is moved toward the upper post, the locking pin is removed from the aligned upper and lower post apertures, and when the top end of the lever 506 is moved away from the upper post, the locking pin is inserted through the aligned upper and lower post apertures. In the exemplary embodiment, the lever is a flat bar having an aperture formed therein, and the pivotal connection between the lever 506 and the upper post consists of two side members 512 extending out from the upper post to either side of the lever 506 at the location of the aperture and a fastener, in one embodiment a bolt, running through the side members 512 and the aperture for pivoting therein. The lever 506 may have a grip at the top end thereof for the operator's hand(s).

The lever 506 may be pivotally connected to the locking pin. The pivotal connection between the lever 506 and the locking pin consists of the bottom end of the lever being attached to a flange on the back end of the locking pin via a fastener, in one embodiment a bolt.

The first and second trailer stands 502 may further comprise means for guiding the locking pin into and out of the aligned upper and lower post apertures. The guiding means comprises a guiding channel 510 having two side walls extending out from, and perpendicular to, the upper post. The two side walls of the guiding channel 510 are spaced apart at a distance slightly larger than the width of the locking pin. The guiding means also comprises a floor 509 extending out from, and perpendicular to, the upper post at a position that is level with the bottom edge of the upper post aperture; and two side walls 508 extending up from, and perpendicular to, the floor 509 and arranged in a substantially parallel spaced apart relationship. The two side walls 508 are spaced apart at a distance slightly larger than the width of the two side walls of the guiding channel. The guiding means may also comprise an end wall extending up from, and perpendicular to, the floor 509 and arranged substantially perpendicular to each of the two side walls 508. The end wall is located between the two side walls 508 at a predetermined distance from the upper post such that the locking pin can be removed from the aligned upper and lower post apertures, but once the locking pin is removed, its continued movement in that direction is inhibited. The floor 509 of the guiding means may be secured, in one embodiment as by welding, to the upper post; the two side walls 508 may be secured, in one embodiment by welding, to the floor 509 and the upper post; and the end wall may be secured, in one embodiment by welding, to the floor 509 and the two side walls 508. The width of the floor 509 of the guiding means may be greater than the distance between the two side walls 508 such that the floor 509 on the outside of the guiding means forms a foot pedal for the operator to allow the operator to control both the direction in which the upper post moves relative to the lower post and the speed of the movement.

The first and second trailer stands 502 may comprise means for biasing the lever 506 in a direction towards the upper post. The biasing means is a spring 514 connected at one end thereof to the upper post and connected at the other end thereof to the lever 506 at a predetermined distance between the pivotal connection to the upper post and the connection to the locking pin. The biasing means functions to hold the locking pin in place in the locked position while the first and second trailer stands 502 are being maneuvered.

The first and second trailer stands 502 further comprise means for adjusting the height of the post assembly 503. The adjusting means is contained within the upper post and is an automatic gas activated leveling system, in one embodiment a gas shock. In one embodiment of the present invention, the first and second trailer stands 502 have an overall retracted length of about 42". In another embodiment of the present invention, the first and second trailer stands 502 have an overall extended length of about 55". In a further embodiment of the present invention, the first and second trailer stands 502 have an overall extended length of about 53".

In the operation of the transport with trailer stands 500, according to one embodiment of the present invention, the operator places his/her foot on the axle (foot bar) 520, grabs the double positioning handles of the handlebar 528 and tilts the transport toward himself/herself off of the base pads 516 and onto its wheels 522, removes his/her foot from the axle 520, wheels the transport into the proper supporting position relative to the nose portion of a trailer, places his/her foot back on the axle 520, and tilts the transport back onto the base pads 516. The transport is positioned so that the top plate 504 of the first and second trailer stands 502 will engage the underside of the nose portion of the trailer when the stands 520 are raised. The operator places his/her foot on the foot pedal 509 and applies a downward force thus taking advantage of the allowance for the ½" downward telescopic movement of the upper post relative to the lower post, thus making it easier for the locking pin to be disengaged from the post assembly 503. While applying the downward force, the top of the lever 506 is pushed toward the upper post thus moving the bottom of the lever away from the upper post and causing the locking pin to be removed from the aligned upper and lower post apertures. Accordingly, the locking pin is disengaged from the post assembly 503. This allows the operator to raise the upper post to the desired position such that the top plate 504 engages or is positioned just below the underside of the nose portion of the trailer. The operator controls the direction and speed of the movement of the upper post relative to the lower post with his/her foot on the foot pedal 509. When each stand 502 has been raised to the desired position, the top of the lever 506 is then pulled away from the upper post thus moving the bottom of the lever toward the upper post and causing the locking pin to be inserted through the aligned upper and lower post apertures. Accordingly, the locking pin is engaged with the post assembly 503 and the upper post is locked against movement in either vertical direction relative to the lower post.

The transport of the transport with trailer stands 500 may have a weight of approximately 120 to 140 lbs. The first and second trailer stands 502 can each support a weight of approximately 30,000 to 75,000 lbs. Accordingly, the transport with trailer stands 500 can support a weight of 60,000 to 150,000 lbs.

In these embodiments, the components of the portable trailer stand 10, the auxiliary trailer stand 42, the transport 70, 150, 160, 180, 400, 420 and 450, the transport of the transport with trailer stands 300 and 500, the trailer stand 120, 422 and 452, the first trailer stand 162, 182, 304, 402 and 502, the second trailer stand 120', 172, 202, 306, 404 and 502, are made of metal, such as, for example cold roll steel, standard bar stock etc. However, one skilled in the art will appreciate that the use of other materials are possible.

In these embodiments, each of the portable trailer stand 10, the auxiliary trailer stand 42, the transport 70, 150, 160, 180, 400, 420 and 450, the transport of the transport with trailer stands 300 and 500, the trailer stand 120, 422 and 452, the first trailer stand 162, 182, 304, 402 and 502, the second trailer stand 120', 172, 202, 306, 404 and 502 may be constructed to support a weight of approximately about 30,000 lbs to about 75,000 lbs. As such, the combinations of portable trailer stands with auxiliary trailer stands and of transport with trailer may support a weight of up to about 150,000 lbs.

Although certain embodiments have been described with reference to the figures, those of skill in the art will appreciate that variations and modifications may be made without departing from the scope thereof as defined by the appended claims.

What is claimed is:

1. A portable trailer stand having a longitudinal vertical axis, said stand comprising:
    a base for engaging the ground;
    at least one wheel mounted on said base for moving said stand along the ground to and from a position under the nose portion of a trailer;
    a load plate axially spaced above said base for engaging the underside of the nose portion of the trailer;
    an elongated axially extending tubular column having opposing upper and lower ends, the lower end thereof received by said base;
    a support plate connected to the column of the portable trailer stand, the support plate having a slot formed therein for engaging a column of an auxiliary trailer stand and for securing the auxiliary trailer stand to the portable trailer stand;
    an elongated axially extending jack screw assembly having an upper portion and a lower portion, said lower portion comprising a tubular externally threaded screw member terminating at a lower end and said upper portion comprising a generally solid core member terminating at an upper end, said screw member being threadedly received by said column whereby said jack screw assembly moves together as a unit relative to said column;
    means for adjustably securing said load plate to the upper end of the core member; and
    a handle carried by said core member in the space between the top surface of said screw member and said load plate for rotating said jack screw assembly in opposite directions relative to said column and thereby raising or lowering said jack screw and said load plate.

2. The portable trailer stand of claim 1, wherein the slot is an L-shaped slot.

3. The portable trailer stand of claim 1, wherein a threaded nut is received in the upper end portion of the column of the portable trailer stand and said screw member is threadedly received by said threaded nut.

4. The portable trailer stand of claim 1, wherein said means provided for securing said load plate to said core member comprises a ball and ball seat, wherein the ball and a groove is provided in the upper end of the core member and the load plate comprises a downwardly opening axially extending tubular socket forming the ball seat that receives the ball wherein said socket contacts said ball and a pin is mounted on said load plate for movement in said groove.

* * * * *